US011250640B2

(12) United States Patent
Sakamoto

(10) Patent No.: US 11,250,640 B2
(45) Date of Patent: Feb. 15, 2022

(54) MEASUREMENT METHOD, MEASUREMENT DEVICE, AND RECORDING MEDIUM

(71) Applicant: OLYMPUS CORPORATION, Tokyo (JP)

(72) Inventor: Yohei Sakamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/775,416

(22) Filed: Jan. 29, 2020

(65) Prior Publication Data
US 2020/0250895 A1 Aug. 6, 2020

(30) Foreign Application Priority Data

Feb. 1, 2019 (JP) .............................. JP2019-017376

(51) Int. Cl.
*G06T 19/20* (2011.01)
*G06T 7/60* (2017.01)

(52) U.S. Cl.
CPC ............... *G06T 19/20* (2013.01); *G06T 7/60* (2013.01); *G06T 2207/10028* (2013.01); *G06T 2219/2021* (2013.01)

(58) Field of Classification Search
None
See application file for complete search history.

(56) References Cited

U.S. PATENT DOCUMENTS

| 6,975,756 B1* | 12/2005 | Slabaugh | G06T 15/205 345/427 |
| 2005/0195157 A1* | 9/2005 | Kramer | H04N 13/161 345/156 |
| 2019/0043188 A1* | 2/2019 | Wang | G06T 7/521 |

FOREIGN PATENT DOCUMENTS

| JP | 3347385 B2 | 9/2002 |
| JP | 2005-189055 A | 7/2005 |

OTHER PUBLICATIONS

Ming-Der Yang et al, "Image-based 3D scene reconstruction and exploration in augmented reality", Automation in Construction, vol. 33, Aug. 2013, pp. 48-60, https://www.sciencedirect.com/science/article/pii/S0926580512001690 (Year: 2013).*

* cited by examiner

*Primary Examiner* — Tize Ma
(74) *Attorney, Agent, or Firm* — Scully, Scott, Murphy & Presser, P.C.

(57) ABSTRACT

In a measurement device, a processor is configured to display one first image in a first region of a display. The processor is configured to hide the first image in the first region and display one second image included in a plurality of second images in the first region after a first point is set on the first image. The processor is configured to set the first point on the first image and set a second point on the second image. The processor is configured to generate a three-dimensional shape of a subject on the basis of a position and a posture of a camera when each image is generated. The processor is configured to measure a size of the subject on the basis of at least the first point, the second point, and the three-dimensional shape.

25 Claims, 46 Drawing Sheets

MEASUREMENT METHOD, MEASUREMENT DEVICE, AND RECORDING MEDIUM

BACKGROUND OF THE INVENTION

Field of the Invention

The present invention relates to a measurement method, a measurement device, and a recording medium.

Priority is claimed on Japanese Patent Application No. 2019-017376, filed on Feb. 1, 2019, the contents of which is incorporated herein by reference.

Description of Related Art

A technology to reconfigure a three-dimensional shape of a subject by using a plurality of images acquired from a plurality of viewpoints different from each other has been developed. This technology is called structure from motion (SfM) in the specification. By using this technology, it is possible to reconfigure a three-dimensional shape of a subject on the basis of video or a plurality of still images and measure the size of the subject.

In a case in which reconfiguration of a three-dimensional shape (3D reconfiguration) is executed by using this technology, a three-dimensional shape not having the absolute size but having the relative scale is reconfigured in principle. For this reason, it is possible to execute measurement in the absolute size (dimension of length) by setting a known size to the acquired three-dimensional shape. For example, Japanese Patent No. 3347385 and Japanese Unexamined Patent Application, First Publication No. 2005-189055 disclose a method of executing 3D reconfiguration and measurement by combining SfM and input of the absolute size.

Japanese Patent No. 3347385 discloses a method of executing 3D reconfiguration and measurement in the absolute size by combining SfM and known motion of a camera. Japanese Unexamined Patent Application, First Publication No. 2005-189055 discloses a method of executing 3D reconfiguration and measurement in the absolute size on the basis of the known size of a subject designated by a user on an image.

SUMMARY OF THE INVENTION

According to a first aspect of the present invention, a measurement method includes a first image display step, a first setting step, a second image display step, a second setting step, a generation step, and a measurement step. A processor displays one first image in a first region of a display in the first image display step. The first image is a two-dimensional image of a subject. The processor sets a first point on the first image displayed in the first region in the first setting step. The processor hides the first image in the first region and displays one second image included in a plurality of second images in the first region after the first point is set on the first image in the second image display step. Each second image included in the plurality of second images is a two-dimensional image of the subject. Part of a visual field of each image of an image group that consists of the first image and the plurality of second images overlaps part of a visual field of another image of the image group. The processor sets a second point on the second image displayed in the first region in the second setting step. The processor generates a three-dimensional shape of the subject on the basis of a position and a posture of a camera. The position and the posture are a position and a posture, respectively, when each image of the image group is generated in the generation step. The three-dimensional shape includes three-dimensional coordinates of at least two points. The processor measures a size of the subject on the basis of at least the first point, the second point, and the three-dimensional shape in the measurement step.

According to a second aspect of the present invention, in the first aspect, the measurement method may further include a third image display step in which the processor displays at least two third images in a second region of the display different from the first region while the first image is displayed in the first region. Each of the third images corresponds to any second image included in the plurality of second images. After an instruction for selecting one of the at least two third images displayed in the second region is accepted, the processor may hide the first image and display the second image corresponding to the selected third image in the first region in the second image display step.

According to a third aspect of the present invention, in the second aspect, the area of the first image in the first region may be larger than the area of the second image in the second region.

According to a fourth aspect of the present invention, in the second or third aspect, the processor may highlight the second image included in the plurality of second images and corresponding to the first image in the second region in the third image display step.

According to a fifth aspect of the present invention, in any one of the second to fourth aspects, the processor may highlight the third image corresponding to the second image displayed in the first region in the second image display step.

According to a sixth aspect of the present invention, in any one of the second to fifth aspects, the processor may arrange the at least two third images in the second region in the order that is based on the relationship between visual fields of the at least two third images in the third image display step.

According to a seventh aspect of the present invention, in any one of the second to sixth aspects when a size of overlap between visual fields of two second images included in the plurality of second images exceeds a predetermined amount, the processor may display the third image corresponding to only one of the two second images in the second region in the third image display step.

According to an eighth aspect of the present invention, in any one of the second to seventh aspects, the processor may highlight a region on the third image in the third image display step. The region is not included in a visual field of the first image and is included in common in visual fields of two or more of the at least two second images.

According to a ninth aspect of the present invention, in any one of the second to eighth aspects, the processor may highlight a region on the third image in the second image display step. The region is not included in a visual field of the second image displayed in the first region and is included in common in visual fields of two or more of the at least two second images.

According to a tenth aspect of the present invention, in the eighth or ninth aspect, the processor may highlight a region on the third image in one of the second image display step and the third image display step. The region is included in a visual field of only one of the at least two second images.

According to an eleventh aspect of the present invention, in any one of the eighth to tenth aspects, the processor may highlight a region on the first image in the third image display step. The region is included in a visual field of only the first image.

According to a twelfth aspect of the present invention, in any one of the eighth to eleventh aspects, the processor may highlight a region on the second image displayed in the first region in the second image display step. The region is included in a visual field of only the second image displayed in the first region.

According to a thirteenth aspect of the present invention, in any one of the eighth to twelfth aspects, the measurement method may further include a point display step in which the processor magnifies and displays a region on the third image. The region includes a third point corresponding to the first point or the second point.

According to a fourteenth aspect of the present invention, in the first aspect, after the first point is set on the first image and an instruction of a moving direction of a visual field is accepted, the processor may hide the first image in the first region and display the second image in the first region. The displayed second image has a visual field that has moved in the moving direction from a visual field of the first image.

According to a fifteenth aspect of the present invention, in the first aspect, the measurement method may further include a combining step and a combined image display step. A combining unit generates a combined image by sticking the plurality of second images together in the combining step. The processor displays the combined image in a second region of the display different from the first region in the combined image display step. After the first point is set on the first image and an instruction for designating a region on the combined image is accepted, the processor may hide the first image and display the second image including the designated region in the first region in the second image display step.

According to a sixteenth aspect of the present invention, in the first aspect, the measurement method may further include a three-dimensional image display step in which the processor displays a three-dimensional image that represents the three-dimensional shape in a second region of the display different from the first region. After the first point is set on the first image and an instruction for designating a region on the three-dimensional image is accepted, the processor may hide the first image and display the second image including a region corresponding to the designated region in the first region in the second image display step.

According to a seventeenth aspect of the present invention, in any one of the first to sixteenth aspects, the measurement method may further include a fourth image display step and a correction step. The processor hides the second image in the first region, displays the first image in the first region, and highlights the first point on the first image after the second point is set in the fourth image display step. The processor corrects a position of the first point set on the first image after the first point is highlighted in the correction step.

According to an eighteenth aspect of the present invention, in any one of the first to seventeenth aspects, each image included in the image group may be a stereo image including an image of the subject seen from a first viewpoint and an image of the subject seen from a second viewpoint different from the first viewpoint.

According to a nineteenth aspect of the present invention, a measurement device includes a processor. The processor is configured to display one first image in a first region of a display, hide the first image in the first region after a first point is set on the first image, and display one second image included in a plurality of second images in the first region after the first point is set on the first image. The first image is a two-dimensional image of a subject. Each second image included in the plurality of second images is a two-dimensional image of the subject. Part of a visual field of each image of an image group that consists of the first image and the plurality of second images overlaps part of a visual field of another image of the image group. The processor is configured to set the first point on the first image displayed in the first region and set a second point on the second image displayed in the first region. The processor is configured to generate a three-dimensional shape of the subject on the basis of a position and a posture of a camera. The position and the posture are a position and a posture, respectively, when each image of the image group is generated. The three-dimensional shape includes three-dimensional coordinates of at least two points. The processor is configured to measure a size of the subject on the basis of at least the first point, the second point, and the three-dimensional shape.

According to a twentieth aspect of the present invention, a non-transitory computer-readable recording medium saves a program for causing a computer to execute a first image display step, a first setting step, a second image display step, a second setting step, a generation step, and a measurement step. The computer displays one first image in a first region of a display in the first image display step. The first image is a two-dimensional image of a subject. The computer sets a first point on the first image displayed in the first region in the first setting step. The computer hides the first image in the first region and displays one second image included in a plurality of second images in the first region after the first point is set on the first image in the second image display step. Each second image included in the plurality of second images is a two-dimensional image of the subject. Part of a visual field of each image of an image group that consists of the first image and the plurality of second images overlaps part of a visual field of another image of the image group. The computer sets a second point on the second image displayed in the first region in the second setting step. The computer generates a three-dimensional shape of the subject on the basis of a position and a posture of a camera. The position and the posture are a position and a posture, respectively, when each image of the image group is generated in the generation step. The three-dimensional shape includes three-dimensional coordinates of at least two points. The computer measures a size of the subject on the basis of at least the first point, the second point, and the three-dimensional shape in the measurement step.

DETAILED DESCRIPTION OF THE INVENTION

Hereinafter, embodiments of the present invention will be described with reference to the drawings. A measurement device according to each embodiment of the present invention is a device such as a personal computer (PC). The type of a PC is not limited and may be any of a desktop, a laptop, and a tablet. The measurement device may be built-in equipment mounted on a specific device or a system. The measurement device may be environment on a cloud. A subject is an industrial product.

First Embodiment

Figure 1:
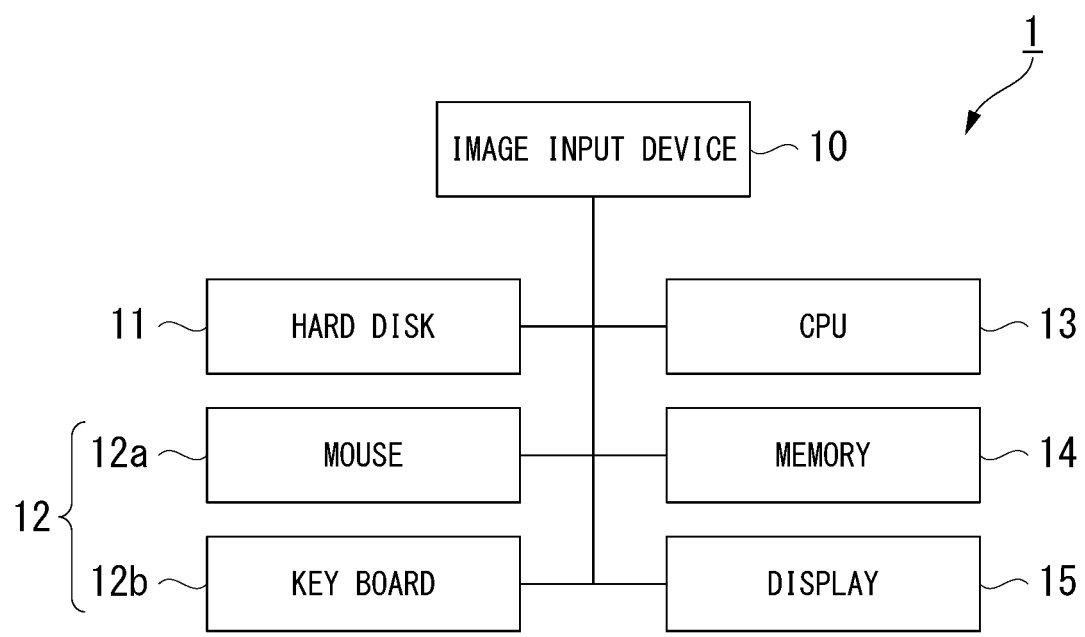
FIG. 1 is a block diagram showing a hardware configuration of a measurement device according to a first embodiment of the present invention.

A first embodiment of the present invention will be described. FIG. 1 shows a hardware configuration of a measurement device 1 according to the first embodiment. The measurement device 1 shown in FIG. 1 includes an image input device 10, a hard disk 11, an operation unit 12, a central processing unit (CPU) 13, a memory 14, and a display 15.

The image input device 10 accepts an image from an external device. For example, the image input device 10 is connected to the external device through a cable or by radio. For example, the external device is a storage device such as a hard disk or a memory. An image stored on the storage device is input to the image input device 10. The external device may be equipment on a network such as a local area network (LAN) or the Internet. The image input device 10 may communicate with the equipment and receive an image from the equipment.

The hard disk 11 stores the image accepted by the image input device 10. The measurement device 1 may include a solid state drive (SSD) instead of the hard disk.

The operation unit 12 is a user interface (input interface). The operation unit 12 includes a mouse 12a and a key board 12b. A user inputs information of a measurement point, a reference point, and the like by operating the mouse 12a and the key board 12b. The operation unit 12 may include at least one of a button, a switch, a key, a joystick, a touch pad, a track ball, and a touch panel.

The CPU 13 executes processing for generation (reconfiguration) of a three-dimensional shape of a subject and measurement. The functions of the CPU 13 will be described later with reference to FIG. 2.

The memory 14 is a volatile or nonvolatile memory. For example, the memory 14 is at least one of a random access memory (RAM), a dynamic random access memory (DRAM), a static random access memory (SRAM), a read-only memory (ROM), an erasable programmable read-only memory (EPROM), an electrically erasable programmable read-only memory (EEPROM), and a flash memory. The memory 14 stores the image accepted by the image input device 10 or an image processed by the CPU 13.

The display 15 is a monitor such as a liquid crystal display. The display 15 may be a touch panel display. In such a case, the operation unit 12 and the display 15 are integrated.

Figure 2:
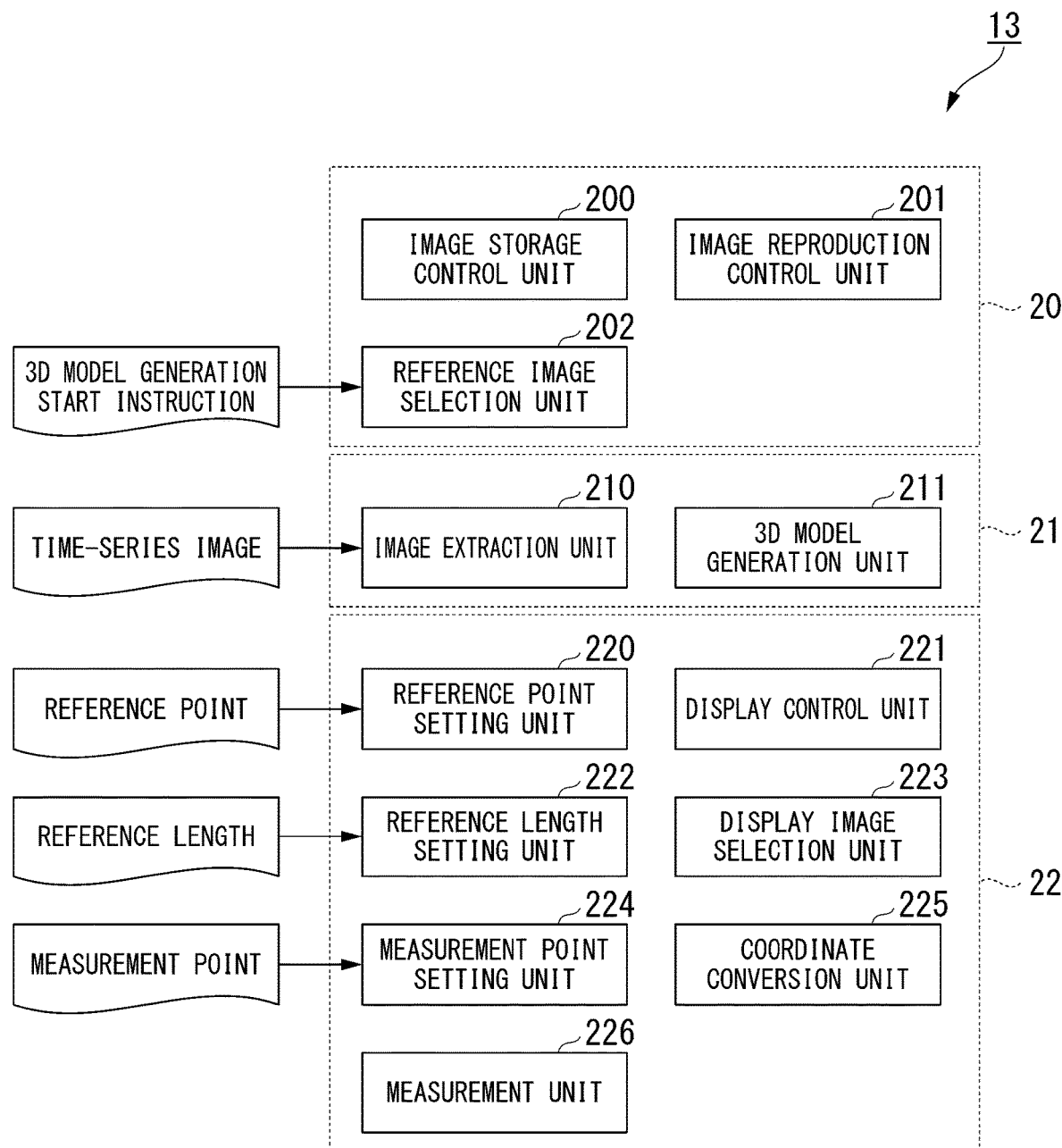
FIG. 2 is a block diagram showing a functional configuration of a CPU included in the measurement device according to the first embodiment of the present invention.

FIG. 2 shows a functional configuration of the CPU 13. An image reproduction unit 20, a 3D model acquisition unit 21, and a measurement processing unit 22 constitute the functions of the CPU 13.

The image reproduction unit 20 includes an image storage control unit 200, an image reproduction control unit 201, and a reference image selection unit 202.

The image storage control unit 200 stores a time-series image accepted by the image input device 10 on the hard disk 11 or the memory 14. The time-series image (image group) includes at least three images generated by a camera. Each image included in the time-series image is a two-dimensional image of a subject. Each image included in the time-series image is associated with another image included in the time-series image in chronological order. For example, the time-series image is video. The time-series image may be continuous still image group to which time-stamps are added. The file extension of video or a still image is not limited.

The image reproduction control unit 201 reproduces the time-series image and displays the time-series image on the display 15. The image reproduction control unit 201 includes a basic image reproduction function such as fast-forwarding, pausing, and rewinding.

The reference image selection unit 202 selects a reference image used for generating a 3D model that represents a three-dimensional shape of a subject. When an image on which a user desires to designate a measurement point or a reference point is displayed, the user inputs a 3D model generation start instruction by operating the operation unit 12. The reference image selection unit 202 accepts the 3D model generation start instruction from the operation unit 12. When the 3D model generation start instruction is accepted, the reference image selection unit 202 selects the image displayed on the display 15 as the reference image.

The 3D model acquisition unit 21 includes an image extraction unit 210 and a 3D model generation unit 211.

The image extraction unit 210 extracts at least three images from the time-series image on the basis of the reference image selected by the reference image selection unit 202. In an example described below, the at least three images include the reference image selected by the reference image selection unit 202.

The 3D model generation unit 211 estimates the position and the posture of a camera. The estimated position and posture are a position and a posture of the camera, respectively, when each image extracted by the image extraction unit 210 is generated. The 3D model generation unit 211 generates a 3D model of a subject on the basis of the estimated position and posture. The 3D model (three-dimensional coordinate group) includes data of three-dimensional coordinates of a subject. The 3D model may include data of three-dimensional coordinates of only at least two points designated by a user. For example, after a reference point and a measurement point described later are set, the 3D model generation unit 211 may generate a 3D model including data of three-dimensional coordinates of only each of the points on the basis of an image on which each of the points has been set.

The generated 3D model may be displayed on the display 15. Alternatively, the generated 3D model may not be displayed on the display 15. An embodiment of the present invention is not affected by the fact whether or not the generated 3D model is displayed.

The measurement processing unit 22 includes a reference point setting unit 220, a display control unit 221, a reference length setting unit 222, a display image selection unit 223, a measurement point setting unit 224, a coordinate conversion unit 225, and a measurement unit 226.

A user inputs position information (coordinates) of a reference point that represents the position of the reference size by operating the operation unit 12. The reference point setting unit 220 accepts the position information of a reference point from the operation unit 12. When the position information of a reference point is accepted, the reference point setting unit 220 sets the reference point on an image displayed on the display 15. The reference point is set at the position represented by the position information on the image. The position information of the reference point is stored on the hard disk 11 or the memory 14. The reference point is set by associating the reference point with a specific image.

A user inputs a reference length that represents the reference size by operating the operation unit 12. The reference length setting unit 222 accepts the reference length from the operation unit 12. The reference length is used for matching the 3D model with the actual scale of a subject. When the reference length is accepted, the reference length setting unit 222 sets the reference length on an image displayed on the display 15. The reference length is stored on the hard disk 11 or the memory 14. The reference length is set by associating the reference length with a specific image.

Hereinafter, a case in which a reference point and a reference length are set on the basis of an instruction from a user is assumed. A reference point and a reference length may be automatically set. For example, information of a reference point and a reference length designated by a user in advance is stored on the hard disk 11 or the memory 14. The information may represent a reference point and a reference length that were set when measurement was previously executed. A reference point and a reference length are set on the basis of the information.

A user inputs position information (coordinates) of a measurement point that represents the measurement position by operating the operation unit 12. The measurement point setting unit 224 accepts the position information of a measurement point from the operation unit 12. When the position information of a measurement point is accepted, the measurement point setting unit 224 sets the measurement point on an image displayed on the display 15. The measurement point is set at the position represented by the position information on the image. The position information of the measurement point is stored on the hard disk 11 or the memory 14. The measurement point is set by associating the measurement point with a specific image. At least two measurement points are necessary in order to execute measurement.

Designation of a measurement point or a reference point means that a user instructs the measurement device 1 of the measurement point or the reference point. A user designates a measurement point or a reference point by designating a position on an image. The setting of a measurement point means that the measurement point setting unit 224 associates the measurement point with an image. The setting of a reference point means that the reference point setting unit 220 associates the reference point with an image.

Hereinafter, there is a case in which a point that has been set on an image is described as a designation point in order to indicate any one of a measurement point and a reference point. A designation point is expression including a measurement point and a reference point. In order to put emphasis on the understandability of description, there is a case in which a measurement point or a reference point is used instead of a designation point.

Although a term "point" is used for the convenience of description in the specification, a designation point does not need to be one point corresponding to one pixel on the screen. A designation point may include a region having an arbitrary size. A designation point may include a region that can be designated in units of sub-pixels.

The display control unit 221 displays one of at least three images extracted by the image extraction unit 210 on the display 15. After the 3D model is generated, the display control unit 221 displays the reference image (first image) selected by the reference image selection unit 202 on the display 15. After the designation point is set on the reference image on the basis of the position information of the designation point input by a user, the display control unit 221 switches images displayed on the display 15. In other words, the display control unit 221 hides the reference image and displays another image (second image) excluding the reference image on the display 15. The designation point is set on the image on the basis of the position information of the designation point input by a user. After measurement is executed, the display control unit 221 displays a measurement result on the image.

A user inputs an image switching instruction by operating the operation unit 12. The display image selection unit 223 accepts the image switching instruction from the operation unit 12. When the image switching instruction is accepted, the display image selection unit 223 selects one of at least three images extracted by the image extraction unit 210. The display control unit 221 displays the image selected by the display image selection unit 223 on the display 15.

The coordinate conversion unit 225 executes coordinate conversion by using the reference point and the reference length. Specifically, the coordinate conversion unit 225 converts the 3D model generated by the 3D model generation unit 211 into a 3D model having the dimension of length. Before the coordinate conversion is executed, the 3D model does not have the dimension of length and the length on the 3D model has not been decided. The 3D model has only similarity relationship with the size of an actual subject.

The measurement unit 226 calculates three-dimensional coordinates corresponding to each measurement point on the basis of at least two measurement points and the 3D model. The measurement unit 226 measures the three-dimensional size of a subject on the basis of three-dimensional coordinates corresponding to each measurement point. A position on the image used for generating the 3D model and a position on the 3D model are associated with each other. After a measurement point is designated on an image, the measurement unit 226 is able to acquire three-dimensional coordinates corresponding to the measurement point. Similarly, after a reference point is designated on an image, the coordinate conversion unit 225 is able to acquire three-dimensional coordinates corresponding to the reference point.

At least one of blocks in the CPU 13 shown in FIG. 2 may be constituted by a circuit other than the CPU 13. Each unit in the CPU 13 may be constituted by at least one of a processor and a logic circuit. For example, the processor is at least one of a CPU, a digital signal processor (DSP), and a graphics processing unit (GPU). For example, the logic circuit is at least one of an application specific integrated circuit (ASIC) and a field-programmable gate array (FPGA). Each unit in the CPU 13 may include one or a plurality of processors. Each unit in the CPU 13 may include one or a plurality of logic circuits.

The CPU 13 may read a program and execute the read program. The program includes commands defining the operations of the CPU 13. In other words, the functions of the CPU 13 may be realized by software. The program, for example, may be provided by using a "computer-readable storage medium" such as a flash memory. The program may be transmitted from the computer storing the program to the measurement device 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). A combination of a program that has already been recorded in a computer and a differential program may realize the functions described above.

In the first embodiment, for the convenience of description, a case in which the minimum number of designation points necessary for executing measurement is designated by a user is assumed. The minimum number is four. Even when the number of designation points exceeds four, the method of measurement is basically the same as that in a case in which four points are designated. For this reason, cases in which more than four points are designated will not be described.

Hereinafter, two reference points are designated and the reference length between the two reference points are designated. Hereinafter, two measurement points are designated.

Figure 3:
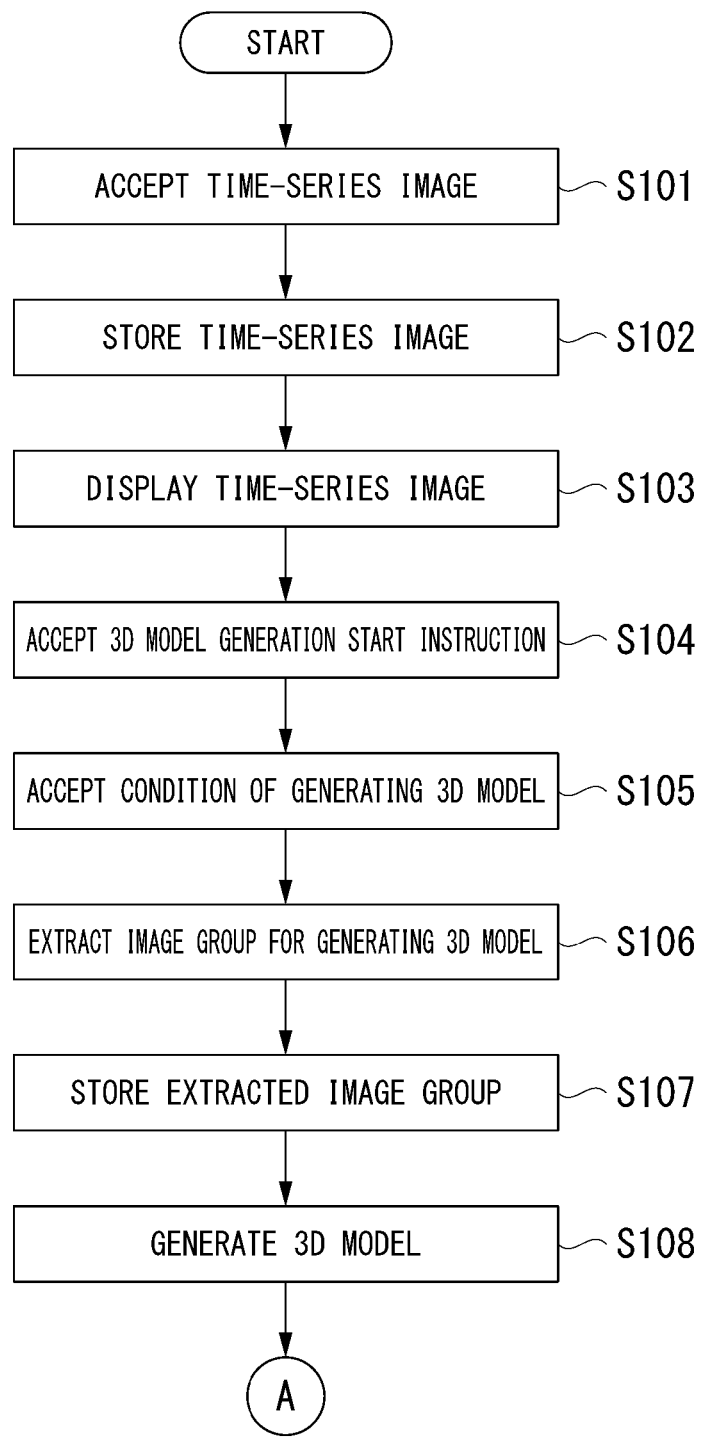
FIG. 3 is a flow chart showing a procedure of processing executed by the measurement device according to the first embodiment of the present invention.
Figure 4:
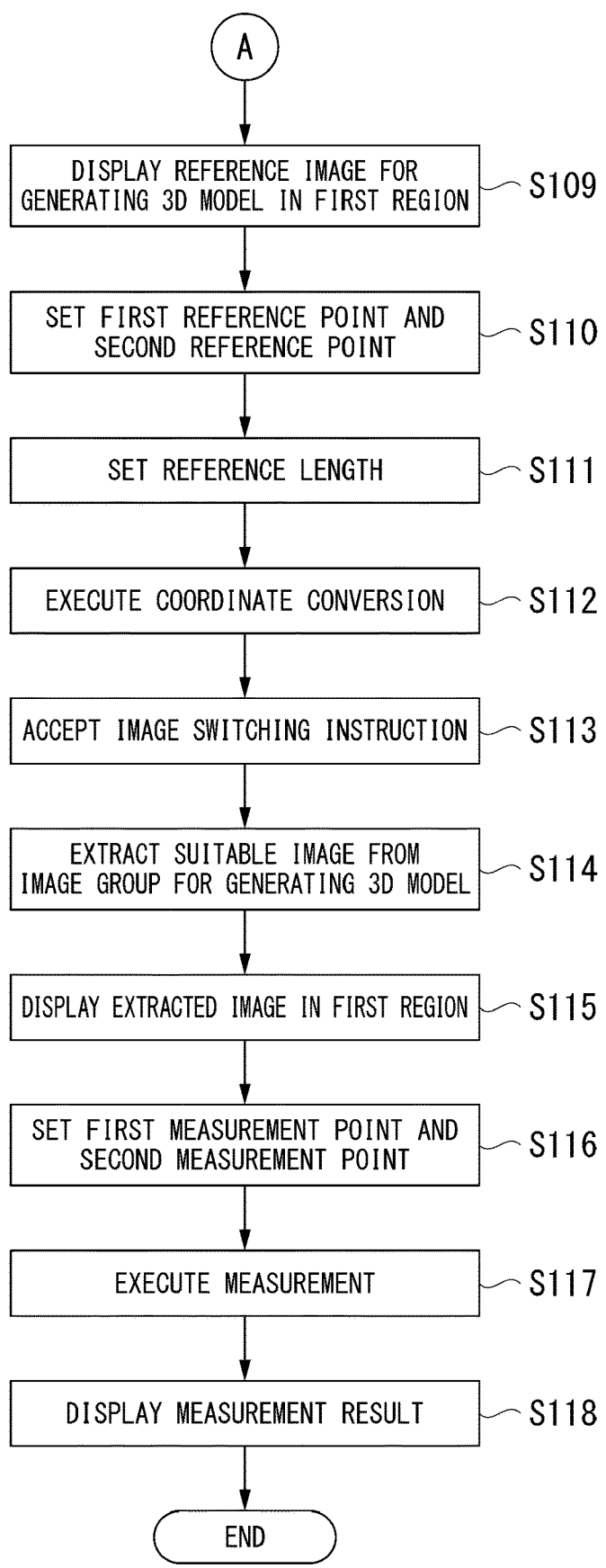
FIG. 4 is a flow chart showing a procedure of processing executed by the measurement device according to the first embodiment of the present invention.

A procedure of processing executed for generation of a 3D model and measurement will be described with reference to FIG. 3 and FIG. 4. FIG. 3 and FIG. 4 show a procedure of processing executed by the CPU 13.

The image storage control unit 200 controls the image input device 10 and accepts a time-series image including a plurality of images (Step S101). After Step S101, the image storage control unit 200 stores the time-series image on the hard disk 11 or the memory 14 (Step S102). After Step S102, the image reproduction control unit 201 reads the time-series image from the hard disk 11 or the memory 14 and displays each image included in the time-series image on the display 15 in order (Step S103).

After the image is displayed, a user confirms each image included in the time-series image by using the basic image reproduction function. A user determines whether or not an object for measurement is on a subject. When a user confirms that the object for measurement is on the subject, the user inputs a 3D model generation start instruction by operating the operation unit 12. The reference image selection unit 202 accepts the 3D model generation start instruction from the operation unit 12 and selects the image displayed on the display 15 as a reference image (Step S104).

Figure 5:
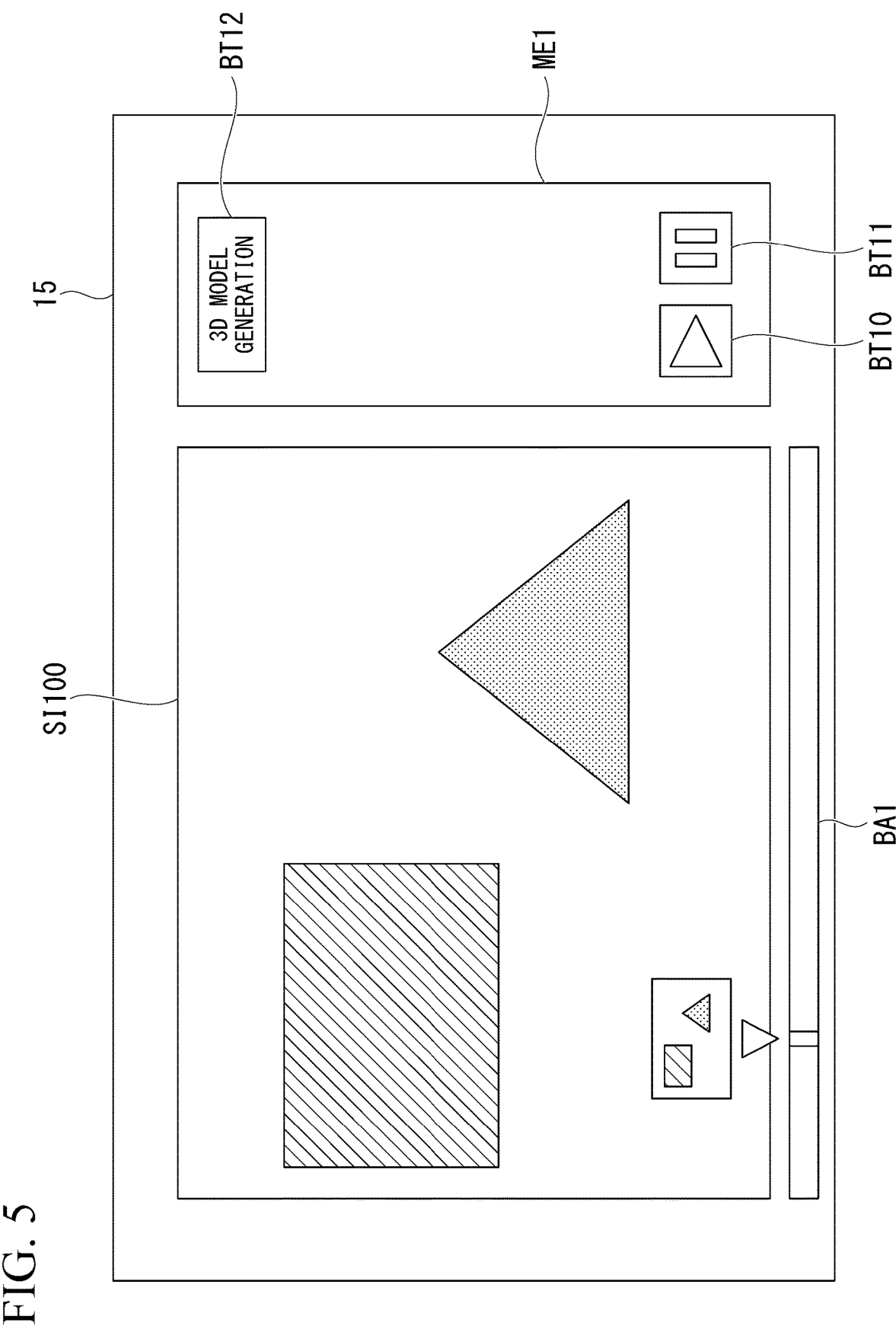
FIG. 5 is a diagram showing an example of an image displayed on a display included in the measurement device according to the first embodiment of the present invention.

FIG. 5 shows an example of an image displayed on the display 15 in Step S104. An image SI100, a menu ME1, and a seek bar BA1 are displayed on the screen of the display 15.

The image SI100 is one still image included in the time-series image. The menu ME1 provides a user with a reproduction function of the time-series image. The seek bar BA1 represents the position of the image SI100 in the time-series image.

A button BT10, a button BT11, and a button BT12 are displayed on the menu ME1. The button BT10 is a button for instructing reproduction of the time-series image. The button BT11 is a button for pausing reproduction of the time-series image. The button BT12 is a button for inputting the 3D model generation start instruction. A user can press each button through the operation unit 12. In a case in which the display 15 is a touch panel, a user can press each button on the screen.

A user controls reproduction of the time-series image by pressing the button BT10 or the button BT11. A user confirms whether or not the object for measurement is present in each image of the time-series image while performing such operation. While the image SI100 in which the object for measurement is seen is displayed, a user pauses reproduction of the time-series image by pressing the button BT11. A user inputs the 3D model generation start instruction by pressing the button BT12.

After the 3D model generation start instruction is input, a user inputs information that represents a condition for generating a 3D model of a subject by operating the operation unit 12. The 3D model generation unit 211 accepts the condition for generating a 3D model of a subject on the basis of the input information (Step S105). Specifically, the condition includes an internal parameter of a camera, a distortion correction parameter of the camera, a setting value, and the like. The setting value is used for a variety of pieces of processing for generating a 3D model. A user does not need to designate all of these conditions. The CPU 13 may automatically set at least one of these conditions. The information accepted by the 3D model generation unit 211 is stored on the hard disk 11 or the memory 14.

After Step S105, the image extraction unit 210 extracts at least three images from the time-series image (Step S106). The at least three images include the reference image selected by the reference image selection unit 202. The image extraction unit 210 stores at least three images extracted in Step S106 on the hard disk 11 or the memory 14 (Step S107).

For example, the image extraction unit 210 extracts an image having a time point in a predetermined period after the time point that the reference image has from the time-series image. The image extraction unit 210 may extract an image having a time point in a predetermined period before the time point that the reference image has from the time-series image and may extract an image having a time point in a predetermined period after the time point that the reference image has from the time-series image. The image extraction unit 210 may extract only an image having a time point in a predetermined period before the time point that the reference image has from the time-series image.

The image extraction unit 210 may extract a predetermined number of images having a time point after the time point that the reference image has from the time-series image. The image extraction unit 210 may extract a predetermined number of images having a time point before the time point that the reference image has from the time-series image and may extract a predetermined number of images having a time point after the time point that the reference image has from the time-series image. The image extraction unit 210 may extract only a predetermined number of images having a time point before the time point that the reference image has from the time-series image.

The method by which the image extraction unit 210 extracts at least three images from the time-series image is not limited to the above-described method. At least three images extracted by the image extraction unit 210 do not need to include the reference image.

After Step S107, the 3D model generation unit 211 estimates the position and the posture of a camera when each image extracted by the image extraction unit 210 is generated. The 3D model generation unit 211 generates a 3D model of a subject on the basis of the estimated position and posture (Step S108). The generated 3D model is stored on the hard disk 11 or the memory 14.

After Step S108, the display control unit 221 displays one of at least three images extracted by the image extraction unit 210 in a first region of the display 15. Specifically, the display control unit 221 displays the reference image selected by the reference image selection unit 202 in the first region of the display 15 (Step S109).

Figure 6:
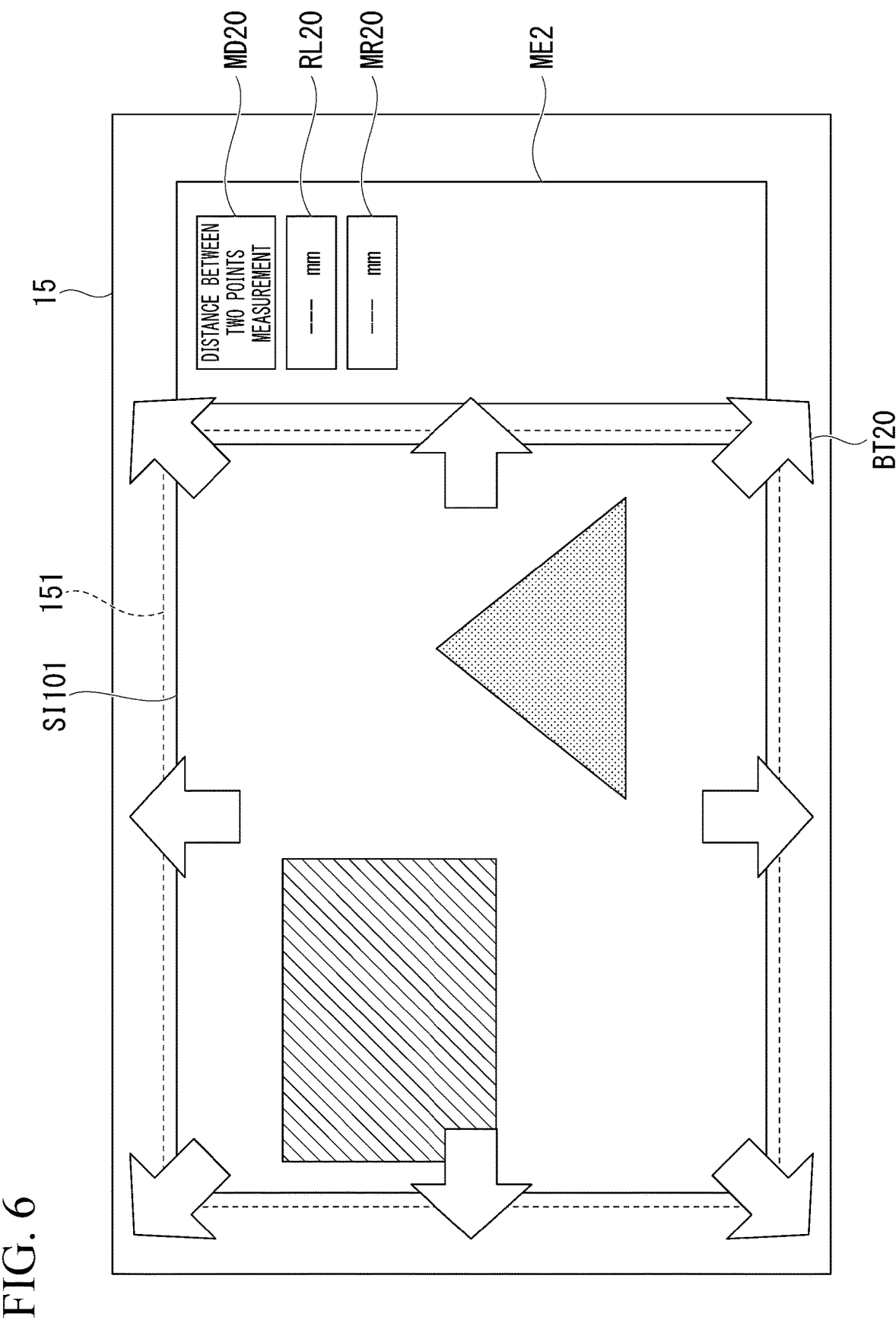
FIG. 6 is a diagram showing an example of an image displayed on the display included in the measurement device according to the first embodiment of the present invention.

FIG. 6 shows an example of an image displayed on the display 15 in Step S109. A reference image SI101, a menu ME2, and eight buttons BT20 are displayed on the screen of the display 15.

The reference image SI101 is displayed in a first region 151 of the display 15. The eight buttons BT20 are buttons for switching images displayed in the first region 151. A user can press each button BT20 through the operation unit 12. In a case in which the display 15 is a touch panel, a user can press each button BT20 on the screen. Each button BT20 represents a direction in which the visual field moves when images are switched. Processing executed when a user presses each button BT20 will be described later.

The menu ME2 provides a user with a measurement function. A measurement mode MD20, a reference length setting RL20, and a measurement result MR20 are displayed on the menu ME2. The measurement mode MD20 represents any one of distance between two points measurement, line-based measurement, plane-based measurement, and the like. In the example shown in FIG. 6, the measurement mode MD20 represents distance between two points measurement. A user can change the setting of the measurement mode MD20 by operating the operation unit 12. The reference length setting RL20 represents a reference length input by a user. A user can input a reference length to the reference length setting RL20 by operating the operation unit 12. In the example shown in FIG. 6, a reference length is not displayed since the reference length has not been input yet. The measurement result MR20 represents the size measured by the measurement unit 226. In the example shown in FIG. 6, the size is not displayed since measurement has not been executed yet.

After the reference image SI101 is displayed on the display 15, a user designates a reference point, a reference length, and a measurement point. Hereinafter, an example in which a user designates two reference points, a reference length, and two measurement points in this order will be described. There is no limitation to this order and the order may be changed.

A user designates a first reference point and a second reference point on the reference image SI101 displayed on the display 15 by operating the operation unit 12. The reference point setting unit 220 accepts the first reference point and the second reference point designated by a user from the operation unit 12. The reference point setting unit 220 sets the first reference point and the second reference point designated by a user on the reference image SI101 (Step S110). In a case in which the display 15 is a touch panel, a user can designate each reference point by touching the position of each reference point on the display 15.

After the two reference points are designated, a user designates a reference length that represents the distance between the two reference points by operating the operation unit 12. A user designates the length that the user already knows as a numerical value. The reference length setting unit 222 accepts the reference length designated by a user from the operation unit 12. The reference length setting unit 222 sets the reference length designated by a user to the reference image SI101 (Step S111).

After Step S111, the coordinate conversion unit 225 converts the 3D model generated in Step S108 into a 3D model having the dimension of length (Step S112). At this time, the coordinate conversion unit 225 uses the two reference points set in Step S110 and the reference length set in Step S111.

It is not essential to input a reference length. For example, in a case in which the distance between the two reference points is normalized as "1" or "100%", measurement of the relative size is possible. For example, in a case in which the reference length is set to 2 mm, measurement of the absolute size having the dimension of length is possible.

Figure 7:
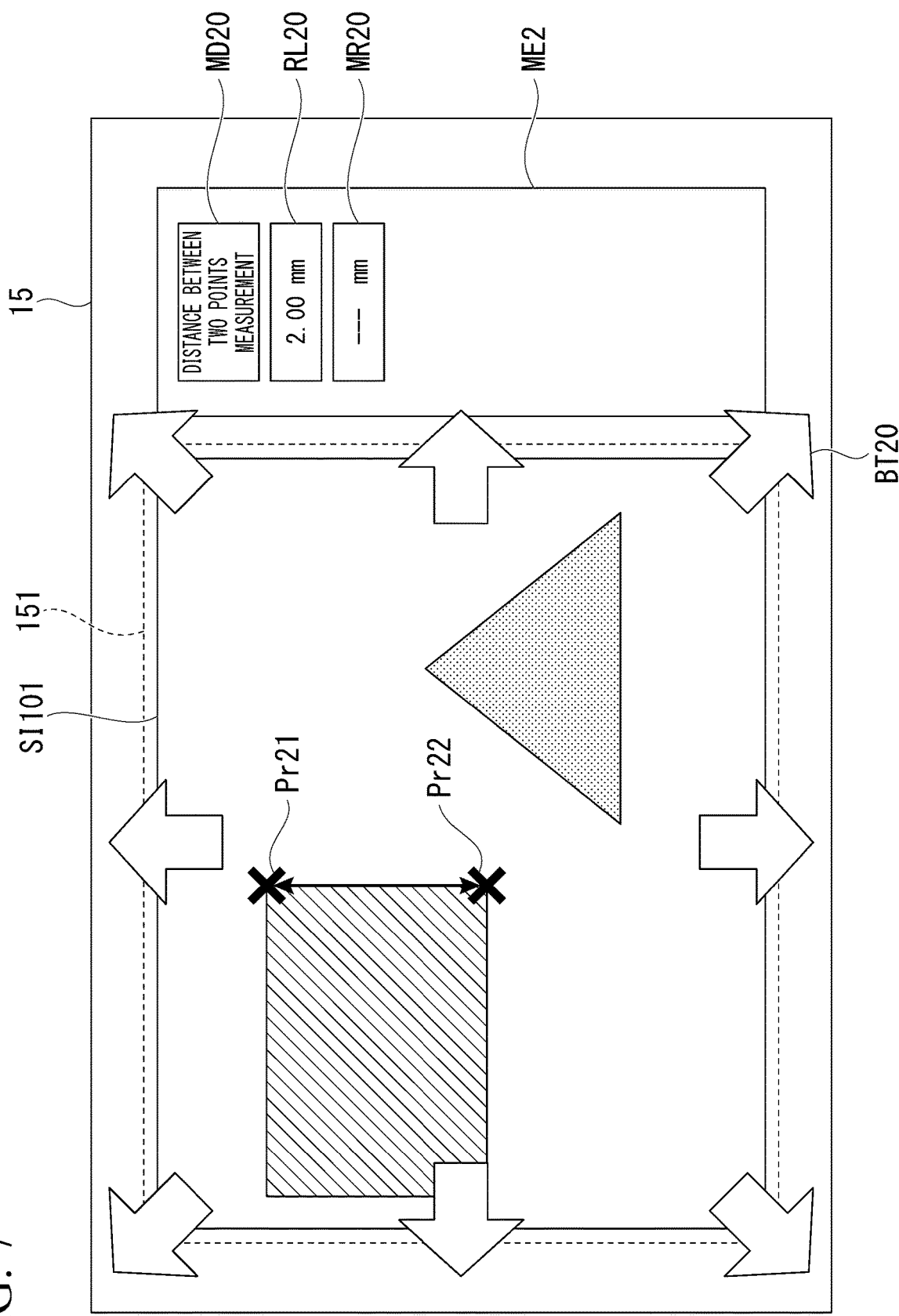
FIG. 7 is a diagram showing an example of an image displayed on the display included in the measurement device according to the first embodiment of the present invention.

FIG. 7 shows an example of an image displayed on the display 15 after the reference length is set in Step S111. The same part as that shown in FIG. 6 will not be described.

A first reference point Pr21 and a second reference point Pr22 are displayed on the reference image SI101. A mark that represents each reference point is displayed on the image. Hereinafter, this mark is called a reference point. The reference length (2 mm) designated by a user is displayed in the reference length setting RL20.

Hereinafter, a case in which a measurement point that a user desires to designate is not seen in the reference image SI101 is assumed. A user presses one of the eight buttons BT20 by operating the operation unit 12. In this way, a user inputs an image switching instruction. After Step S112, the display image selection unit 223 accepts the image switching instruction from the operation unit 12 (Step S113).

After Step S113, the display image selection unit 223 selects one image having a visual field that is present in the direction represented by the button BT20 pressed by a user from at least three images extracted in Step S106 (Step S114).

Figure 8:
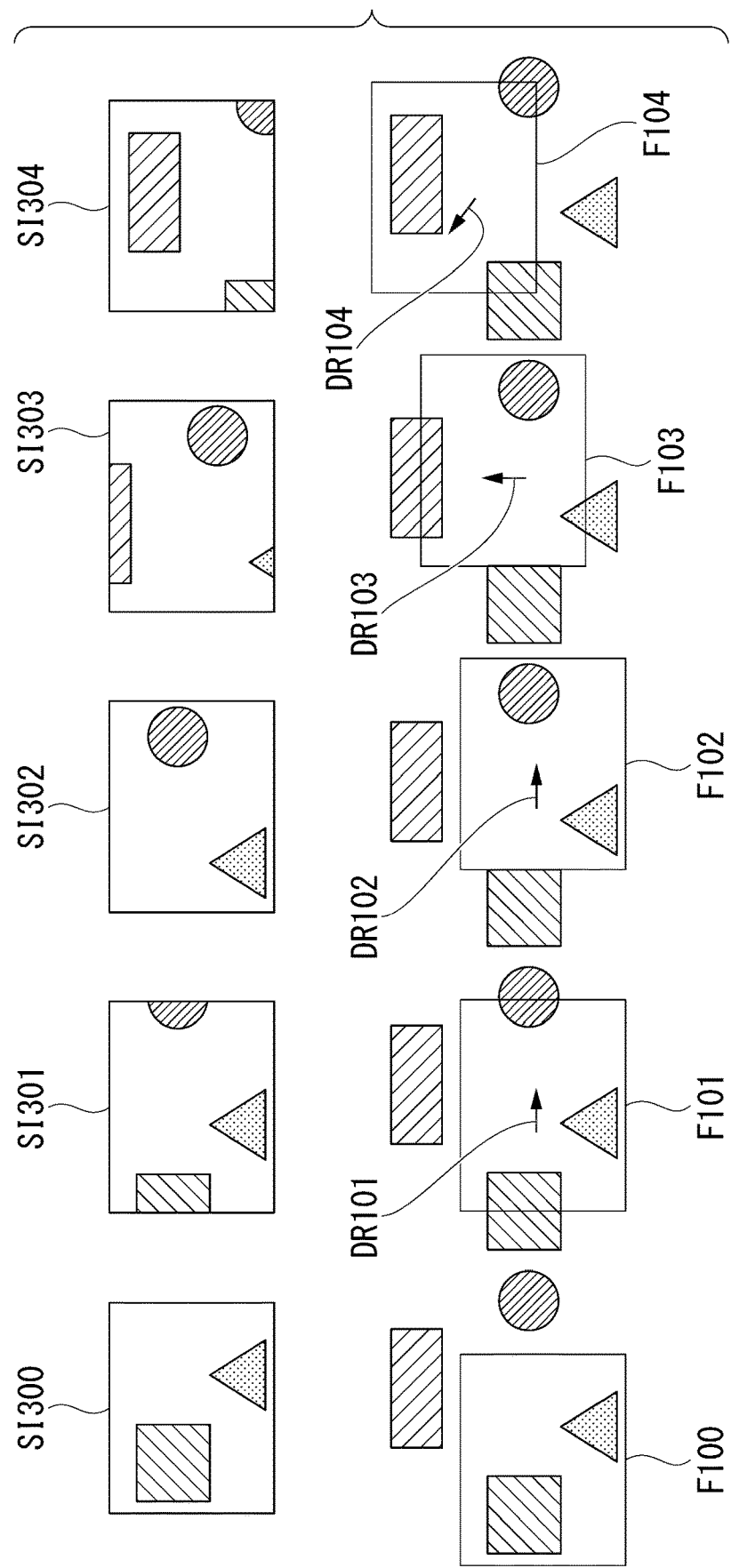
FIG. 8 is a diagram showing each image and its visual field in the first embodiment of the present invention.

An example of the processing executed in Step S114 will be described with reference to FIG. 8. FIG. 8 shows each image and its visual field. Images SI300 to SI304 are five images extracted in Step S106. The five images are arranged in chronological order. A camera generates an Image SI300, an Image SI301, an Image SI302, an Image SI303, and an Image SI304 in this order. The image SI300 is a reference image.

A visual field when each image was captured is shown on the lower side of each image shown in FIG. 8. A visual field F101 of the Image SI301 moves in a right direction DR101 compared to a visual field F100 of the Image SI300. A visual field F102 of the Image SI302 moves in a right direction DR102 compared to the visual field F101 of the Image SI301. A visual field F103 of the Image SI303 moves in an upper direction DR103 compared to the visual field F102 of the Image SI302. A visual field F104 of the Image SI304 moves in an upper left direction DR104 compared to the visual field F103 of the Image SI303.

For example, the display image selection unit 223 associates a moving direction of a visual field between two images next to each other in chronological order with each image. When a user presses the button BT20, the display image selection unit 223 selects one image having a visual field that is present in the direction represented by the pressed button BT20.

For example, when the image SI300 shown in FIG. 8 is displayed on the display 15, only the button BT20 that represents the right direction becomes valid and the other buttons BT20 become invalid. On the other hand, when the image SI302 shown in FIG. 8 is displayed on the display 15, only the button BT20 that represents the upper direction and the button BT20 that represents the left direction become valid and the other buttons BT20 become invalid.

The method by which a moving direction of a visual field is associated with each image is not limited to the above-described method. For example, the display image selection unit 223 may associate a moving direction of a visual field between arbitrary two images with each image. Arbitrary two images are not necessarily next to each other in chronological order.

Figure 9:
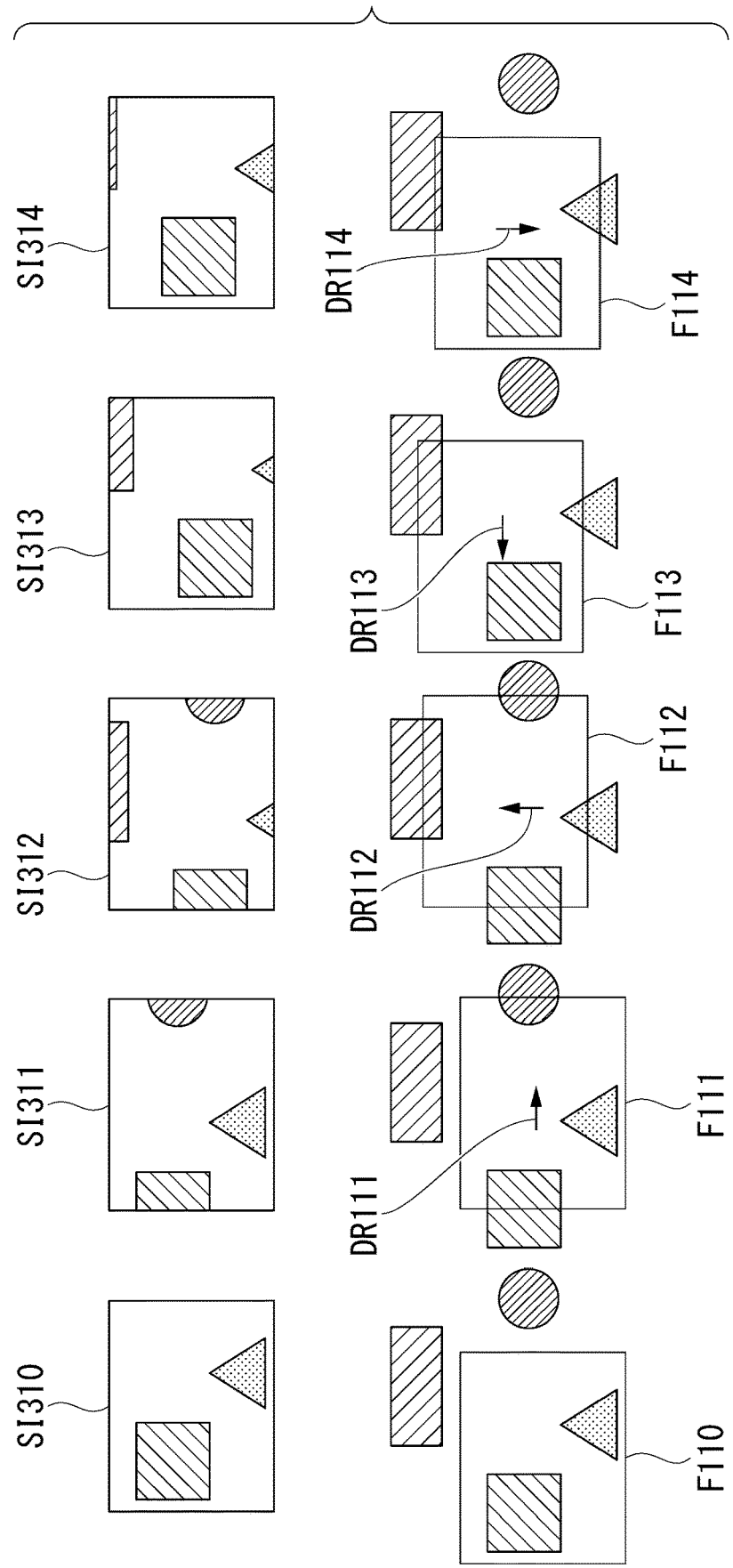
FIG. 9 is a diagram showing each image and its visual field in the first embodiment of the present invention.

An example of the processing in which a moving direction of a visual field between arbitrary two images is associated with each image will be described with reference to FIG. 9. FIG. 9 shows each image and its visual field. Images SI310 to SI314 are five images extracted in Step S106. The five images are arranged in chronological order. A camera generates an Image SI310, an Image SI311, an Image SI312, an Image SI313, and an Image SI314 in this order.

A visual field when each image was captured is shown on the lower side of each image shown in FIG. 9. A visual field F111 of the Image SI311 moves in a right direction DR111 compared to a visual field F110 of the Image SI310. A visual field F112 of the Image SI312 moves in an upper direction DR112 compared to the visual field F111 of the Image SI311. A visual field F113 of the Image SI313 moves in a left direction DR113 compared to the visual field F112 of the Image SI312. A visual field F114 of the Image SI314 moves in a lower direction DR114 compared to the visual field F113 of the Image SI313.

The display image selection unit 223 analyzes a moving direction of a visual field between the image SI310 and another image. The visual field F111 of the Image SI311 moves in the right direction compared to the visual field F110 of the Image SI310. The visual field F112 of the Image SI312 moves in the upper right direction compared to the visual field F110 of the Image SI310. The visual field F113 of the Image SI313 and the visual field F114 of the Image SI314 move in the upper direction compared to the visual field F110 of the Image SI310. When the image SI310 is displayed on the display 15, only the button BT20 that represents the right direction, the button BT20 that represents the upper right direction, and the button BT20 that represents the upper direction become valid and the other buttons BT20 become invalid.

As long as the measurement device 1 is able to use information that represents a moving direction of a visual field between two images, the information may be generated by using any method.

The known image processing technology such as the optical flow method or the template matching can be used for detecting a moving direction of a visual field. In the above-described example, the eight buttons BT20 that represent eight directions are displayed on the display 15. The number of buttons for designating a moving direction of a visual field is not limited to eight. Four buttons that represent four directions or sixteen buttons that represent sixteen directions may be displayed on the display 15. A scroll bar or the like may be displayed instead of a button. As long as it is possible for a user to switch images displayed on the display 15, a user interface on the display 15 may be any component.

After Step S114, the display control unit 221 hides the reference image and displays the image selected in Step S114 in the first region of the display 15 (Step S115).

Figure 10:
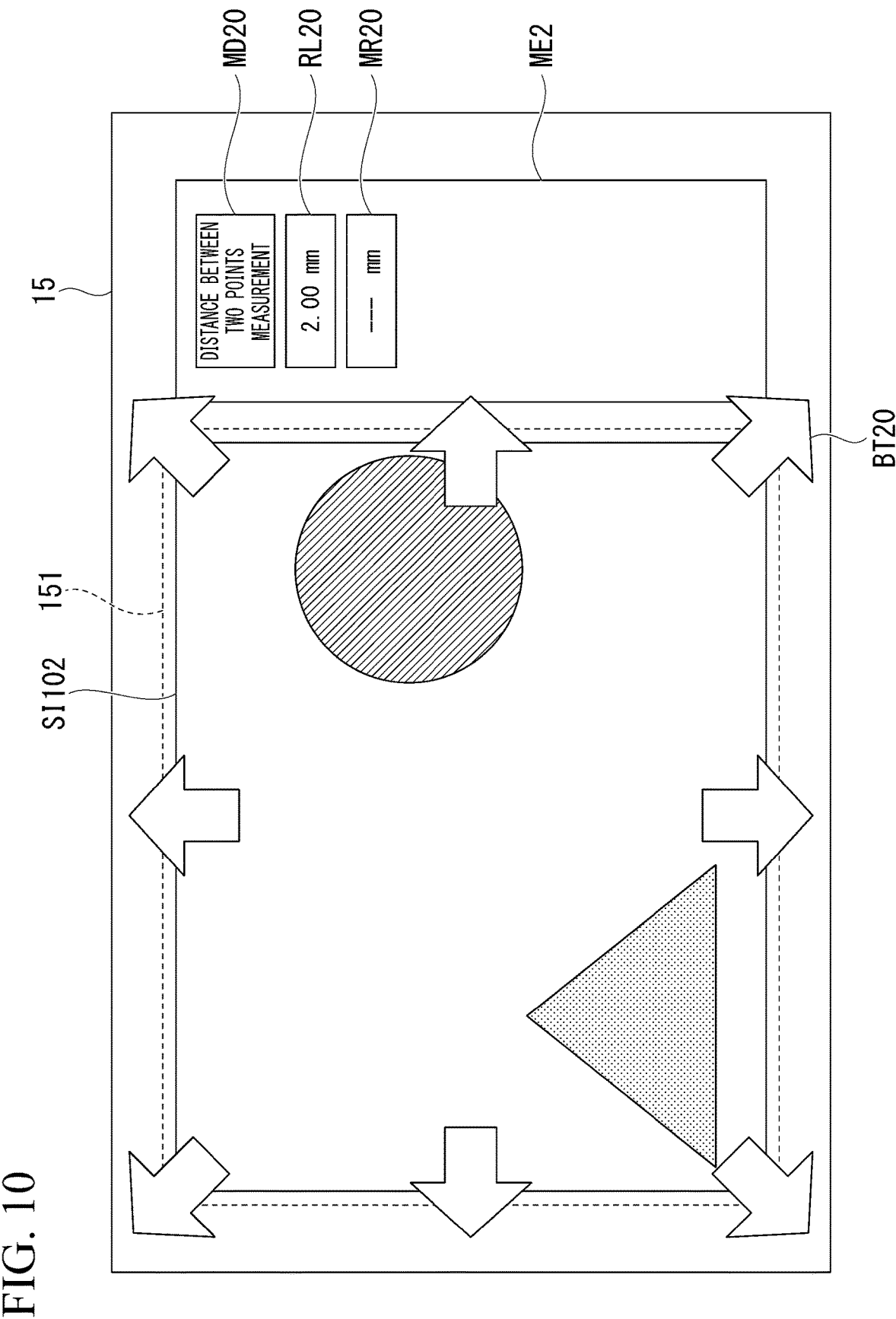
FIG. 10 is a diagram showing an example of an image displayed on the display included in the measurement device according to the first embodiment of the present invention.

FIG. 10 shows an example of an image displayed on the display 15 in Step S115. The same part as that shown in FIG. 7 will not be described.

The reference image SI101 shown in FIG. 7 corresponds to the image SI300 shown in FIG. 8. When the first reference point Pr21 and the second reference point Pr22 shown in FIG. 7 are designated by a user and one of the buttons BT20 is pressed, the display control unit 221 displays an image SI102 shown in FIG. 10 in the first region 151 of the display 15. At this time, the reference image SI101 becomes hided. The image SI102 corresponds to the image SI302 shown in FIG. 8. In the example shown in FIG. 10, a case in which the button BT20 that represents the right direction is pressed twice is assumed.

The entire reference image SI101 does not need to be hided. A partial region of the reference image SI101 including the first reference point Pr21 and the second reference point Pr22 may be hided and the image SI102 may be displayed in the region. The remaining region of the reference image SI101 excluding the region that has been hided may be displayed.

After images are switched, a user designates a first measurement point and a second measurement point on the image displayed on the display 15 by operating the operation unit 12. The measurement point setting unit 224 accepts the first measurement point and the second measurement point designated by a user from the operation unit 12. The measurement point setting unit 224 sets the first measurement point and the second measurement point designated by a user on the image displayed on the display 15 (Step S116). In a case in which the display 15 is a touch panel, a user can designate each measurement point by touching the position of each measurement point on the display 15.

After Step S116, the measurement unit 226 detects a point on the 3D model corresponding to each of the first measurement point and the second measurement point. The measurement unit 226 measures the size defined by the two measurement points designated by a user on the basis of three-dimensional coordinates of each detected point (Step S117).

After Step S117, the display control unit 221 displays the size measured in Step S117 as a measurement result on the display 15 (Step S118). For example, the measurement result is superimposed on the image displayed on the display 15. When Step S118 is executed, the processing shown in FIG. 3 and FIG. 4 is completed.

Figure 11:
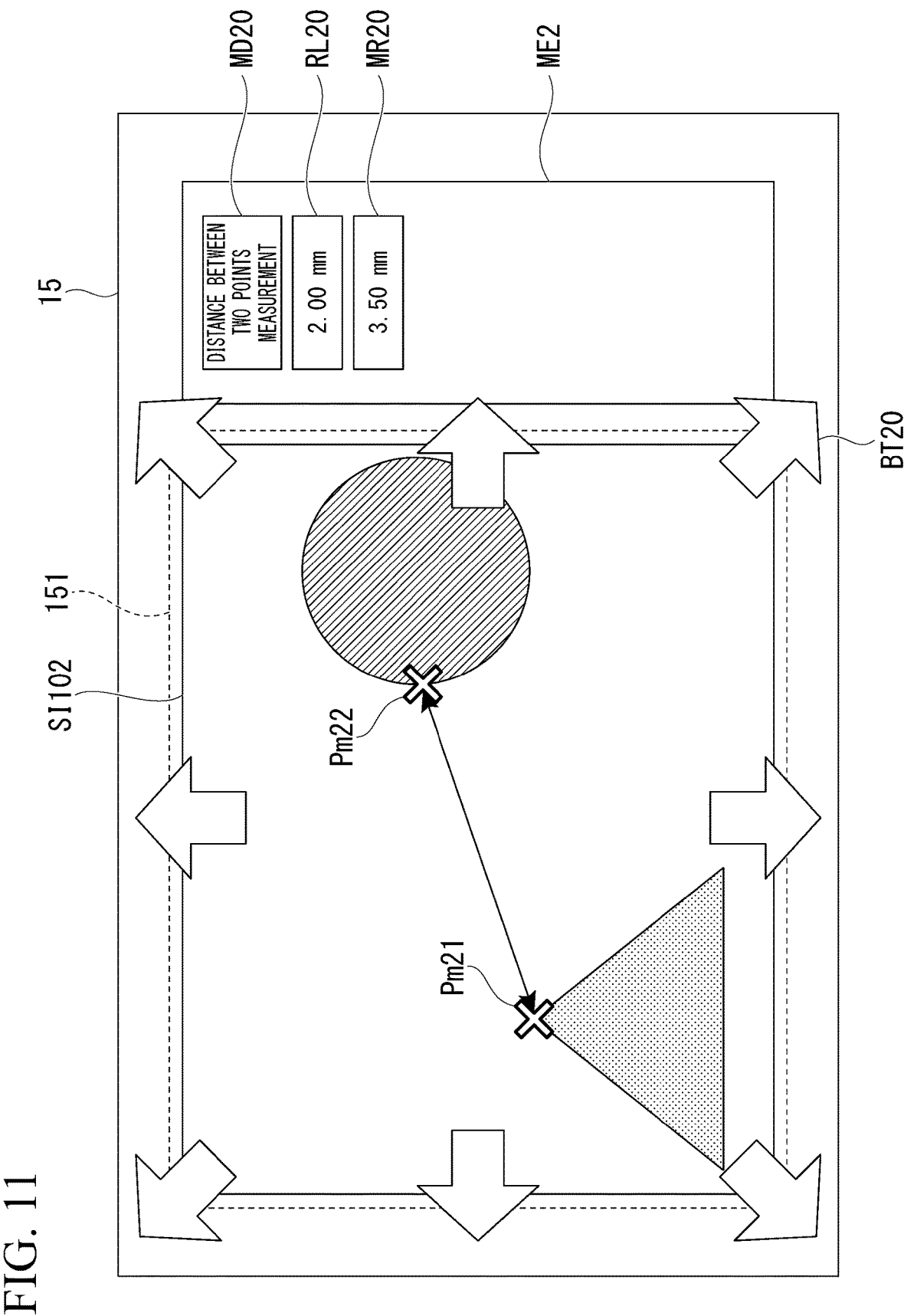
FIG. 11 is a diagram showing an example of an image displayed on the display included in the measurement device according to the first embodiment of the present invention.

FIG. 11 shows an example of an image displayed on the display 15 in Step S118. The same part as that shown in FIG. 10 will not be described.

A first measurement point Pm21 and a second measurement point Pm22 are displayed on the image SI102. A mark that represents each measurement point is displayed on the image. Hereinafter, this mark is called a measurement point. The first measurement point Pm21 and the second measurement point Pm22 are not seen in the reference image SI101 shown in FIG. 7. The distance between the first measurement point Pm21 and the second measurement point Pm22 is displayed as the measurement result MR20.

The order of processing executed by the CPU 13 is not limited to the order shown in FIG. 3 and FIG. 4. For example, as long as Step S108 is executed before Step S112 is executed, Step S108 may be executed at any timing between Step S107 and Step S117.

Steps S113 to S116 may be repeatedly executed. In step S116, at least one measurement point is set. Therefore, at least one measurement point may be set on each of two or more images.

A procedure of specific processing executed by the 3D model generation unit 211 in Step S108 will be described. The 3D model generation unit 211 uses at least three images extracted by the image extraction unit 210 and the condition accepted in Step S105. Hereinafter, an example in which the 3D model generation unit 211 uses two images will be described. When a camera captures two images, two viewpoints of the camera are different from each other. Even when three or more images are used, a basic principle is not changed from that of the case in which two images are used. A method described below may be applied also to a case in which three or more images are used.

Figure 12:
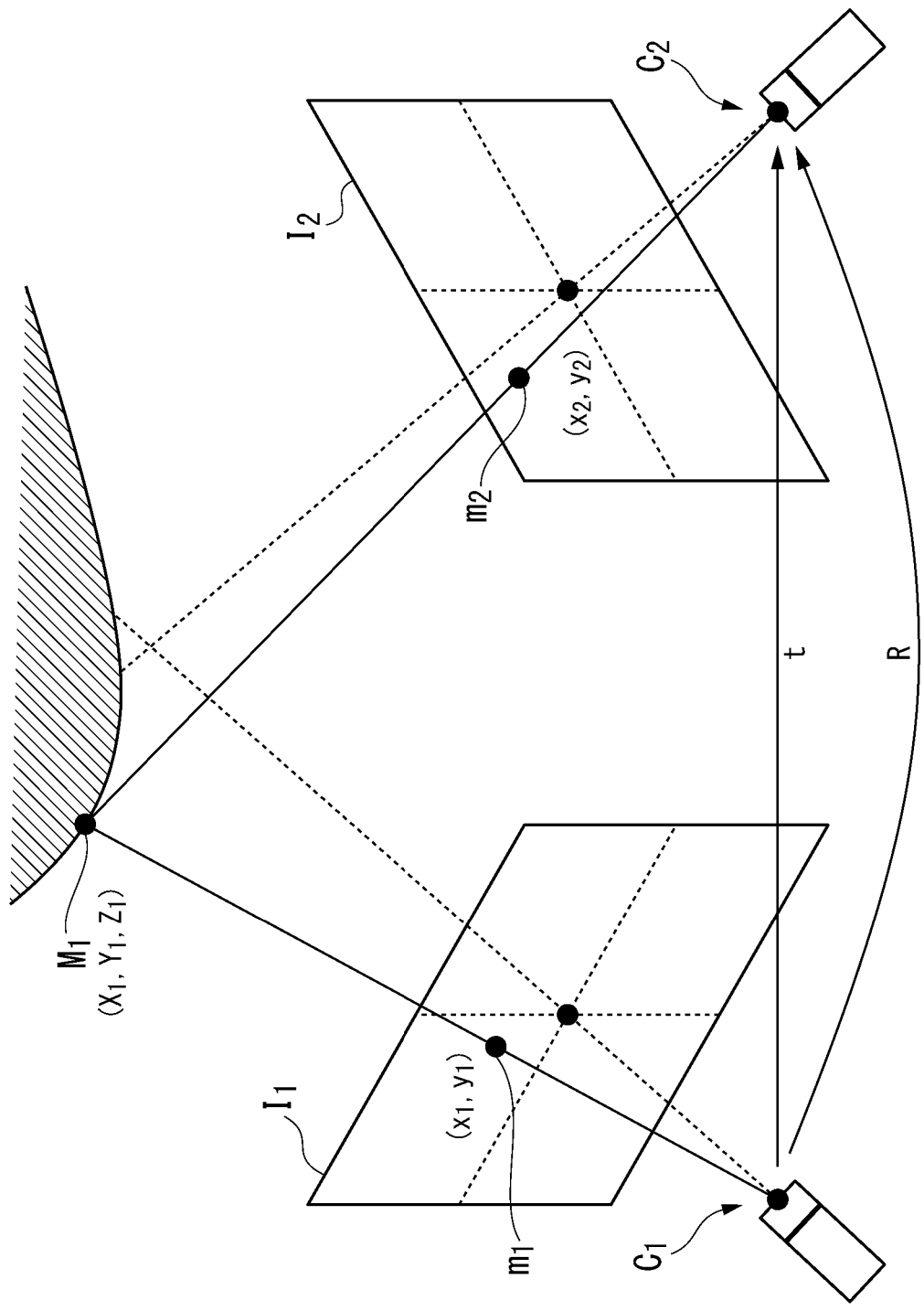
FIG. 12 is a schematic diagram showing a situation of image acquisition in the first embodiment of the present invention.

FIG. 12 schematically shows a status of image acquisition in a case in which two images of a subject are acquired. As shown in FIG. 12, first, an image $I_1$ is acquired in an imaging state $c_1$ of the camera. Next, an image $I_2$ is acquired in an imaging state $c_2$ of the camera. At least one of an imaging position and an imaging posture is different between the imaging state $c_1$ and the imaging state $c_2$. In the case shown in FIG. 12, both the imaging position and the imaging posture are different between the imaging state $c_1$ and the imaging state $c_2$.

In each embodiment of the present invention, it is assumed that the image $I_1$ and the image $I_2$ are acquired by the same camera. In addition, in each embodiment of the present invention, it is assumed that parameters of an objective optical system of the camera do not change. The parameters of the objective optical system are a focal distance, a distortion aberration, a pixel size of an image sensor, and the like. Hereinafter, for the convenience of description, the parameters of the objective optical system will be abbreviated to internal parameters. When such conditions are assumed, the internal parameters describing characteristics of the optical system of the camera can be used in common regardless of the position and the posture of the camera. In each embodiment of the present invention, it is assumed that the internal parameters are acquired at the time of factory shipment. In addition, in each embodiment of the present invention, it is assumed that the internal parameters are known at the time of acquiring an image.

In each embodiment of the present invention, it is assumed that two or more images are acquired by one camera. However, the present invention is not limited to this. For example, the present invention may be applied to also a case in which a 3D model is restored by using a plurality of images acquired by a plurality of cameras. In this case, the image $I_1$ and the image $I_2$ have only to be acquired by using different cameras and each internal parameter has only to be stored for each camera. Even if the internal parameters are unknown, it is possible to perform calculation by using the internal parameters as variables. For this reason, the subsequent procedure does not greatly change in accordance with whether or not the internal parameters are known.

Figure 13:
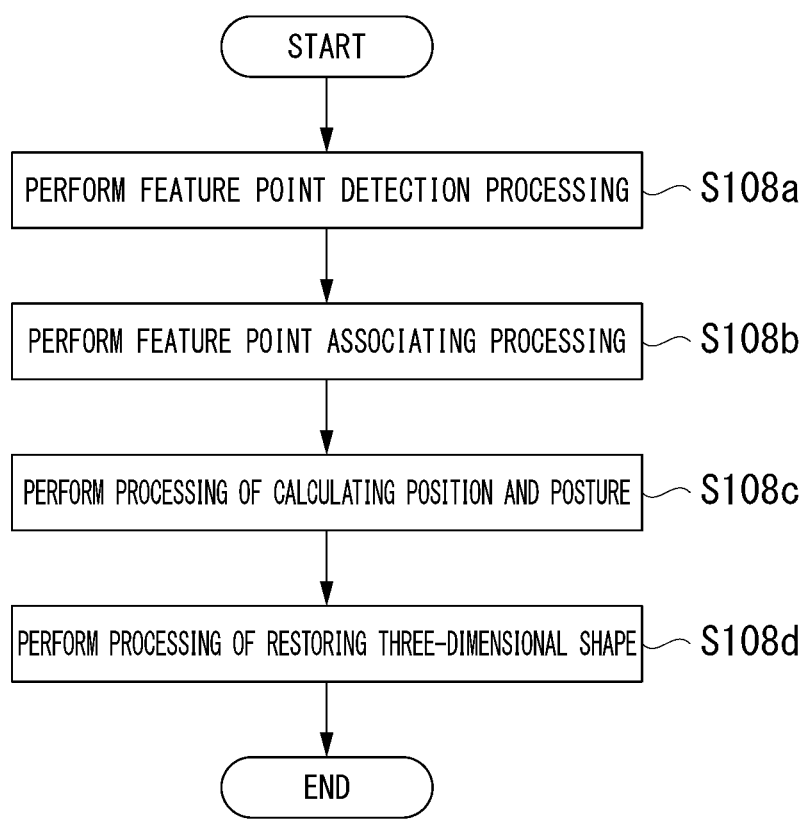
FIG. 13 is a flow chart showing a procedure of processing for generating a three-dimensional model in the first embodiment of the present invention.

A procedure for calculating three-dimensional coordinates of a subject on the basis of acquired two images will be described with reference to FIG. 13. FIG. 13 shows the procedure of processing for generating a 3D model.

First, the 3D model generation unit 211 executes a feature point detection processing (Step S108a). The 3D model generation unit 211 detects a feature point of each of acquired two images in the feature point detection processing. The feature point represents a corner, an edge, and the like in which an image luminance gradient is large in information of a subject seen in the image. As a method of detecting this feature point, a scale-invariant feature transform (SIFT), a feature from accelerated segment test (FAST), or the like is used. By using such a method, a feature point within an image can be detected.

FIG. 12 shows an example in which a feature point $m_1$ is detected from the image $I_1$ and a feature point $m_2$ is detected from the image $I_2$. Although only one feature point of each image is shown in FIG. 12, in fact, a plurality of feature points are detected in each image. There is a possibility that the number of feature points detected in each image is different. Each feature point detected from each image is converted into data called a feature quantity. The feature quantity is data that represent a feature of a feature point.

After Step S108a, the 3D model generation unit 211 executes a feature point associating processing (Step S108b). In the feature point associating processing, the 3D model generation unit 211 compares correlations of feature quantities between images for each feature point detected in the feature point detection processing (Step S108a). In a case in which the correlations of the feature quantities are compared and a feature point of which feature quantities are close to those of a feature point of another image is found in each image, the 3D model generation unit 211 stores the information on the hard disk 11 or memory 14. In this way, the 3D model generation unit 211 associates a feature point of each image together. On the other hand, in a case in which a feature point of which feature quantities are close to those of a feature point of another image is not found, the 3D model generation unit 211 discards information of the feature point.

After Step S108b, the 3D model generation unit 211 reads coordinates of feature points of two images associated with each other (a feature point pair) from the hard disk 11 or memory 14. The 3D model generation unit 211 executes processing of calculating a position and a posture on the basis of the read coordinates (Step S108c). In the processing of calculating a position and a posture, the 3D model generation unit 211 calculates a relative position and a relative posture between the imaging state $c_1$ of the camera that has acquired the image $I_1$ and the imaging state $c_2$ of the camera that has acquired the image $I_2$. More specifically, the 3D model generation unit 211 calculates a matrix E by solving the following Equation (1) using an epipolar restriction.

$$p_1^T E p_2 = 0 \quad E = [t]_X R \quad \because [t]_X = \begin{pmatrix} 0 & -t_z & t_y \\ t_z & 0 & -t_x \\ -t_y & t_x & 0 \end{pmatrix} \quad (1)$$

The matrix E is called a basic matrix. The basic matrix E is a matrix storing a relative position and a relative posture between the imaging state $c_1$ of the camera that has acquired the image $I_1$ and the imaging state $c_2$ of the camera that has acquired the image $I_2$. In Equation (1), a matrix $p_1$ is a matrix including coordinates of a feature point detected from the image $I_1$. A matrix $p_2$ is a matrix including coordinates of a feature point detected from the image $I_2$. The basic matrix E includes information related to a relative position and a relative posture of the camera and thus corresponds to external parameters of the camera. The basic matrix E can be solved by using a known algorithm.

As shown in FIG. 12, Expression (2) and Expression (3) are satisfied in a case in which the amount of position change of the camera is t and the amount of posture change of the camera is R.

$$t = (t_x, t_y, t_z) \quad (2)$$

$$R = R_x(\alpha)R_y(\beta)R_z(\gamma) = \quad (3)$$

$$\begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix}$$

In Expression (2), the amount of movement in an x-axis direction is expressed as $t_x$, the amount of movement in a y-axis direction is expressed as $t_y$, and the amount of movement in a z-axis direction is expressed as $t_z$. In Expression (3), a rotation amount $\alpha$ around the x-axis is expressed as $R_x(\alpha)$, a rotation amount $\beta$ around the y axis is expressed as $R_y(\beta)$, and a rotation amount $\gamma$ around the z axis is expressed as $R_z(\gamma)$. After the basic matrix E is calculated, optimization processing called bundle adjustment may be executed in order to improve restoration accuracy of three-dimensional coordinates.

After Step S108c, the 3D model generation unit 211 executes processing of restoring a three-dimensional shape of a subject on the basis of the relative position and the relative posture of the camera (the amount of position change t and the amount of posture change R) calculated in Step S108c (Step S108d). The 3D model generation unit 211 generates a 3D model of a subject in the processing of restoring a three-dimensional shape. As a technique for restoring a three-dimensional shape of a subject, there is matching processing that uses patch-based multi-view stereo (PMVS) and parallelization stereo and the like. However, a means therefor is not particularly limited. When Step S108d is executed, the processing shown in FIG. 13 is completed.

In the above-described example, it is assumed that the measurement device 1 processes the time-series image. The image processed by the measurement device 1 does not need to be the time-series image. For example, the measurement device 1 may execute processing similar to the above-described processing by using a plurality of images to which timestamps are not attached. In a case in which timestamps are not present, the image reproduction control unit 201 is unable to arrange a plurality of images in chronological order. For this reason, for example, after the image reproduction control unit 201 rearranges a plurality of images in order by the filename, the image reproduction control unit 201 may reproduce the images in accordance with the order.

A measurement method according to each aspect of the present invention includes a first image display step, a first setting step, a second image display step, a second setting step, a generation step, and a measurement step. The display control unit 221 displays one first image in the first region 151 of the display 15 in the first image display step (Step S109). The first image is a two-dimensional image of a subject. In the example shown in FIG. 6, the display control unit 221 displays the reference image SI101 in the first region 151. The reference point setting unit 220 sets a first point on the first image displayed in the first region 151 in the first setting step (Step S110). The first point corresponds to at least one of the first reference point Pr21 and the second reference point Pr22 shown in FIG. 7.

After the first point is set on the first image, the display control unit 221 hides the first image in the first region 151 and displays one second image included in a plurality of second images in the first region 151 in the second image display step (Step S115). The plurality of second images are two-dimensional images of the subject. In the example shown in FIG. 10, the display control unit 221 displays the image SI102 in the first region 151. Part of a visual field of each image of an image group overlaps part of a visual field of another image of the image group. The image group consists of the first image and the plurality of second images. The measurement point setting unit 224 sets a second point on the second image displayed in the first region 151 in the second setting step (Step S116). The second point corresponds to at least one of the first measurement point Pm21 and the second measurement point Pm22 shown in FIG. 11.

The 3D model generation unit 211 generates a three-dimensional shape (3D model) of the subject on the basis of the position and the posture of a camera when each image of the image group is generated in the generation step (Step S108). The coordinate conversion unit 225 and the measurement unit 226 measure the size of the subject on the basis of at least the first point, the second point, and the three-dimensional shape in the measurement step (Step S112 and Step S117).

The image group consists of the first image and the plurality of second images. The image group consists of at least three images extracted in Step S106. The first image corresponds to the reference image SI101 shown in FIG. 6 and FIG. 7. One second image included in the plurality of second images corresponds to the image SI102 shown in FIG. 10 and FIG. 11.

The image group is used for generating a 3D model. In order for the 3D model to be generated in accordance with the principle shown in FIG. 12, part of a visual field of each image and part of a visual field of each of at least one of other images need to be common. A visual field of the first image (first visual field) and a visual field of one second image (second visual field) include a common region. A region other than the common region in the first visual field and a region other than the common region in the second visual field are different from each other.

A region in which the first point is to be set on the first image and a region in which the second point is to be set on the second image are not included in the above-described common region. The region in which the first point is to be set on the first image is common to a region on the second image excluding the region in which the second point is to be set. The region in which the second point is to be set on the second image is common to a region on another second image other than the second image on which the second point is to be set.

After the first point is set on the first image and an instruction of a moving direction of a visual field is accepted, the display control unit 221 hides the first image in the first region 151 in Step S115. Moreover, the display control unit 221 displays the second image in the first region 151. The second image has a visual field that has moved in the moving direction from the visual field of the first image. In the example shown in FIG. 7 and FIG. 10, when one of the buttons BT20 is pressed, the instruction of a moving direction of a visual field is accepted.

In the first embodiment, the first image is displayed in the first region 151 of the display 15. After the first reference point Pr21 and the second reference point Pr22 are set on the first image, the first image is hided and one second image is displayed in the first region 151. The first measurement point Pm21 and the second measurement point Pm22 are set on the second image. The measurement device 1 can set a plurality of points used for measurement on a plurality of images.

There is a case in which two designation points for three-dimensional measurement are apart from each other and do not fall within a visual field of one image. Since the measurement device 1 switches images displayed on the display 15, images in which each designation point is seen are displayed in order. A user can designate a designation point on each image. For this reason, operability by a user in measurement is improved.

A user can press the button BT20 that represents one direction and thus can cause an image having a visual field that has moved in the direction to be displayed in the first region 151. Since operation for switching images becomes simple, operability by a user in measurement is improved.

First Modified Example of First Embodiment

A first modified example of the first embodiment of the present invention will be described. In the example shown in the first embodiment, two reference points are set on a first image and two measurement points are set on a second image. An embodiment of the present invention is not limited to this example. At least one designation point has only to be set on a first image and at least one designation point different from the designation point set on the first image has only to be set on a second image. A designation point to be set on a first image is any one of a reference point and a measurement point. A designation point to be set on a second image is any one of a reference point and a measurement point.

Figure 14:
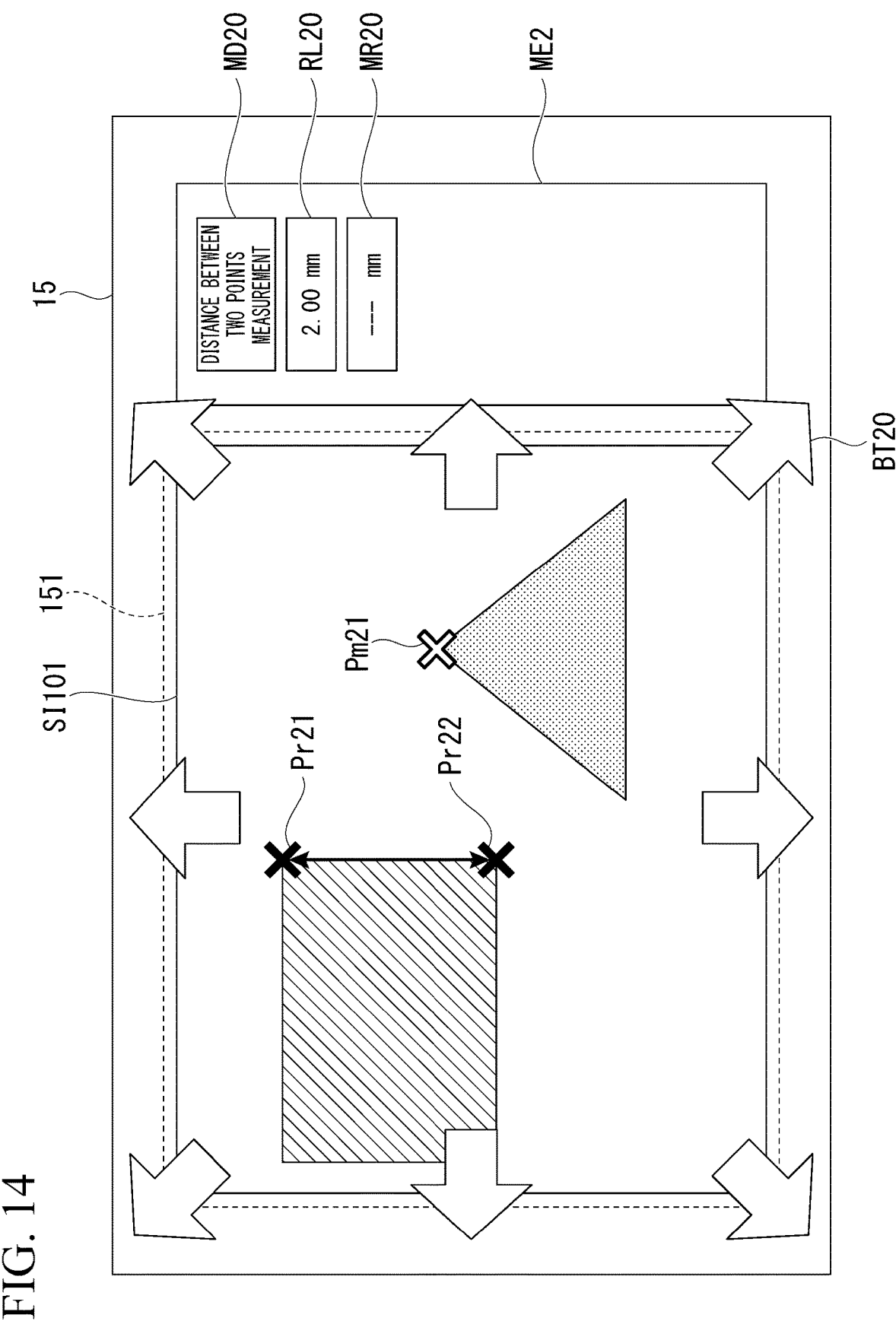
FIG. 14 is a diagram showing an example of an image displayed on a display included in a measurement device according to a first modified example of the first embodiment of the present invention.
Figure 15:
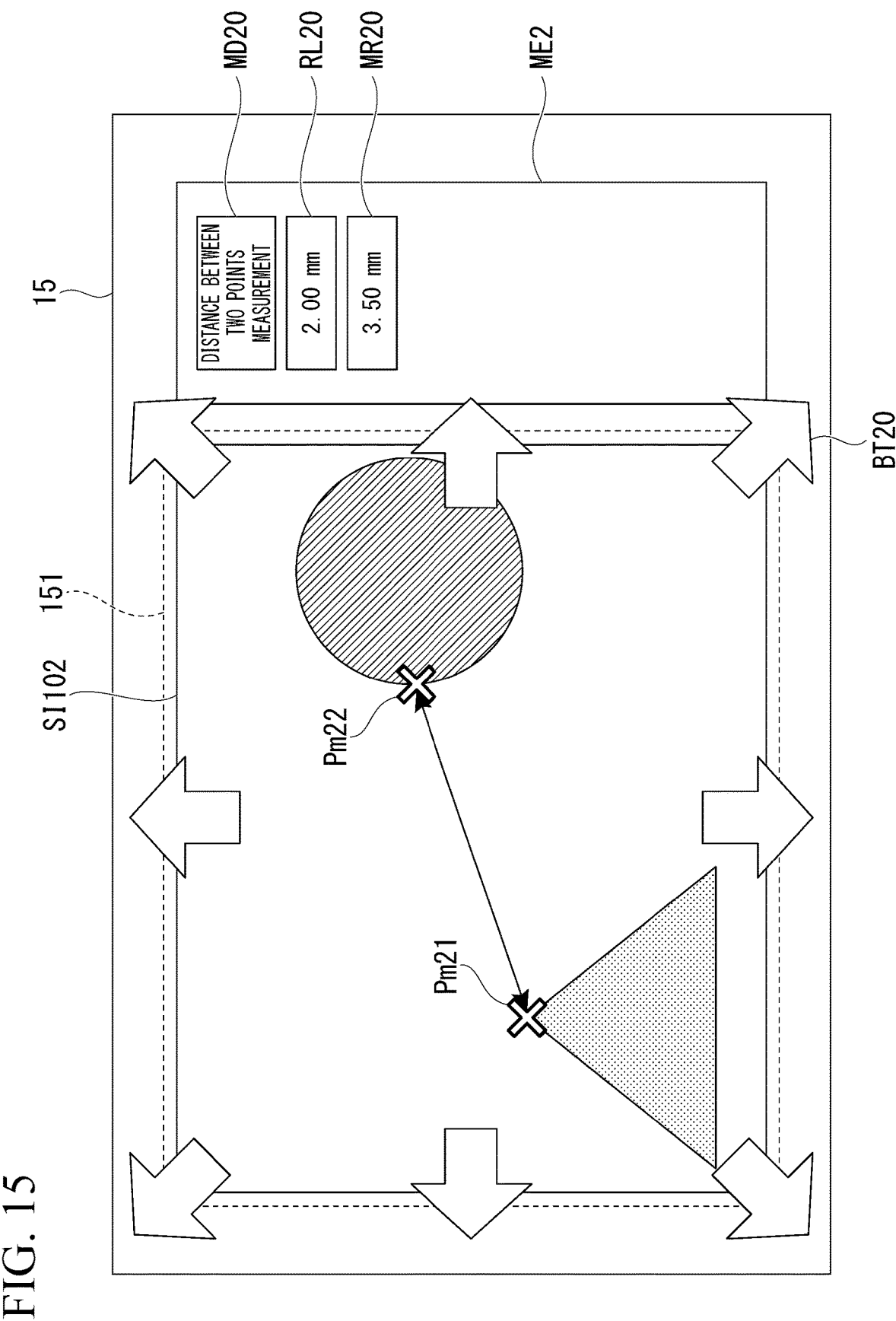
FIG. 15 is a diagram showing an example of an image displayed on the display included in the measurement device according to the first modified example of the first embodiment of the present invention.

FIG. 14 and FIG. 15 show an example of an image displayed on the display 15. The same part as that shown in FIG. 7 will not be described.

A first reference point Pr21, a second reference point Pr22, and a first measurement point Pm21 shown in FIG. 14 are designated by a user and are set on the reference image SI101. After the three points are set, the button BT20 is pressed. Instead of the reference image SI101, the image SI102 shown in FIG. 15 is displayed in the first region 151 of the display 15. A second measurement point Pm22 is designated by a user and is set on the image SI102. The case shown in FIG. 14 and FIG. 15 is also included in an embodiment of the present invention.

The first measurement point Pm21 on the reference image SI101 and the first measurement point Pm21 on the image SI102 are the same point on a subject. When the image SI102 is displayed, the same first measurement point Pm21 as the first measurement point Pm21 on the reference image SI101 is displayed on the image SI102. For this reason, operability by a user in measurement is improved. It is not essential to display the first measurement point Pm21 on the image SI102.

Second Modified Example of First Embodiment

A second modified example of the first embodiment of the present invention will be described. The measurement device 1 according to the second modified example of the first embodiment has a function of correcting a designation point. The measurement device 1 stores a display history of an image. The measurement device 1 displays again an image that has been hided on the basis of the display history. In a case in which a user desires to correct the position of a designation point that is not displayed on the display 15, a user can display the image on which the designation point has been set and can correct the position of the designation point.

Figure 16:
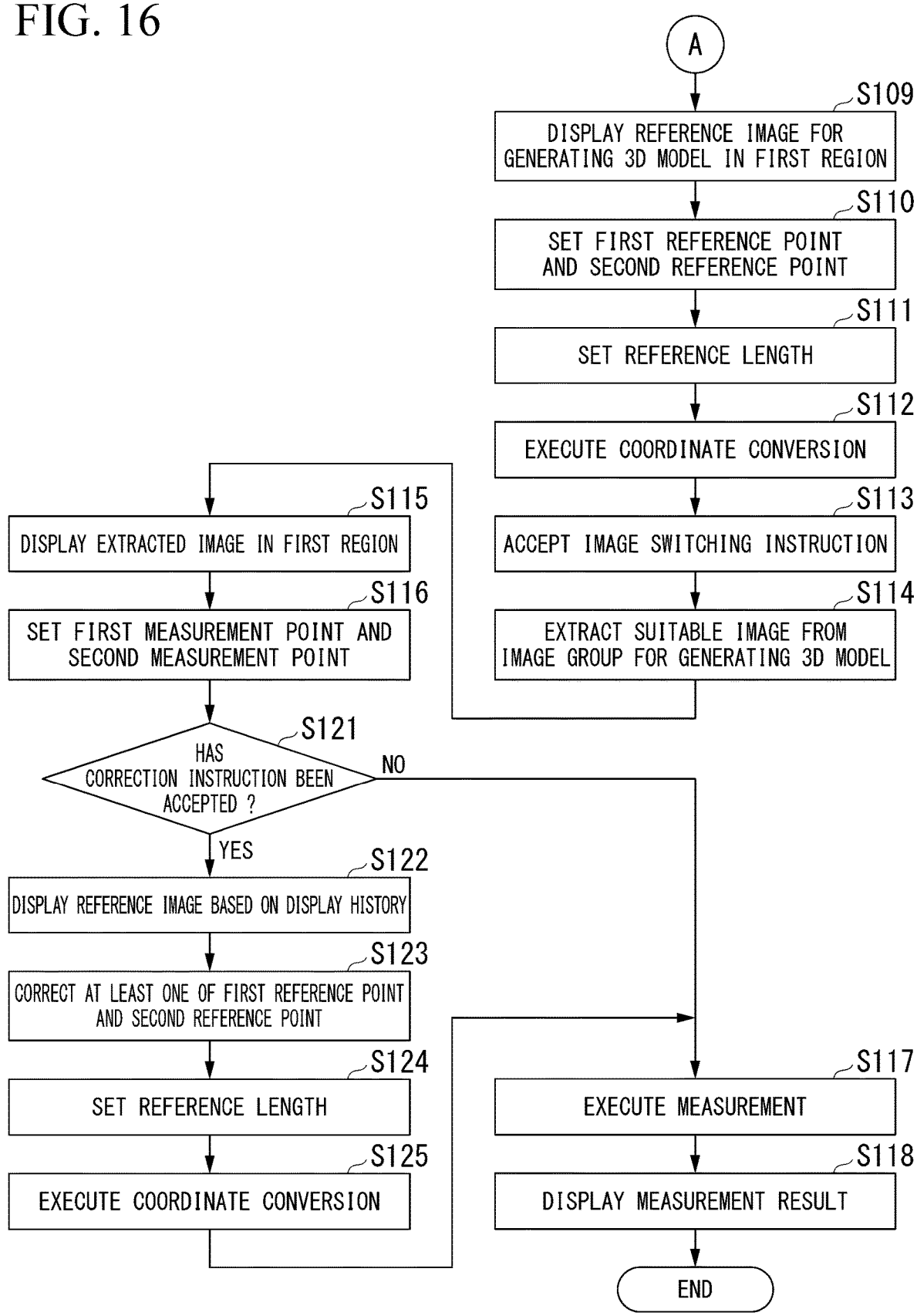
FIG. 16 is a flow chart showing a procedure of processing executed by a measurement device according to a second modified example of the first embodiment of the present invention.

The processing shown in FIG. 4 is changed to processing shown in FIG. 16. A procedure of processing executed for measurement will be described with reference to FIG. 16.

FIG. 16 shows a procedure of processing executed by the CPU 13. The same processing as the processing shown in FIG. 4 will not be described.

After Step S116, the display control unit 221 determines whether or not a correction instruction has been accepted (Step S121). For example, a button for inputting the correction instruction is displayed on the display 15 in Step S115. A user inputs the correction instruction by pressing the button through the operation unit 12. The display control unit 221 determines whether or not the correction instruction has been accepted from the operation unit 12 in Step S121.

When the display control unit 221 determines that the correction instruction has not been accepted, Step S117 is executed. When the display control unit 221 determines that the correction instruction has been accepted, the display control unit 221 determines an image that should be displayed on the display 15 on the basis of the display history stored on the hard disk 11 or the memory 14. The display history includes information of an image that has already been displayed on the display 15. The display history includes information of a reference image that is displayed before Step S115 is executed. For this reason, the display control unit 221 hides an image on the display 15 and displays the reference image on the display 15. Moreover, the display control unit 221 displays the first reference point and the second reference point set in Step S110 on the reference image (Step S122).

After the reference image is displayed again, a user corrects the position of at least one of the first reference point and the second reference point on the reference image displayed on the display 15 by operating the operation unit 12. For example, a user corrects the position of a reference point by moving the reference point on the reference image. The reference point setting unit 220 accepts at least one reference point corrected by a user from the operation unit 12. The reference point setting unit 220 sets at least one reference point corrected by a user on the reference image (Step S123).

When the position of the first reference point is corrected, position information (coordinates) of the first reference point set in Step S110 is updated. When the position of the second reference point is corrected, position information (coordinates) of the second reference point set in Step S110 is updated.

Figure 17:
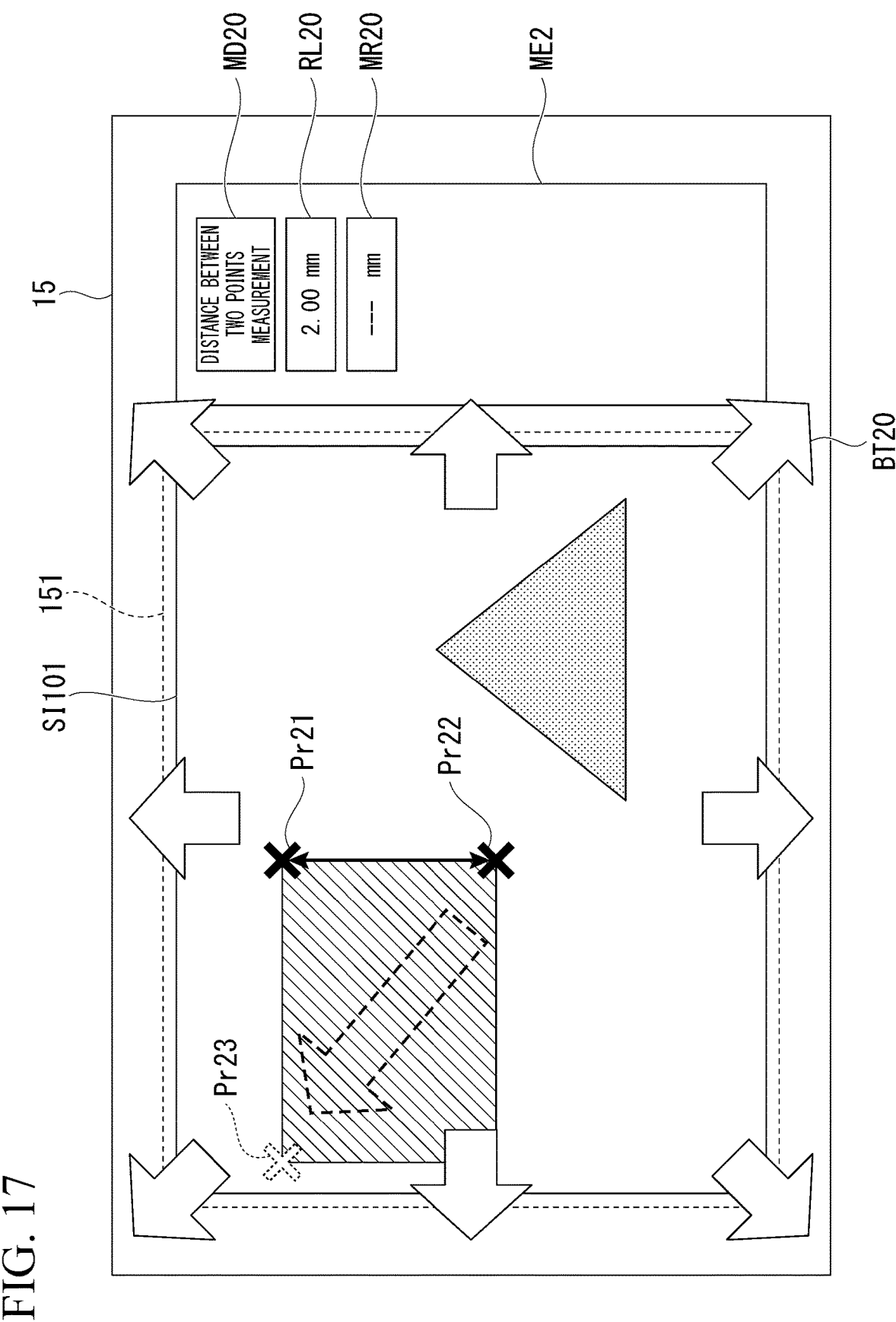
FIG. 17 is a diagram showing an example of an image displayed on a display included in the measurement device according to the second modified example of the first embodiment of the present invention.

FIG. 17 shows an example of an image displayed on the display 15 in Step S122. The same part as that shown in FIG. 7 will not be described.

Before the correction instruction is input, the image SI102 shown in FIG. 11 is displayed on the display 15. When the correction instruction is input, the display control unit 221 displays a reference image SI101 shown in FIG. 17 in the first region 151 of the display 15. At this time, the image SI102 becomes hided.

The entire image SI102 does not need to be hided. A partial region of the image SI102 including the first measurement point Pm21 and the second measurement point Pm22 may be hided and the reference image SI101 may be displayed in the region. The remaining region of the image SI102 excluding the region that has been hided may be displayed.

A first reference point Pr21 and a second reference point Pr22 are displayed on the reference image SI101. When a user desires to correct the second reference point Pr22, a user moves the second reference point Pr22 to the desired position by operating the operation unit 12. For example, a user moves the second reference point Pr22 to a second reference point Pr23.

After Step S123, Step S124 is executed. Step S124 is similar to Step S111. After Step S124, Step S125 is executed. Step S125 is similar to Step S112. After Step S125, Step S117 is executed.

At least one of the first measurement point and the second measurement point set in Step S116 may be corrected. The method of correcting a measurement point is similar to the method shown in FIG. 17.

A measurement method according to each aspect of the present invention may include a fourth image display step and a correction step. After a second point (first measurement point or second measurement point) is set, the display control unit 221 hides a second image (image SI102) in the first region 151 of the display 15 in the fourth image display step (Step S122). The display control unit 221 displays a first image (reference image SI101) in the first region 151 and highlights a first point (first reference point or second reference point) on the first image in the fourth image display step (Step S122). After the first point is highlighted, the reference point setting unit 220 corrects the position of the first point set on the first image in the correction step (Step S123).

In the example shown in FIG. 17, the display control unit 221 highlights the first point by displaying a mark of the second reference point Pr22 on the reference image SI101. As long as a user can recognize the first point on the first image, a method of highlighting the first point is not limited to the above-described method.

In the second modified example of the first embodiment, an image that has been hided is displayed again. The reference point setting unit 220 corrects the position of a designation point highlighted on the image on the basis of an instruction from a user. The measurement device 1 can provide the function of correcting a designation point.

Second Embodiment

A second embodiment of the present invention will be described. In the first embodiment, when a user desires to switch an image to another image, the user presses the button 20 shown in FIG. 7. However, there is a possibility that a user is unsure about which button BT20 to press in order to display an image on which the desired designation point is seen. Alternatively, there is a possibility that a user is unsure about how many times the button BT20 should be pressed. For this reason, there is a possibility that it takes time for a user to search for an image on which the desired designation point is seen.

In the second embodiment, a reference image selected by the reference image selection unit 202 is displayed in a first region of the display 15 and an image extracted by the image extraction unit 210 is displayed in a second region of the display 15. A user selects one image displayed in the second region of the display 15. At this time, the reference image in the first region becomes hided and the image selected by a user is displayed in the first region. For this reason, a user can easily switch an image in the first region to another image.

Figure 18:
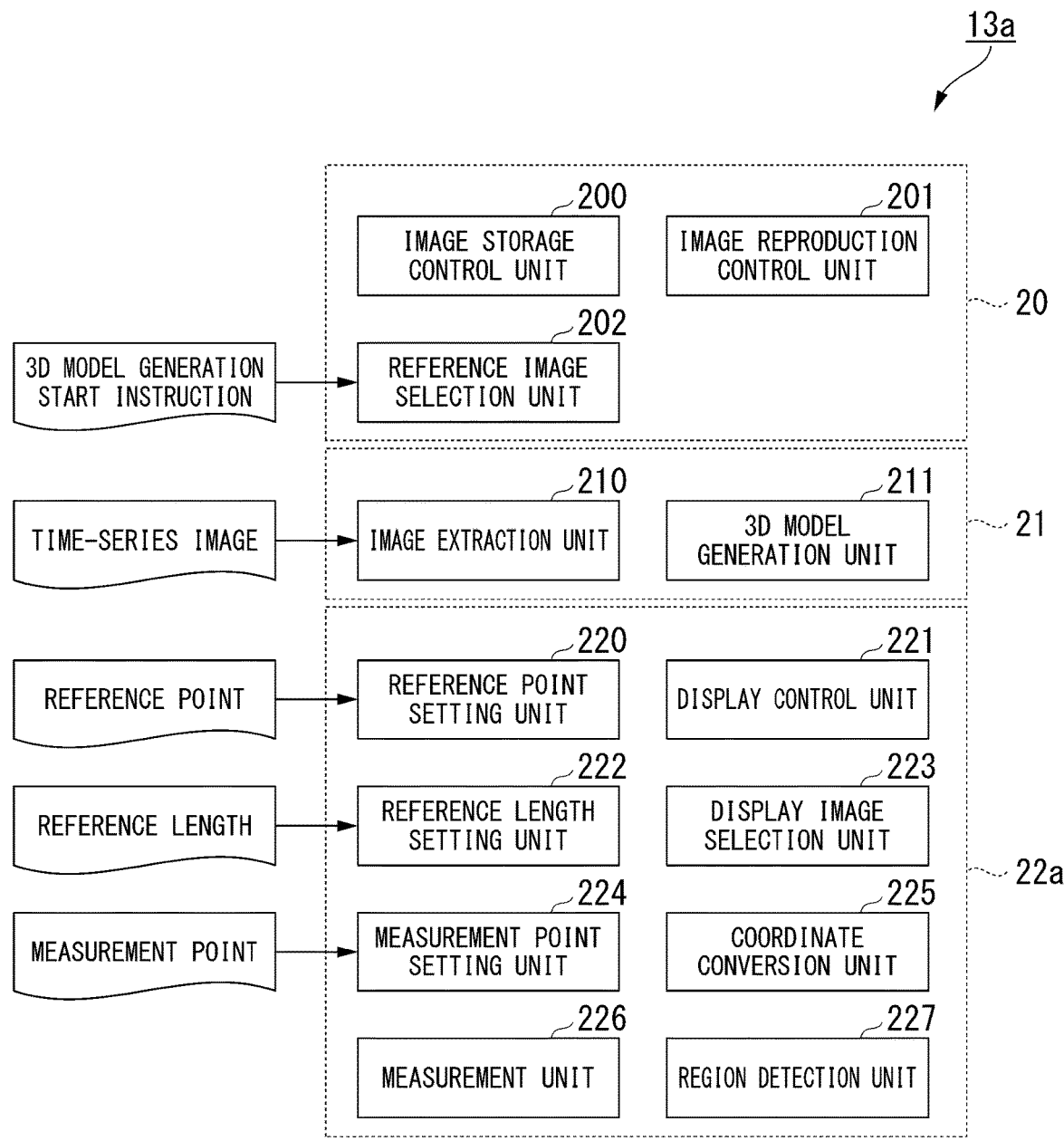
FIG. 18 is a block diagram showing a functional configuration of a CPU included in a measurement device according to a second embodiment of the present invention.

The CPU 13 shown in FIG. 2 is changed to a CPU 13a shown in FIG. 18. FIG. 18 shows a functional configuration of the CPU 13a. The same configuration as the configuration shown in FIG. 2 will not be described. At least one of blocks shown in FIG. 18 may be constituted by a circuit other than the CPU 13a.

Each unit shown in FIG. 18 may be constituted by at least one of a processor and a logic circuit. Each unit shown in FIG. 18 may include one or a plurality of processors. Each unit shown in FIG. 18 may include one or a plurality of logic circuits.

The measurement processing unit 22 shown in FIG. 2 is changed to a measurement processing unit 22a. The measurement processing unit 22a includes a reference point setting unit 220, a display control unit 221, a reference length setting unit 222, a display image selection unit 223, a measurement point setting unit 224, a coordinate conversion unit 225, a measurement unit 226, and a region detection unit 227.

The display control unit 221 displays at least three images extracted by the image extraction unit 210 in the second region of the display 15. A user inputs an instruction for selecting one of the least three images displayed in the second region. At this time, the display control unit 221 hides an image in the first region of the display 15 and displays the selected image in the first region.

The region detection unit 227 processes at least three images extracted by the image extraction unit 210. The region detection unit 227 detects regions of which visual fields overlap with each other between two or more images. It is possible to execute measurement for these regions. The region detection unit 227 detects a region included in a visual field of only one image. This region is not included in a visual field of another image. It is impossible to execute measurement for this region. The region detection unit 227 detects a region of which the measurement accuracy is low. The display control unit 221 displays at least one region detected by the region detection unit 227 on an image.

Figure 19:
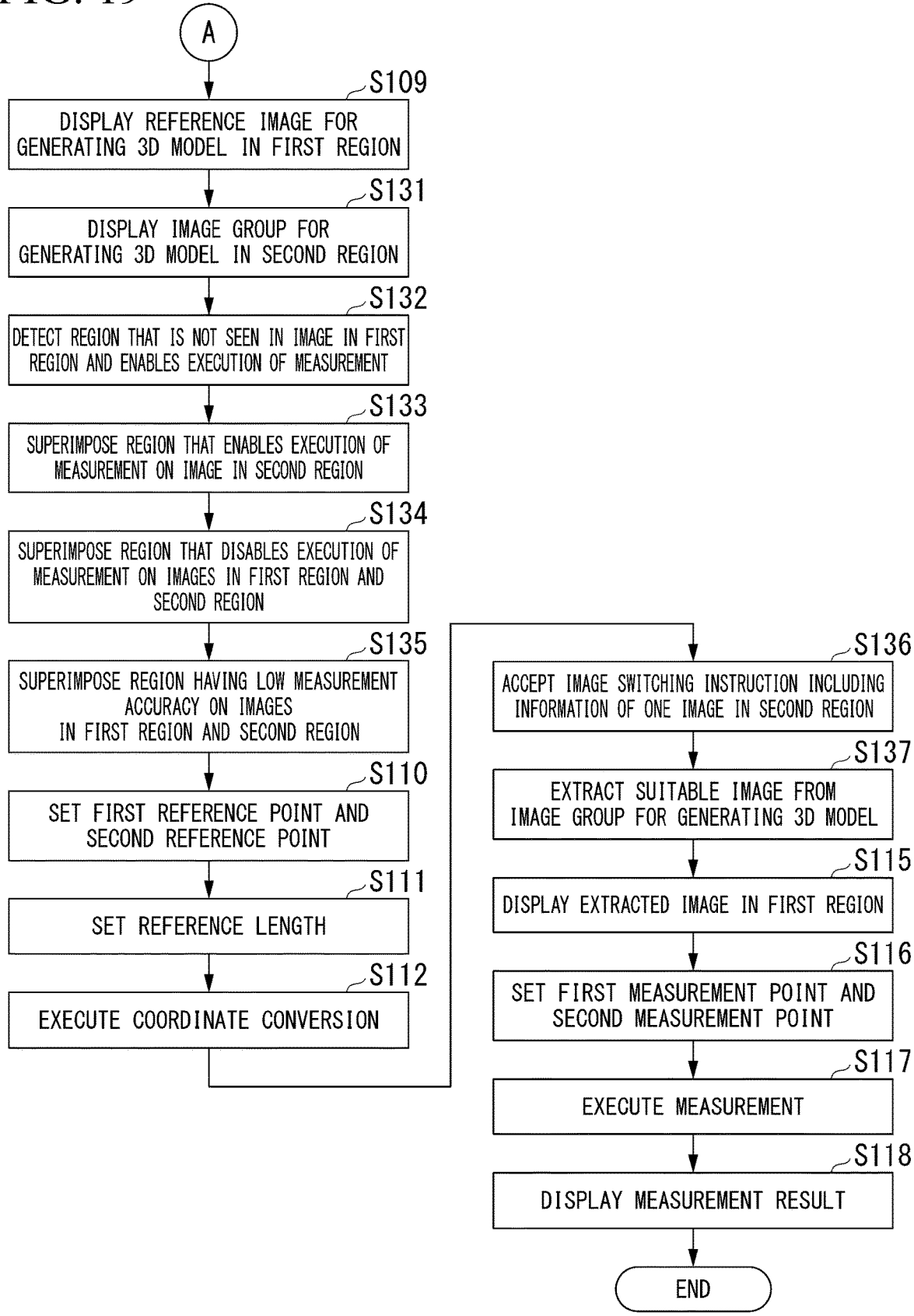
FIG. 19 is a flow chart showing a procedure of processing executed by the measurement device according to the second embodiment of the present invention.

The processing shown in FIG. 4 is changed to processing shown in FIG. 19. A procedure of processing executed for measurement will be described with reference to FIG. 19. FIG. 19 shows a procedure of processing executed by the CPU 13a. The same processing as the processing shown in FIG. 4 will not be described.

After Step S109, the display control unit 221 displays at least three images extracted in Step S106 in the second region of the display 15 (Step S131). The second region of the display 15 is different from the first region in which a reference image is displayed. For example, all of at least three images extracted in Step S106 are displayed in the second region of the display 15. Only some of at least three images may be displayed in the second region of the display 15.

For example, the region detection unit 227 calculates the size of the overlap between visual fields of two images included in the at least three images. The region detection unit 227 calculates the size of the overlap between visual fields for all of the combinations of two images. When the size of the overlap between visual fields exceeds a predetermined amount, the display control unit 221 displays only one of two images of which visual fields overlap each other in the second region of the display 15 in Step S131. Hereinafter, an example in which all of the at least three images are displayed in the second region of the display 15 will be described.

After Step S131, the region detection unit 227 detects a common region (Step S132). The common region is not included in the visual field of the reference image displayed in the first region of the display 15. The common region is included in common in visual fields of two or more images among the at least three images displayed in the second region of the display 15. The common region is not seen in the reference image, but is seen in two or more images among the at least three images displayed in the second region of the display 15. It is possible to execute measurement for the detected region.

Figure 20:
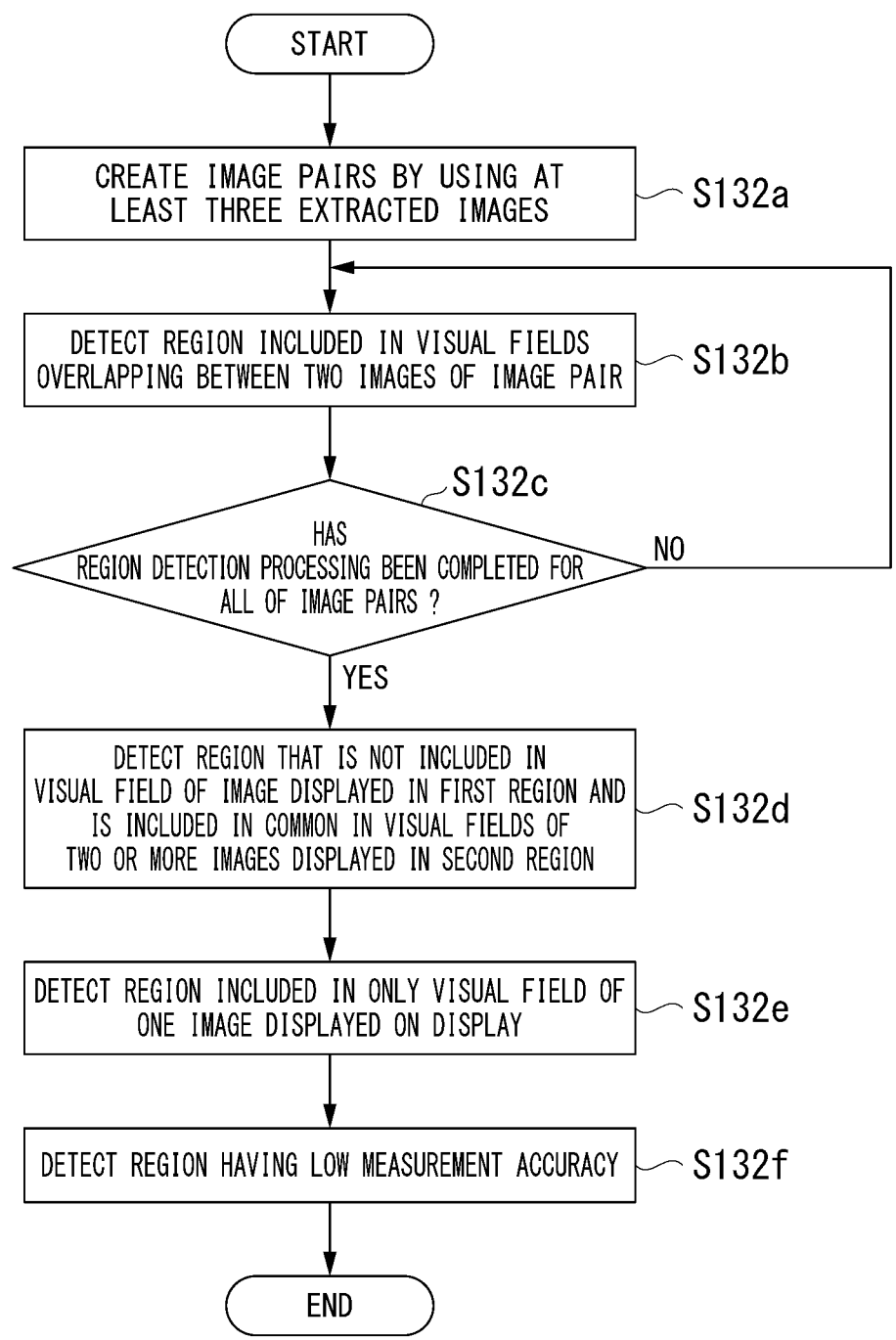
FIG. 20 is a flow chart showing a procedure of processing executed by the measurement device according to the second embodiment of the present invention.

An example of processing executed in Step S132 will be described with reference to FIG. 20. FIG. 20 shows a procedure of processing for detecting a region for which execution of measurement is possible. Hereinafter, an example in which the images SI300 to SI304 shown in FIG. 8 are used will be described.

After Step S131, the region detection unit 227 creates image pairs by using all of at least three images extracted in Step S106 (Step S132*a*). The image pair is a combination of two images. For example, the region detection unit 227 creates ten image pairs by using all of five images.

After Step S132*a*, the region detection unit 227 selects one of a plurality of image pairs that have been created. The region detection unit 227 detects a region included in visual fields overlapping between two images of the selected image pair (Step S132*b*).

Figure 21A:
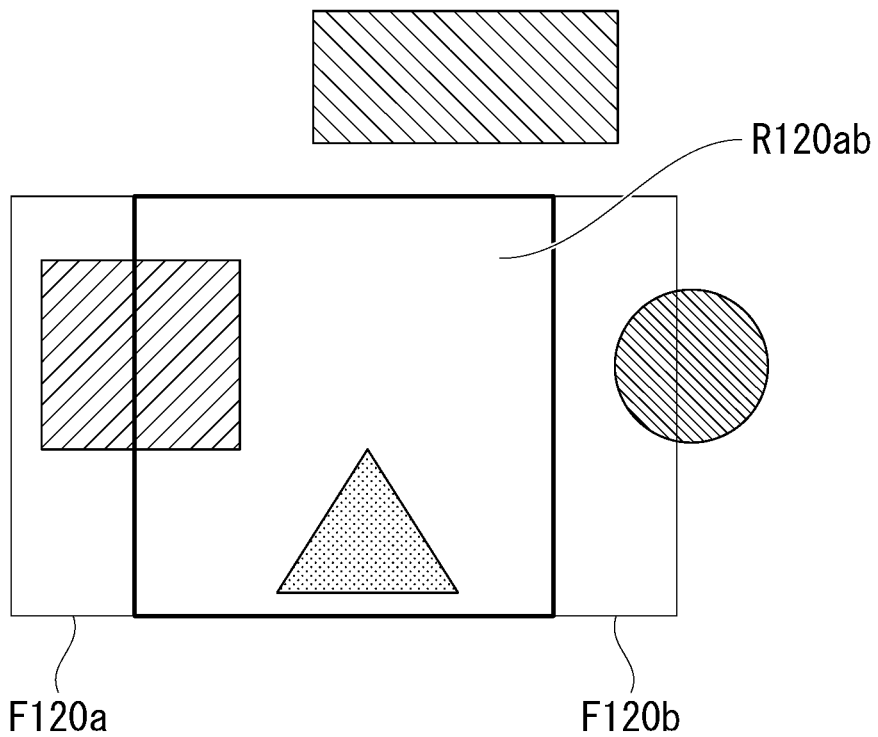
FIGS. 21A and 21B are a diagram showing a visual field of each image in the second embodiment of the present invention.
Figure 21B:
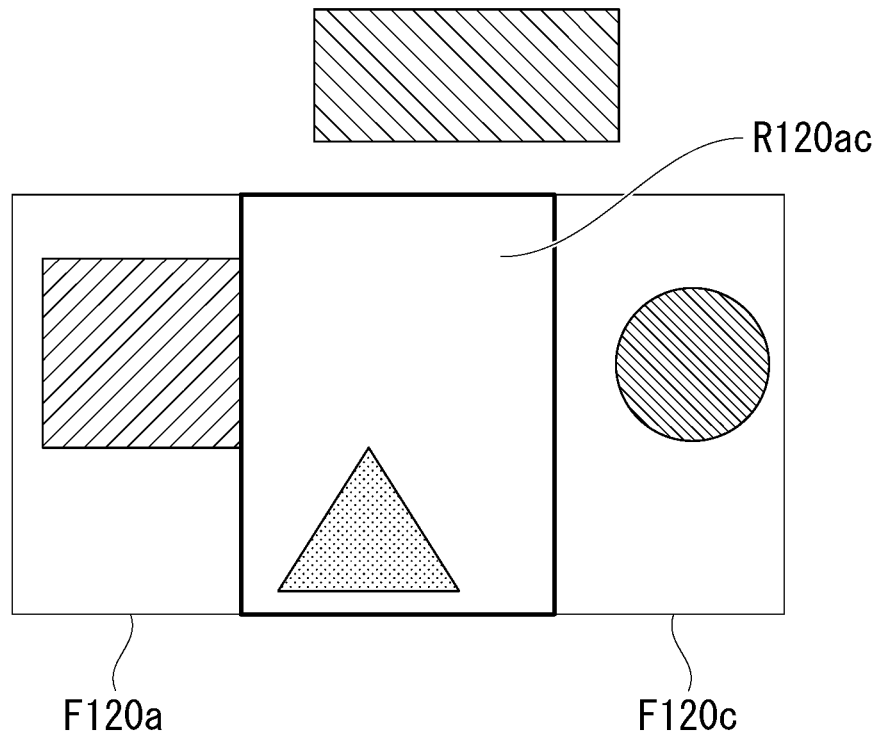

FIG. 21A and FIG. 21B show a visual field of an image. A visual field F120*a* of an image SI300 and a visual field F120*b* of an image SI301 are shown in FIG. 21A. A region R120*ab* is included in common in the visual field F120*a* and the visual field F120*b*. The visual field F120*a* of the image SI300 and a visual field F120*c* of an image SI302 are shown in FIG. 21B. A region R120*ac* is included in common in the visual field F120*a* and the visual field F120*c*. The region detection unit 227 detects the region R120*ab* and the region R120*ac* in Step S132*b*. The region detection unit 227 executes processing similar to the above-described processing for another image pair.

After Step S132*b*, the region detection unit 227 determines whether or not the processing in Step S132*b* has been completed for all of the image pairs (Step S132*c*). When the region detection unit 227 determines that there is the image pair for which the processing in Step S132*b* has not been completed, Step S132*b* is executed. At this time, another image pair excluding the image pair used in the processing in Step S132*b* is used.

When the region detection unit 227 determines that the processing in Step S132*b* has been completed for all of the image pairs, the region detection unit 227 detects a common region (Step S132*d*). The region detection unit 227 detects a region for which execution of measurement is possible in Step S132*d*.

Figure 22:
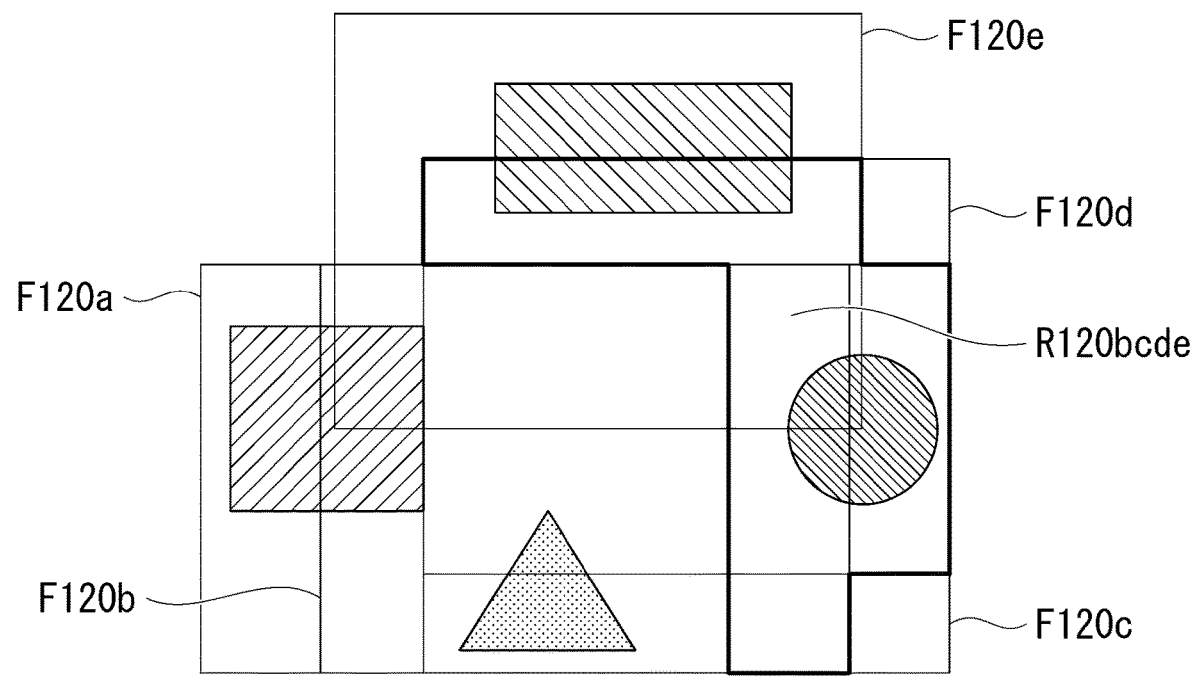
FIG. 22 is a diagram showing a visual field of each image in the second embodiment of the present invention.

FIG. 22 shows visual fields of images. The visual field F120*a* of the image SI300, the visual field F120*b* of the image SI301, a visual field F120*c* of an image SI302, a visual field F120*d* of an image SI303, and a visual field F120*e* of an image SI304 are shown in FIG. 22. The image SI300 is a reference image and is displayed in the first region of the display 15. The image SI301, the image SI302, the image SI303, and the image SI304 are displayed in the second region of the display 15.

The region detection unit 227 detects a common region R120*bcde* in Step S132*d*. The common region R120*bcde* is a region surrounded by a thick line shown in FIG. 22. The common region R120*bcde* is not included in the visual field F120*a*. The common region R120*bcde* is included in common in at least two of the visual field F120*b*, the visual field F120*c*, the visual field F120*d*, and the visual field F120*e*.

Figure 23A:
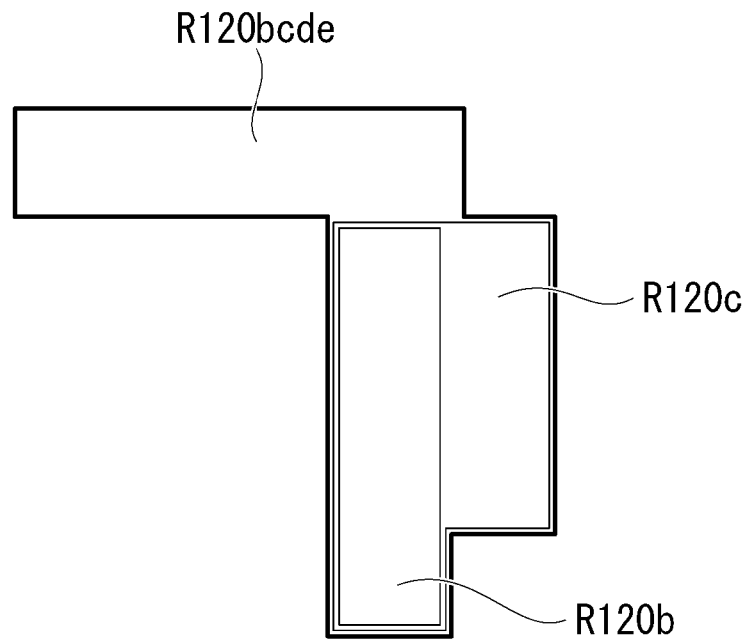
FIGS. 23A and 23B are a diagram showing a region included in common in visual fields of two or more images in the second embodiment of the present invention.
Figure 23B:
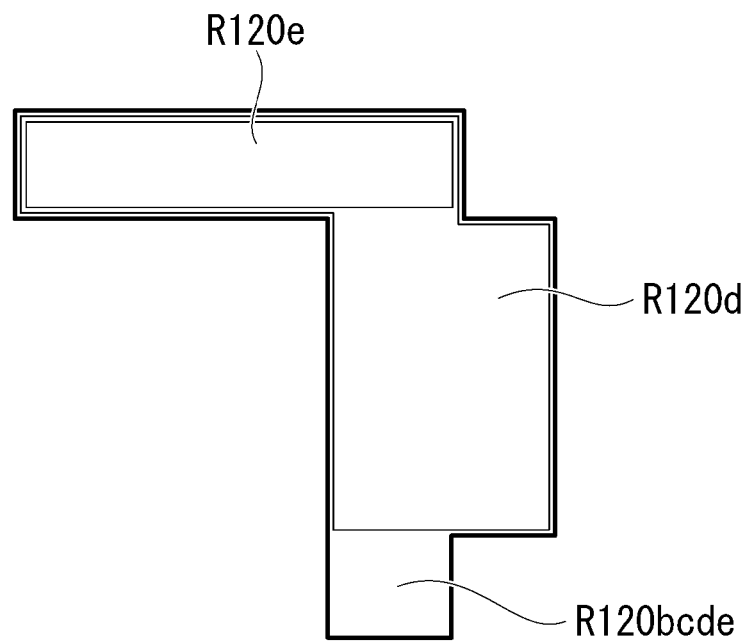

FIG. 23A and FIG. 23B show the common region R120*bcde* included in common in visual fields of two or more images. The common region R120*bcde* includes a region 120*b* of the visual field F120*b* and a region 120*c* of the visual field F120*c*. In addition, the common region R120*bcde* includes a region 120*d* of the visual field F120*d* and a region 120*e* of the visual field F120*e*. An arbitrary position in the common region R120*bcde* is included in at least two of the region 120*b*, the region 120*c*, the region 120*d*, and the region 120*e*.

The region detection unit 227 may detect the common region R120*bcde* by using a method described below. The region detection unit 227 creates image pairs by using the images SI300 to SI304. The region detection unit 227 calculates logical OR of regions included in a visual field overlapping between two images of each image pair. The region detection unit 227 detects the common region R120*bcde* by subtracting a region included in the visual field F120*a* of the image SI300 from the logical OR.

After Step S132*d*, the region detection unit 227 detects a region included in only the visual field of one image displayed in the display 15 (Step S132*e*). The region detection unit 227 detects a region for which execution of measurement is impossible in Step S132*e*.

Figure 24:
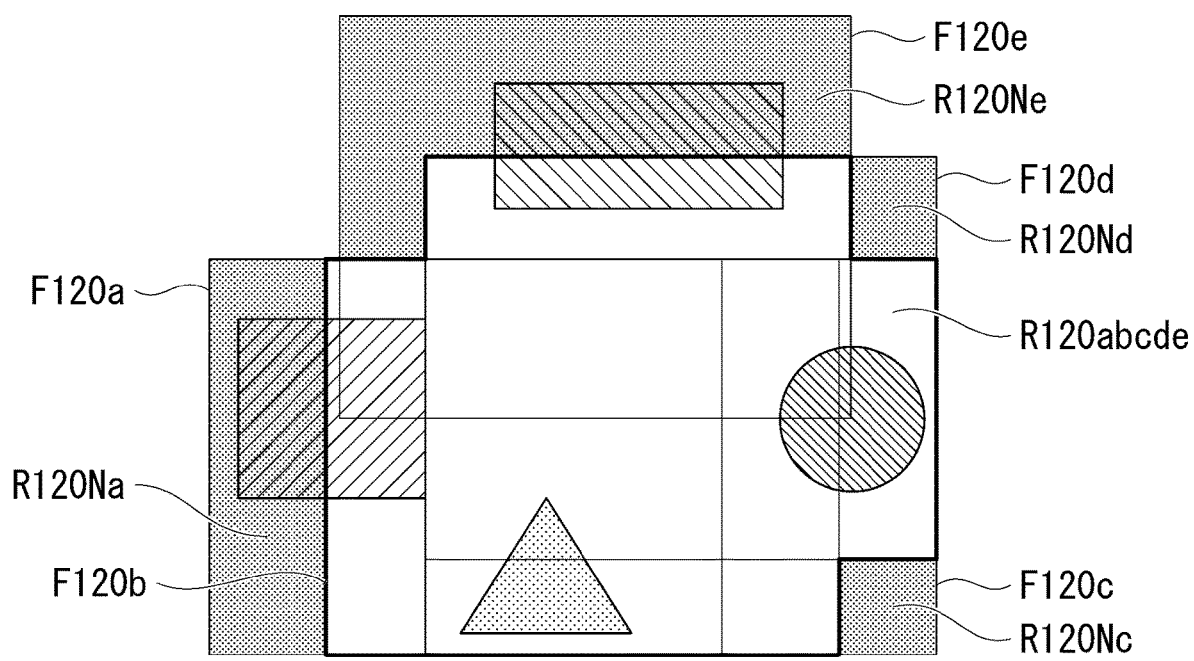
FIG. 24 is a diagram showing a visual field of each image in the second embodiment of the present invention.

FIG. 24 shows visual fields of images. A region R120*abcde* is included in common in the visual fields of the five images SI300 to SI304. The region R120*abcde* is a region surrounded by a thick line shown in FIG. 24. The region R120*abcde* is included in common in at least two of the visual field F120*a*, the visual field F120*b*, the visual field F120*c*, the visual field F120*d*, and the visual field F120*e*.

The region detection unit 227 detects a region included in only the visual field of one image by subtracting a region overlapping the region R120*abcde* from the visual field of each image in Step S132*e*. Specifically, the region detection unit 227 detects a region R120N*a*, a region R120N*c*, a region R120N*d*, and a region R120N*e*. The region R120N*a* is included in only the visual field F120*a*. The region R120N*c* is included in only the visual field F120*c*. The region R120N*d* is included in only the visual field F120*d*. The region R120N*e* is included in only the visual field F120*e*.

After Step S132*e*, the region detection unit 227 detects a region having low measurement accuracy in each of the reference image displayed in the first region of the display 15 and the at least three images displayed in the second region of the display 15 (Step S132*f*). For example, the region detection unit 227 detects a region having low measurement accuracy on the basis of the difference (reprojection error) between an ideal straight line (epipolar line) and coordinates on a two-dimensional image when a point on a 3D model is projected on the two-dimensional image again. The region detection unit 227 may detect a region having low measurement accuracy on the basis of an object distance at a point on a two-dimensional image. The region detection unit 227 may detect a region having low measurement accuracy on the basis of a correlation value obtained as an intermediate of the matching processing using two two-dimensional images. The method of detecting a region having low measurement accuracy is not limited to the above-described methods.

After Step S132*f*, the display control unit 221 displays the common region detected in Step S132*d* on the image in the second region of the display 15 (Step S133). The display control unit 221 displays the region for which execution of measurement is possible on the image in the second region of the display 15 in Step S133.

After Step S133, the display control unit 221 displays the region detected in Step S132*e* on the image in the first region of the display 15 and the image in the second region of the display 15 (Step S134). The display control unit 221 displays the region for which execution of measurement is impossible on the image in the first region of the display 15 and the image in the second region of the display 15 in Step S134.

After Step S134, the display control unit 221 displays the region detected in Step S132*f* on the image in the first region of the display 15 and the image in the second region of the display 15 (Step S135). The display control unit 221 displays the region having low measurement accuracy on the image in the first region of the display 15 and the image in the second region of the display 15 in Step S135. After Step S135, Step S110 is executed.

Figure 25:
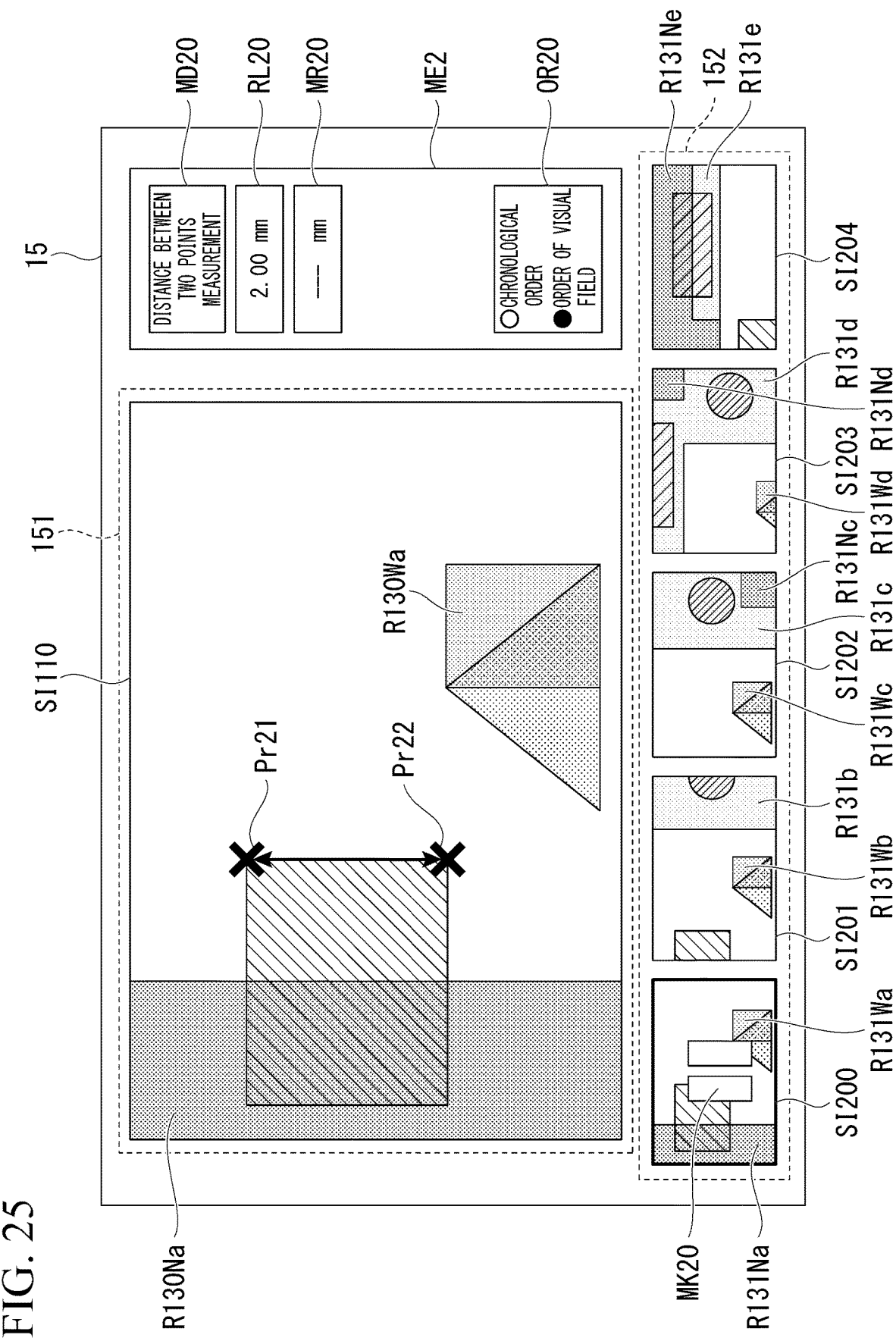
FIG. 25 is a diagram showing an example of an image displayed on a display included in the measurement device according to the second embodiment of the present invention.

FIG. 25 shows an example of an image displayed on the display 15 after two reference points are set in Step S110. The same part as that shown in FIG. 7 will not be described.

A reference image SI110, an image SI200, an image SI201, an image SI202, an image SI203, an image SI204, and a menu ME2 are displayed on the screen of the display 15. The reference image SI110 is displayed in the first region 151 of the display 15. A first reference point Pr21 and a second reference point Pr22 are displayed on the reference image SI110.

The image SI200, the image SI201, the image SI202, the image SI203, and the image SI204 correspond to at least three images extracted in Step S106. The visual field of each of these images is the same as the visual field of each image extracted in Step S106. These images are displayed in the second region 152 of the display 15.

The second region 152 is different from the first region 151. The first region 151 is a region in which an image for a user to designate a reference point and a measurement point is displayed. The second region 152 is a region for a user to confirm whether or not visual fields overlap between two or more images. The second region 152 is disposed below the first region 151. Five images are arranged in line in the horizontal direction in the second region 152.

The area of the reference image SI110 in the first region 151 is larger than the area of each image in the second region 152. In other words, the area of the reference image SI110 is larger than the area of any image displayed in the second region 152. The area of an image corresponds to the pixel size of the image. For example, each of the five images displayed in the second region 152 is a thumbnail of each image extracted in Step S106. The image SI200 corresponds to the reference image SI110.

A region R130Na and a region R130Wa are displayed on the reference image SI110. A region R131Na and a region R131Wa are displayed on the image SI200. A region R131*b* and a region R131Wb are displayed on the image SI201. A region R131*c*, a region R131Nc, and a region R131Wc are displayed on the image SI202. A region R131*d*, a region R131Nd, and a region R131Wd are displayed on the image SI203. A region R131*e* and a region R131Ne are displayed on the image SI204.

The region R131*b*, the region R131*c*, the region R131*d*, and the region R131*e* are regions detected in Step S132*d*. It is possible to execute measurement for these regions. These regions are not included in the visual field of the reference image SI110. Each of these regions is included in common in visual fields of two or more images (excluding the image SI200) displayed in the second region 152. A user can confirm a region in which it is possible to designate a measurement point on the image displayed in the second region 152.

These regions are highlighted on the image in the second region 152. For example, these regions are displayed in a color that represents that execution of measurement is possible. As long as a user can recognize a region for which execution of measurement is possible, a method of highlighting the region is not limited to the above-described method.

The region R130Na, the region R131Na, the region R131Nc, the region R131Nd, and the region R131*e* are regions detected in Step S132*e*. It is impossible to execute measurement for these regions. Each of these regions is included in a visual field of only one image displayed in the first region 151 or the second region 152. A user can confirm a region in which it is impossible to designate a reference point on the reference image SI110 displayed in the first region 151. A user can confirm a region in which it is impossible to designate a measurement point on the image displayed in the second region 152.

These regions are highlighted on the image in the first region 151 and the image in the second region 152. For example, these regions are displayed in a color that represents that execution of measurement is impossible. As long as a user can recognize a region for which execution of measurement is impossible, a method of highlighting the region is not limited to the above-described method.

The region R130Wa, the region R131Wa, the region R131Wb, the region R131Wc, and the region R130Wd are regions detected in Step S132*f*. The measurement accuracy in these regions is low. A user can confirm a region in which a measurement result having low accuracy is obtained on the reference image SI110 displayed in the first region 151 or the image displayed in the second region 152.

These regions are highlighted on the image in the first region 151 and the image in the second region 152. For example, these regions are displayed in a color that represents that the measurement accuracy is low. As long as a user can recognize a region in which the measurement accuracy is low, a method of highlighting the region is not limited to the above-described method.

A display order setting OR20 is displayed on the menu ME2. The display order setting OR20 represents the order in which images are arranged in the second region 152. A user can input the order in which images are arranged to the display order setting OR20 by operating the operation unit 12. A user can switch the order in which images are arranged in accordance with the user's preferences.

In the example shown in FIG. 25, the five images are arranged in order of visual fields. The display control unit 221 arranges the five images in the second region 152 in Step S131 in the order that is based on the relationship between visual fields of the images. The display control unit 221 can acquire the relationship between visual fields of the images by executing processing similar to Step S114 shown in FIG. 4. Visual fields of two images next to each other in the second region 152 overlap each other.

The five images may be arranged in chronological order. When the chronological order is input to the display order setting OR20, the display control unit 221 arranges the five images in the second region 152 in Step S131 in the order that is based on the relationship between time points associated with the images. For example, the five images are arranged in the second region 152 in order of time points at which the images were acquired. The five images may be arranged regardless of any of a visual field and a time point.

A mark MK20 is displayed on the image SI200. The mark MK20 represents the same image as the image displayed in the first region 151. The mark MK20 is the same as the mark displayed when video reproduction is paused. For this reason, a user easily associates the image displayed in the first region 151 and the image displayed in the second region 152 with each other.

The display control unit 221 highlights the image SI200 corresponding to the reference image SI110 displayed in the first region 151 in the second region 152 in Step S131. In the example shown in FIG. 25, the display control unit 221 displays the mark MK20 on the image SI200. As long as a user can associate the reference image SI110 displayed in the first region 151 and the image SI200 displayed in the second region 152 with each other, a method of highlighting the image SI200 is not limited to the above-described method.

A user may switch between a first setting and a second setting. In the first setting, the mark MK20 is displayed. In the second setting, the mark MK20 is not displayed.

The image SI200 is a reference image. In order to show that the image SI200 is a reference image, the image SI200 is surrounded by a thick line. The display control unit 221 highlights the image SI200 corresponding to the reference image SI110 in the second region 152 in Step S131. In the example shown in FIG. 25, the display control unit 221 surrounds the image SI200 with a thick line. As long as a user can associate the image SI200 displayed in the second region 152 and the reference image SI110 displayed in the first region 151 with each other, a method of highlighting the image SI200 is not limited to the above-described method.

A user may switch between a first setting and a second setting. In the first setting, the image SI200 is surrounded with a thick line. In the second setting, the image SI200 is not surrounded with a thick line.

In the example shown in FIG. 25, the same image as the image displayed in the first region 151 is displayed in the second region 152. It is not necessary to display the same image as the image displayed in the first region 151 in the second region 152. A user may switch between a first setting and a second setting. In the first setting, the same image as the image displayed in the first region 151 is displayed in the second region 152. In the second setting, the same image as the image displayed in the first region 151 is not displayed in the second region 152.

Hereinafter, it is assumed that a user desires to designate two measurement points on the image SI202 after the user designates the first reference point Pr21, the second reference point Pr22, and a reference length.

A user selects one of the five images displayed in the second region 152 by operating the operation unit 12. Specifically, a user selects the image SI202. In this way, a user inputs the image switching instruction. The image switching instruction includes information of one image selected by a user. After Step S112, the display image selection unit 223 accepts the image switching instruction from the operation unit 12 (Step S136). In a case in which the display 15 is a touch panel, a user can select one image by touching one of the five images displayed in the second region 152.

After Step S136, the display image selection unit 223 selects one image selected by a user from at least three images extracted in Step S106 (Step S137). After Step S137, the display control unit 221 hides an image in the first region 151 and displays the image selected by the display image selection unit 223 in the first region 151 in Step S115.

In the above-described example, a user selects one of at least three images displayed in the second region 152. A user does not need to select an image in the second region 152. For example, a user may select an image by using voice, gesture, or the like.

Figure 26:
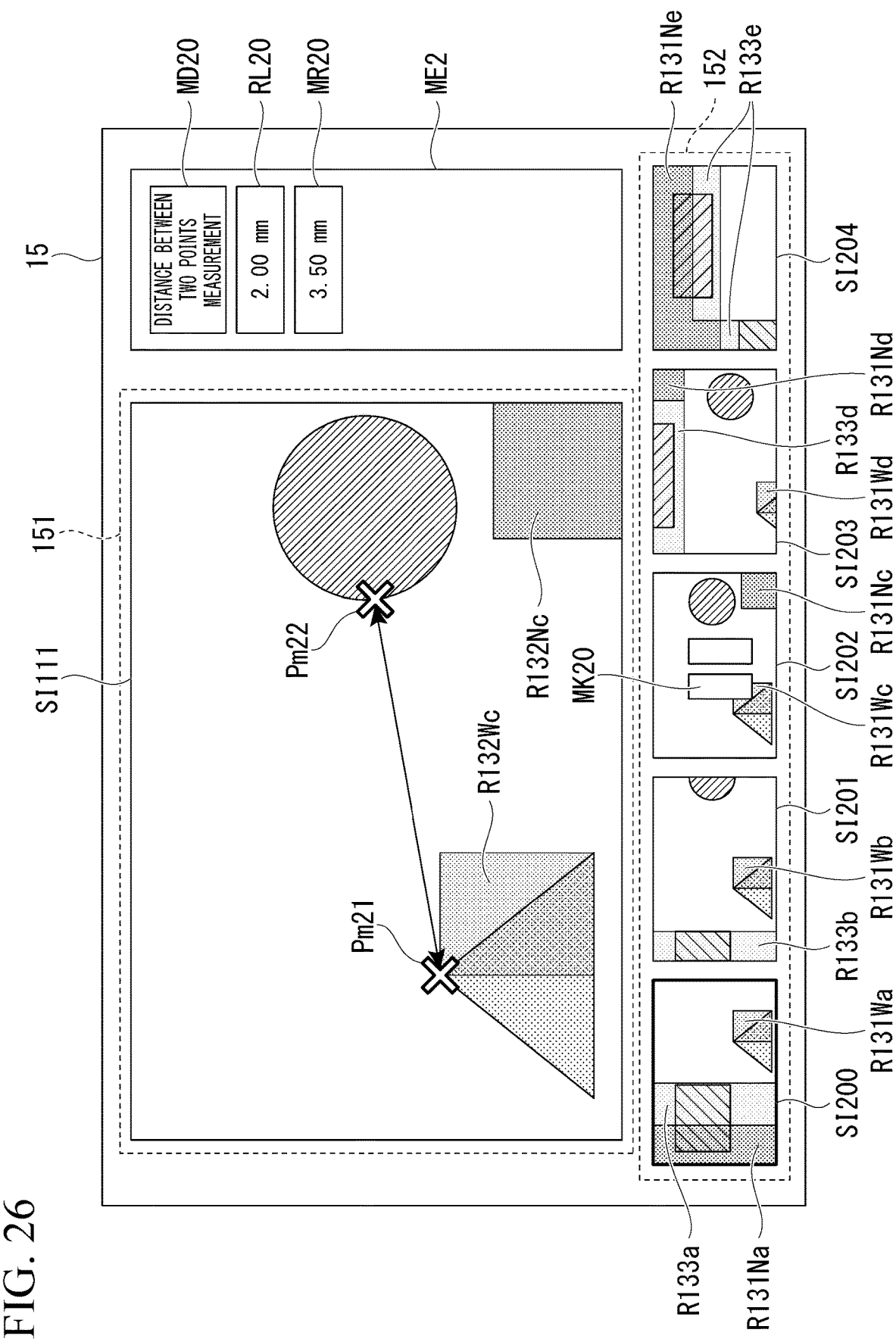
FIG. 26 is a diagram showing an example of an image displayed on the display included in the measurement device according to the second embodiment of the present invention.

FIG. 26 shows an example of an image displayed on the display 15 in Step S118. The same part as that shown in FIG. 25 will not be described.

When an image SI202 is selected by a user, the display control unit 221 displays an image SI111 in a first region 151 of the display 15. At this time, the reference image SI110 shown in FIG. 25 becomes hided. The image SI111 corresponds to an image SI202 displayed in a second region 152 of the display 15. A first measurement point Pm21 and a second measurement point Pm22 are displayed on the image SI111. The distance between the first measurement point Pm21 and the second measurement point Pm22 is displayed as a measurement result MR20.

A region R132Nc and a region R132Wc are displayed on the image SI111. A region R133a, a region R131Na, and a region R131Wa are displayed on the image SI200. A region R133b and a region R131Wb are displayed on the image SI201. A region R131Nc and a region R131Wc are displayed on the image SI202. A region R133d, a region R131Nd, and a region R131Wd are displayed on the image SI203. A region R133e and a region R131Ne are displayed on the image SI204. A mark MK20 is displayed on the image SI202.

The region R133a, the region R133b, the region R133d, and the region R133e are regions for which execution of measurement is possible. These regions are not included in the visual field of the image SI111. Each of these regions is included in common in visual fields of two or more images (excluding the image SI202) displayed in the second region 152. The region detection unit 227 can detect a region for which execution of measurement is possible by executing processing similar to Step S132d.

The region R132Nc, the region R131Na, the region R131Nc, the region R131Nd, and the region R131Ne are regions for which execution of measurement is impossible. Each of these regions is included in a visual field of only one image displayed in the first region 151 or the second region 152. The region detection unit 227 can detect a region for which execution of measurement is impossible by executing processing similar to Step S132e.

The region R132Wc, the region R131Wa, the region R131Wb, the region R131Wc, and the region R131Wd are regions in which the measurement accuracy is low. The region detection unit 227 can detect a region in which the measurement accuracy is low by executing processing similar to Step S132f.

The order of processing executed by the CPU 13a is not limited to the order shown in FIG. 3, FIG. 19, and FIG. 20. For example, as long as Step S108 is executed before Step S112 is executed, Step S108 may be executed at any timing between Step S107 and Step S117.

Steps S136 to S116 may be repeatedly executed. In step S116, at least one measurement point is set. Therefore, at least one measurement point may be set on each of two or more images. When a user desires to switch the image SI111 shown in FIG. 26 to another image and set a measurement point, the user can switch images with reference to a region for which execution of measurement is possible and the like.

A measurement method according to each aspect of the present invention may include a third image display step. While a first image is displayed in the first region 151 of the display 15, the display control unit 221 displays at least two third images in the second region 152 of the display 15 in the third image display step (Step S131). Each of the third images corresponds to any second image included in a plurality of second images. After an instruction for selecting one of the at least two third images displayed in the second region 152 is accepted, the display control unit 221 hides the first image in the first region 151 and displays the second image corresponding to the selected third image in the first region 151 in the second image display step (Step S115).

The first image corresponds to the reference image SI110. The plurality of second images correspond to the images extracted in Step S106. The at least two third images correspond to the image SI201, the image SI202, the image SI203, and the image SI204. In the example shown in FIG. 25 and FIG. 26, the display control unit 221 hides the reference image SI110 and displays the image SI111 corresponding to the selected image SI202 in the first region 151 in Step S115.

The display control unit 221 highlights the image SI200 (fourth image) corresponding to the reference image SI110 (first image) in the second region 152 in Step S131. In the example shown in FIG. 25, the display control unit 221 displays the mark MK20 on the image SI200.

The display control unit 221 highlights the image SI202 (third image) corresponding to the image SI111 (second image) displayed in the first region 151 in Step S115. In the example shown in FIG. 26, the display control unit 221 displays the mark MK20 on the image SI202.

The display control unit 221 highlights a region on the third image in Step S133. The region is not included in the visual field of the reference image SI110 (first image) and is included in common in the visual fields of two or more of at least two second images. In the example shown in FIG. 25, the display control unit 221 displays the region R131b, the region R131c, the region R131d, and the region R131e on each image in the second region 152.

The display control unit 221 highlights a region on the third image in Step S115. The region is not included in the visual field of the image SI111 (second image) displayed in the first region 151 and is included in common in the visual fields of two or more of at least two second images. In the example shown in FIG. 26, the display control unit 221 displays the region R133a, the region R133b, the region R133d, and the region R133e on each image in the second region 152.

The display control unit 221 highlights a region on the third image in Step S134 and Step S115. The region is included in the visual field of only one of at least two second images. In the example shown in FIG. 25 and FIG. 26, the display control unit 221 displays the region R131Na, the region R131Nc, the region R131Nd, and the region R131Ne on each image in the second region 152.

The display control unit 221 highlights a region on the reference image SI110 in Step S134. The region is included in the visual field of only the reference image SI110 (first image). In the example shown in FIG. 25, the display control unit 221 displays the region R130Na on the reference image SI110.

The display control unit 221 highlights a region on the image SI111 (second image) displayed in the first region 151 in Step S115. The region is included in the visual field of only the image SI111 displayed in the first region 151. In the example shown in FIG. 26, the display control unit 221 displays the region R132Nc on the image SI111.

The display control unit 221 highlights a region in which the measurement accuracy is low on the third image in Step S135 and Step S115. In the example shown in FIG. 25 and FIG. 26, the display control unit 221 displays the region R131Wa, the region R131Wb, the region R131Wc, and the region R131Wd on each image in the second region 152.

The display control unit 221 highlights a region in which the measurement accuracy is low on the reference image SI110 (first image) in Step S135. In the example shown in FIG. 25, the display control unit 221 displays the region R130Wa on the reference image SI110.

The display control unit 221 highlights a region in which the measurement accuracy is low on the image SI111 displayed in the first region 151 in Step S115. In the example shown in FIG. 26, the display control unit 221 displays the region R132Wc on the image SI111.

In the second embodiment, the first image is displayed in the first region 151 of the display 15 and at least two third images are displayed in the second region 152 of the display 15. The first reference point Pr21 and the second reference point Pr22 are set on the first image and an instruction for selecting one of at least two third images displayed in the second region 152 is accepted. Thereafter, the first image is hided and the second image corresponding to the selected third image is displayed in the first region 151. The first measurement point Pm21 and the second measurement point Pm22 are set on the second image. A user can easily select an image that the user desires to use for designating a designation point from at least two third images displayed in the second region 152. For this reason, operability by a user in measurement is improved.

A region for which execution of measurement is possible is displayed on the third image in the second region 152. A user can confirm a region in which it is possible to designate a designation point on the third image displayed in the second region 152.

A region for which execution of measurement is impossible is displayed on the first image in the first region 151 or the second image in the first region 151. A user can confirm a region in which it is impossible to designate a designation point on the first image or the second image displayed in the first region 151.

A region for which execution of measurement is impossible is displayed on the third image in the second region 152. A user can confirm a region in which it is impossible to designate a designation point on the third image displayed in the second region 152.

A region in which the measurement accuracy is low is displayed on the first image in the first region 151, the second image in the first region 151, or the third image in the second region 152. A user can confirm a region in which the measurement accuracy is low in each image.

Modified Example of Second Embodiment

A modified example of the second embodiment of the present invention will be described. In the second embodiment, at least three images used for generating a 3D model are arranged in line in the horizontal direction in the second region of the display 15. At least three images do not need to be arranged in the horizontal direction. For example, at least three images may be arranged in the vertical direction. Some of at least three images may be arranged in the horizontal direction and the other one or more of at least three images may be arranged in the vertical direction. At least three images may be arranged around the first region of the display 15. For example, the positions at which at least three images are disposed are determined on the basis of the moving direction of visual fields that is based on the image displayed in the first region.

Hereinafter, two cases will be described. In a first case, at least three images are arranged in the horizontal direction and the vertical direction. In a second case, at least three images are arranged around the first region on the basis of the moving direction of visual fields.

Figure 27:
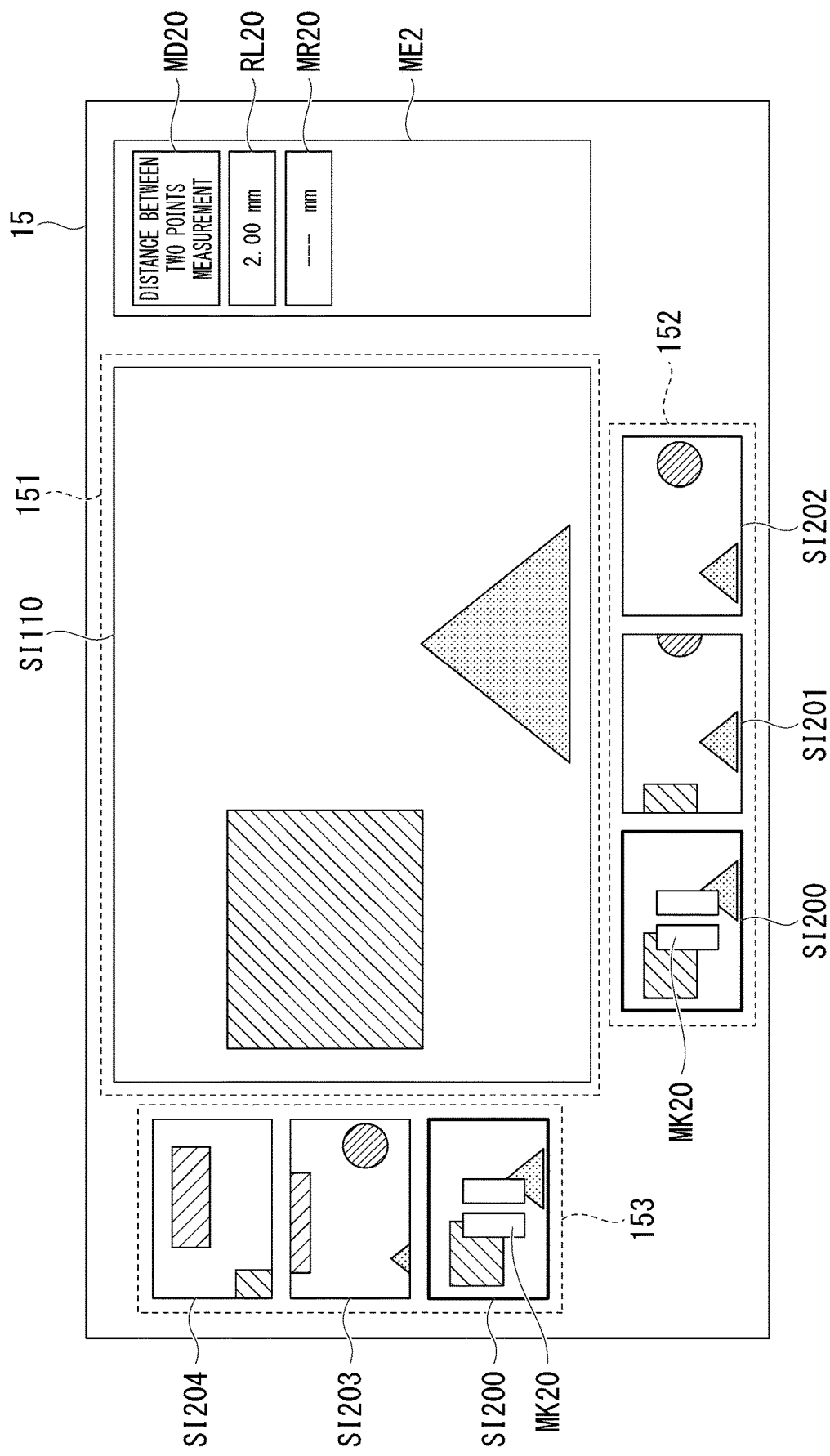
FIG. 27 is a diagram showing an example of an image displayed on a display included in a measurement device according to a modified example of the second embodiment of the present invention.

FIG. 27 shows an example of an image displayed on the display 15 in the first case. The same part as that shown in FIG. 25 will not be described.

A reference image SI110, an image SI200, an image SI201, an image SI202, an image SI203, an image SI204, and a menu ME2 are displayed on the screen of the display 15. The reference image SI110 is displayed in the first region 151 of the display 15. The image SI200, the image SI201, and the image SI202 are displayed in the second region 152 of the display 15. The image SI200, the image SI203, and the image SI204 are displayed in a third region 153 of the display 15.

The third region 153 is different from any of the first region 151 and the second region 152. The third region 153 is disposed on the left side of the first region 151. The long axis direction of the second region 152 and the long axis direction of the third region 153 are orthogonal to each other. Three images are arranged in line in the horizontal direction in the second region 152. Three images are arranged in line in the vertical direction in the third region 153.

A method of arranging each image in the second region 152 and the third region 153 will be described. The display control unit 221 executes processing similar to Step S114 shown in FIG. 4 and detects the moving direction of visual fields between the reference image displayed in the first region 151 and each of at least three images extracted by the image extraction unit 210. The display control unit 221 allocates the at least three images to the second region 152 and the third region 153 on the basis of the detected moving direction. Specifically, the display control unit 221 allocates the image having the visual field moving to the left or right from the visual field of the reference image to the second region 152. The display control unit 221 allocates the image having the visual field moving upward or downward from the visual field of the reference image to the third region 153.

When at least two images are allocated to the second region 152, the display control unit 221 rearranges the images in order of visual fields or in chronological order and displays the images in the second region 152. When one image is allocated to the second region 152, the display control unit 221 displays the image in the second region 152. In addition, the display control unit 221 displays the same image as the reference image in the second region 152.

When at least two images are allocated to the third region 153, the display control unit 221 rearranges the images in order of visual fields or in chronological order and displays the images in the third region 153. When one image is allocated to the third region 153, the display control unit 221 displays the image in the third region 153. In addition, the display control unit 221 displays the same image as the reference image in the third region 153.

In FIG. 27, although a region for which execution of measurement is impossible is not displayed, the region may be displayed. In FIG. 27, although a region in which the measurement accuracy is low is not displayed, the region may be displayed. Hereinafter, in the drawings showing an image displayed on the display 15, these regions are not displayed. In any of the drawings, these regions may be displayed.

Each image used for generating a 3D image has a visual field moving in the vertical direction (upward or downward) or the horizontal direction (left or right) from the visual field of the reference image. In the example shown in FIG. 27, each image is disposed in a region associated with any one of two directions. For this reason, it is easy for a user to understand the relationship of visual fields between the image displayed in the second region 152 or the third region 153 and the reference image displayed in the first region 151. A user can designate the desired image out of at least three images displayed in the second region 152 and the third region 153.

Figure 28:
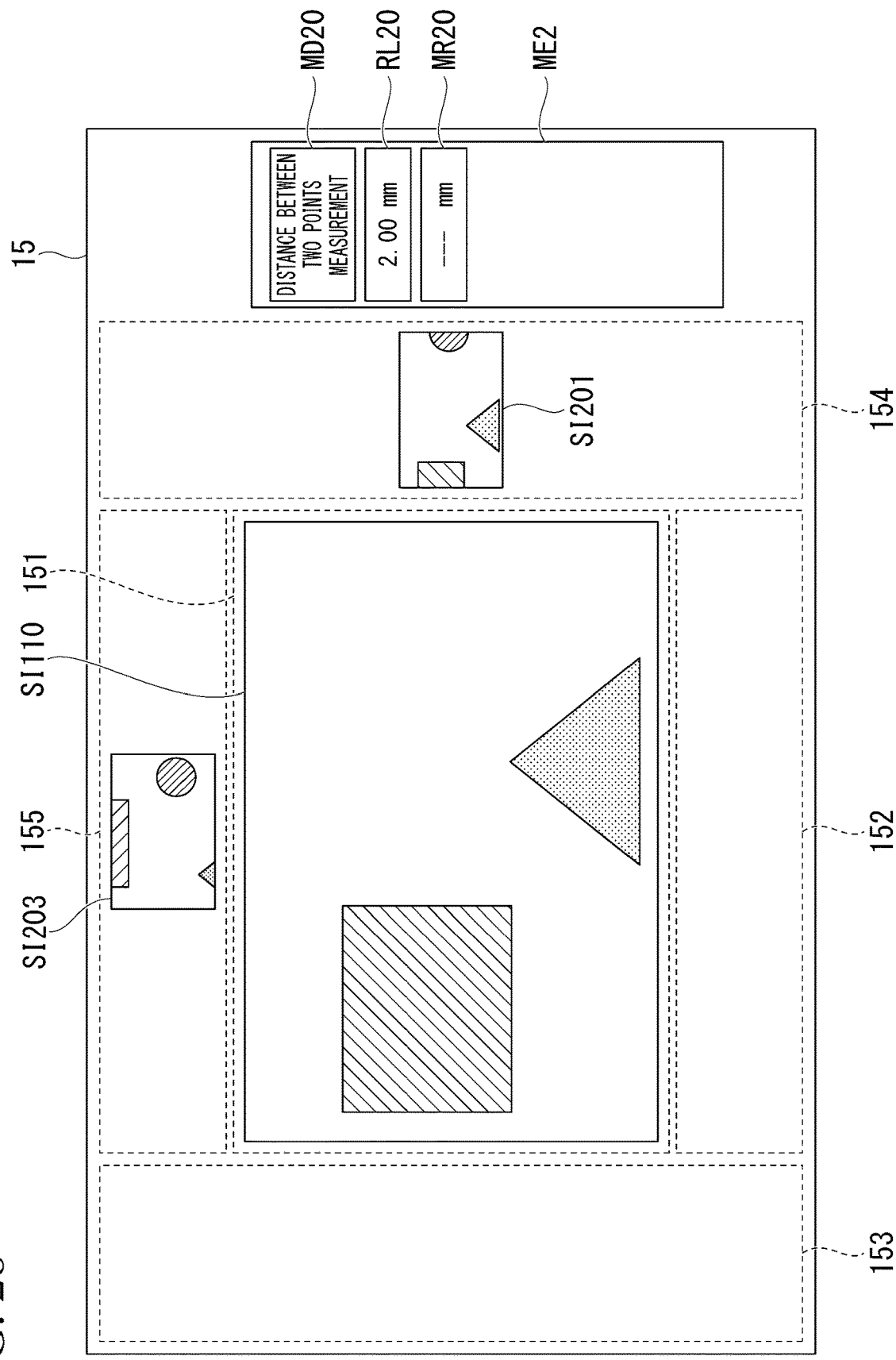
FIG. 28 is a diagram showing an example of an image displayed on the display included in the measurement device according to the modified example of the second embodiment of the present invention.

FIG. 28 shows an example of an image displayed on the display 15 in the second case. The same part as that shown in FIG. 27 will not be described.

In addition to the second region 152 and the third region 153, a fourth region 154 and a fifth region 155 are disposed around the first region 151. The fourth region 154 is different from any of the first region 151, the second region 152, and the third region 153. The fourth region 154 is disposed on the right side of the first region 151. The long axis direction of the second region 152 and the long axis direction of the fourth region 154 are orthogonal to each other. The image SI201 is displayed in the fourth region 154. The fifth region 155 is different from any of the first region 151, the second region 152, the third region 153, and the fourth region 154. The fifth region 155 is disposed on the upper side of the first region 151. The long axis direction of the second region 152 and the long axis direction of the fifth region 155 are parallel to each other. The image SI203 is displayed in the fifth region 155.

A method of arranging each image in the second region 152, the third region 153, the fourth region 154, and the fifth region 155 will be described. The display control unit 221 executes processing similar to Step S114 shown in FIG. 4 and detects the moving direction of visual fields between the reference image displayed in the first region 151 and each of at least three images extracted by the image extraction unit 210. The display control unit 221 allocates the at least three images to the four regions around the first region 151 on the basis of the detected moving direction. Specifically, the display control unit 221 allocates the image having the visual field moving downward from the visual field of the reference image to the second region 152. The display control unit 221 allocates the image having the visual field moving to the left from the visual field of the reference image to the third region 153. The display control unit 221 allocates the image having the visual field moving to the right from the visual field of the reference image to the fourth region 154. The display control unit 221 allocates the image having the visual field moving upward from the visual field of the reference image to the fifth region 155.

The image SI201 has a visual field moving to the right from the visual field of the reference image SI110. For this reason, the image SI201 is displayed in the fourth region 154. The image SI203 has a visual field moving upward from the visual field of the reference image SI110. For this reason, the image SI203 is displayed in the fifth region 155.

The visual field of the image SI202 shown in FIG. 27 is on the right side of the visual field of the image SI201. In FIG. 28, when the reference image SI110 corresponding to the image SI200 is displayed in the first region 151, the image SI202 is not displayed. The visual field of the image SI204 shown in FIG. 27 is on the upper side of the visual field of the image SI203. In FIG. 28, when the reference image SI110 corresponding to the image SI200 is displayed in the first region 151, the image SI204 is not displayed.

Each image used for generating a 3D image has a visual field moving in any one of four directions of up, down, left, and right from the visual field of the reference image. In the example shown in FIG. 28, each image is disposed in a region associated with any one of the four directions. For this reason, it is easy for a user to understand the relationship of visual fields between the image displayed in each of the four regions and the reference image displayed in the first region 151. A user can designate the desired image out of images displayed in the four regions.

Third Embodiment

A third embodiment of the present invention will be described. In the second embodiment, a plurality of images having visual fields of partially overlapping each other are displayed in the second region of the display 15. For this reason, there is a case in which the use efficiency of the screen of the display 15 is low.

In the third embodiment, a combined image generated on the basis of at least three images extracted by the image extraction unit 210 is displayed in the second region of the display 15. A user designates a region on the combined image displayed in the second region of the display 15. At this time, the reference image in the first region of the display 15 becomes hided and an image including the region designated by a user is displayed in the first region of the display 15. For this reason, the screen of the display 15 can be efficiently used.

Figure 29:
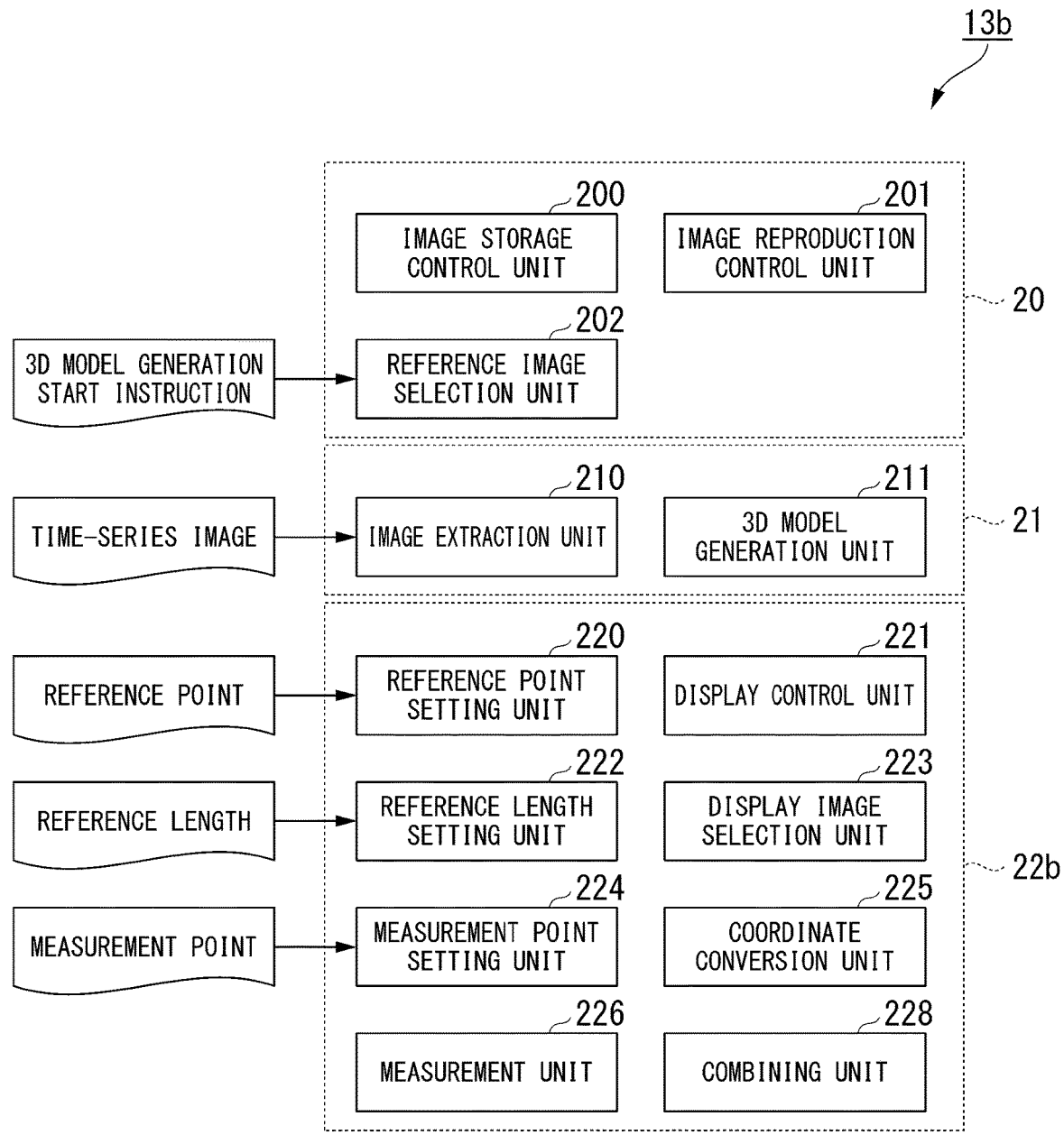
FIG. 29 is a block diagram showing a functional configuration of a CPU included in a measurement device according to a third embodiment of the present invention.

The CPU 13 shown in FIG. 2 is changed to a CPU 13*b* shown in FIG. 29. FIG. 29 shows a functional configuration of the CPU 13*b*. The same configuration as the configuration shown in FIG. 2 will not be described. At least one of blocks shown in FIG. 29 may be constituted by a circuit other than the CPU 13*b*.

Each unit shown in FIG. 29 may be constituted by at least one of a processor and a logic circuit. Each unit shown in FIG. 29 may include one or a plurality of processors. Each unit shown in FIG. 29 may include one or a plurality of logic circuits.

The measurement processing unit 22 shown in FIG. 2 is changed to a measurement processing unit 22*b*. The measurement processing unit 22*b* includes a reference point setting unit 220, a display control unit 221, a reference length setting unit 222, a display image selection unit 223, a measurement point setting unit 224, a coordinate conversion unit 225, a measurement unit 226, and a combining unit 228.

The combining unit 228 generates a combined image. The display control unit 221 displays the combined image in the second region of the display 15. A user inputs an instruction for designating a region on the combined image. At this time, the display control unit 221 hides an image in the first region of the display 15 and displays an image including the designated region in the first region.

Figure 30:
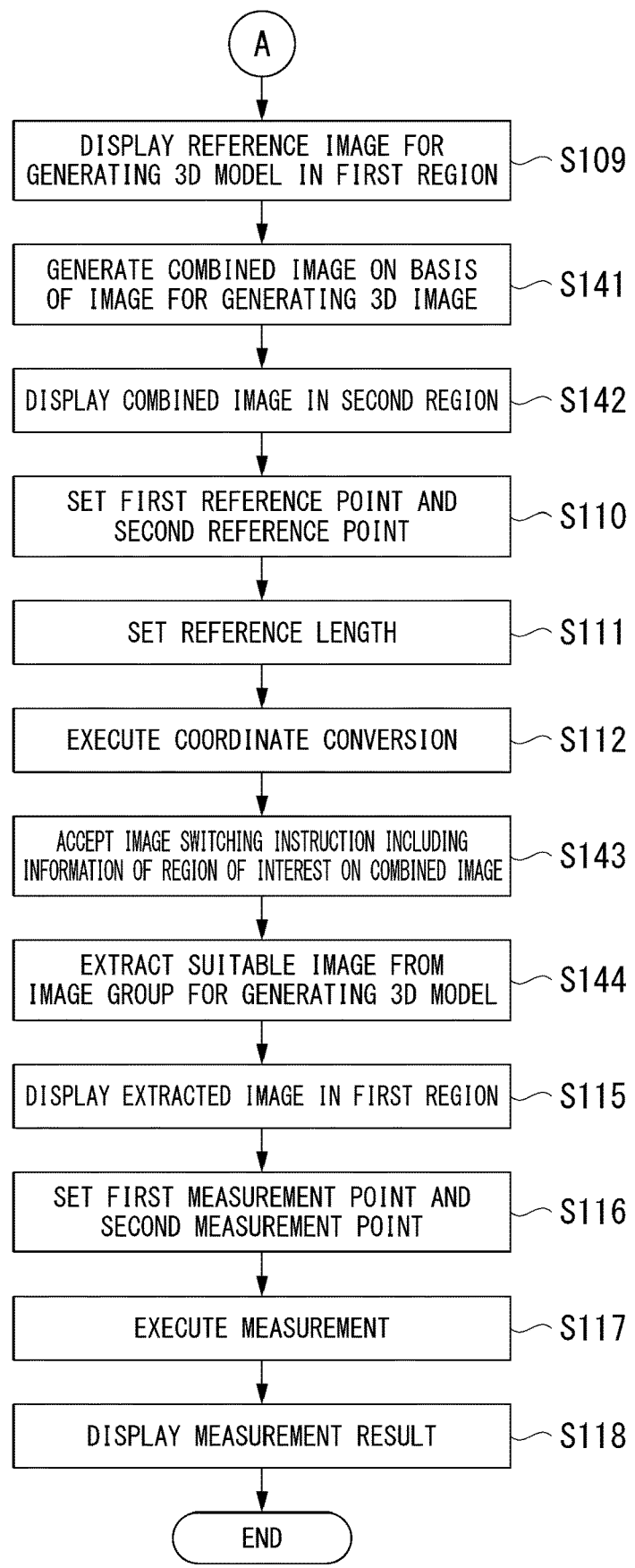
FIG. 30 is a flow chart showing a procedure of processing executed by the measurement device according to the third embodiment of the present invention.

The processing shown in FIG. 4 is changed to processing shown in FIG. 30. A procedure of processing executed for measurement will be described with reference to FIG. 30. FIG. 30 shows a procedure of processing executed by the CPU 13*b*. The same processing as the processing shown in FIG. 4 will not be described.

After Step S109, the combining unit 228 generates a combined image on the basis of at least three images extracted in Step S106 (Step S141). In general, a combined image is called a panoramic image, a stuck image, a stitched image, or the like. A known technical means can be used for generating a combined image.

After Step S141, the display control unit 221 displays the combined image generated by the combining unit 228 in the second region of the display 15 (Step S142). The second region of the display 15 is different from the first region in which the reference image is displayed.

Hereinafter, a case in which a measurement point that a user desires to designate is not seen in the reference image in the first region is assumed. A user designates a region of interest on the combined image displayed in the second region by operating the operation unit 12. In this way, a user inputs an image switching instruction. The image switching instruction includes information of the region of interest designated by a user. After Step S112, the display image selection unit 223 accepts the image switching instruction from the operation unit 12 (Step S143).

For example, a user designates a region of interest by designating a region having a rectangular shape or the like. A user may designate a point and thus designate a region of interest including the point and having a predetermined size. In a case in which the display 15 is a touch panel, a user can designate a region of interest by touching the position of the region of interest on the combined image.

After Step S143, the display image selection unit 223 selects one image including the region of interest designated by a user from at least three images extracted in Step S106 (Step S144).

When at least two images include the region of interest, the display image selection unit 223 selects one image suitable for designating a measurement point. For example, the display image selection unit 223 may select an image in which the contrast of the region of interest is the highest. The display image selection unit 223 may select an image in which the resolution of the region of interest is the highest. The display image selection unit 223 may select an image in which the area of the region of interest is the largest. As long as an image including at least part of the region of interest designated by a user is selected, the method of selecting an image is not limited to the above-described method.

After Step S144, the display control unit 221 hides an image in the first region and displays the image selected by the display image selection unit 223 in the second region in Step S115.

Figure 31:
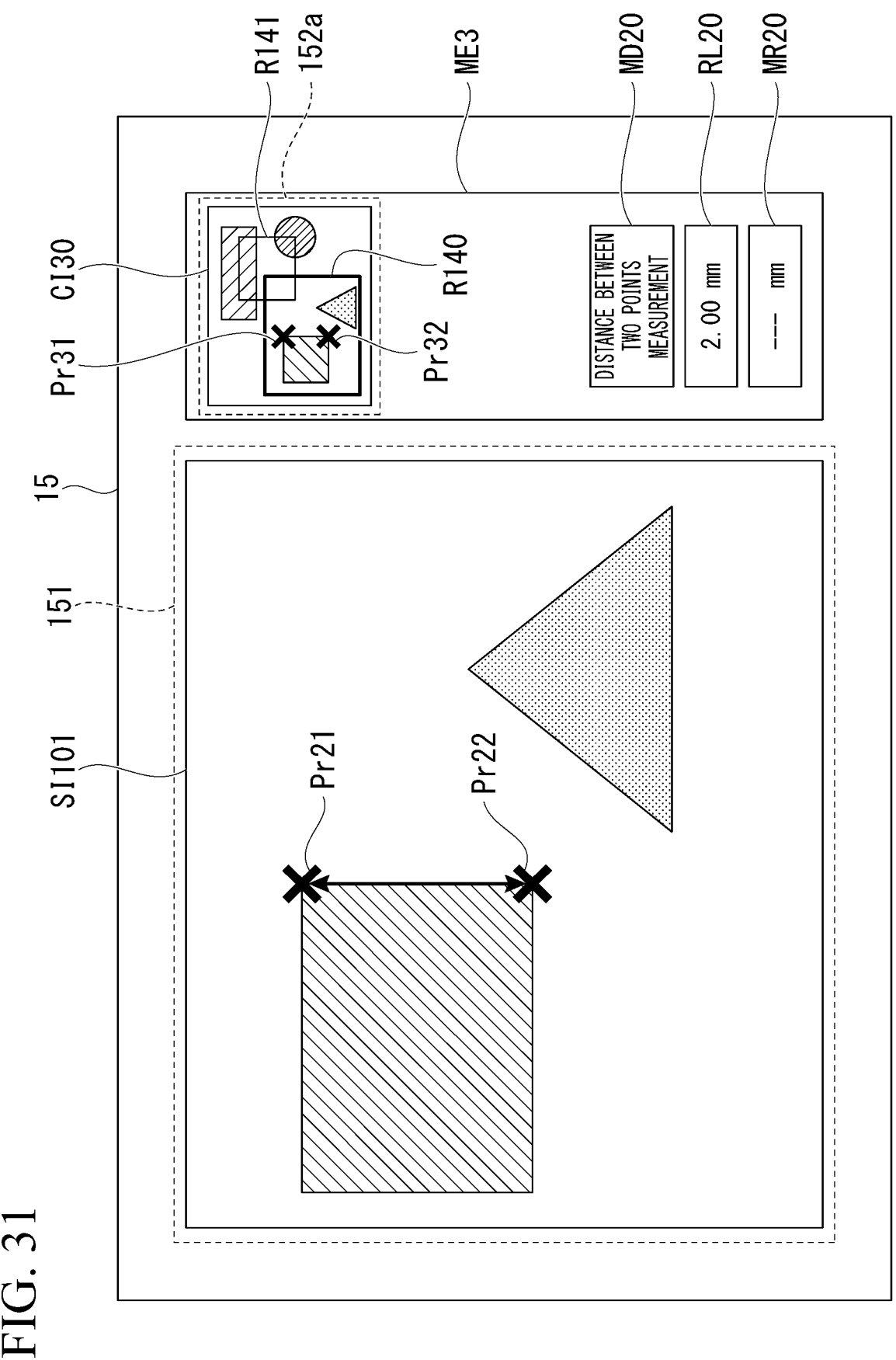
FIG. 31 is a diagram showing an example of an image displayed on a display included in the measurement device according to the third embodiment of the present invention.

FIG. 31 shows an example of an image displayed on the display 15 after the reference length is set in Step S111. The same part as that shown in FIG. 7 will not be described.

A measurement mode MD20, a reference length setting RL20, and a measurement result MR20 are displayed on a menu ME3. A combined image CI30 is displayed in a second region 152*a* on the menu ME3. The entire or part of the combined image generated by the combining unit 228 is displayed as the combined image CI30.

A region R140 is displayed on the combined image CI30. The region R140 is a region on the combined image CI30 corresponding to a reference image SI101. The display control unit 221 highlights the region R140 on the combined image CI30 in Step S142. In the example shown in FIG. 31, the display control unit 221 surrounds the region R140 with a thick line. As long as a user can associate the region R140 on the combined image CI30 and the reference image SI101 with each other, a method of highlighting the region R140 is not limited to the above-described method.

A user designates a region R141 of interest on the combined image CI30. The region R141 of interest may be displayed on the combined image CI30. Alternatively, the region R141 of interest may not be displayed on the combined image CI30.

A first reference point Pr31 and a second reference point Pr32 are displayed on the combined image CI30. The first reference point Pr31 corresponds to a first reference point Pr21 designated on the reference image SI101. The second reference point Pr32 corresponds to a second reference point Pr22 designated on the reference image SI101. The display control unit 221 highlights the first reference point Pr31 and the second reference point Pr32 in Step S110. In the example shown in FIG. 31, the display control unit 221 displays a mark of each reference point on the combined image CI30. As long as a user can associate a designation point on the reference image SI101 displayed in the first region 151 and a point on the combined image CI30 displayed in the second region 152a with each other, a method of highlighting a point on the combined image CI30 is not limited to the above-described method.

The order of processing executed by the CPU 13b is not limited to the order shown in FIG. 3 and FIG. 30. For example, as long as Step S108 is executed before Step S112 is executed, Step S108 may be executed at any timing between Step S107 and Step S117.

Step S141 may be executed at any timing between Step S107 and Step S110. As long as Step S142 is executed after Step S141 is executed, Step S142 may be executed at any timing between Step S107 and Step S143.

Steps S143 to S116 may be repeatedly executed. In step S116, at least one measurement point is set. Therefore, at least one measurement point may be set on each of two or more images.

A measurement method according to each aspect of the present invention may include a combining step and a combined image display step. The combining unit 228 generates a combined image by sticking (combining or connecting) a plurality of second images together in the combining step (Step S141). The display control unit 221 displays the combined image CI30 in the second region 152a of the display 15 in the combined image display step (Step S142). After a first point is set on a first image and an instruction for designating the region R141 of interest on the combined image CI30 is accepted, the display control unit 221 hides the first image in the first region 151 of the display 15 and displays a second image including the designated region R141 of interest in the first region 151 in Step S115.

The first image corresponds to the reference image SI101. The plurality of second images correspond to the images extracted in Step S106. The plurality of second images may include or may not include the reference image SI101. The first point corresponds to at least one of the first reference point Pr21 and the second reference point Pr22 shown in FIG. 31.

A measurement method according to each aspect of the present invention may include a point display step. The display control unit 221 highlights a third point on the combined image CI30 in the point display step. The third point corresponds to the first point or a second point. In the example shown in FIG. 31, the display control unit 221 displays the first reference point Pr31 and the second reference point Pr32 on the combined image CI30 in Step S110.

The second point corresponds to at least one of the first measurement point and the second measurement point set in Step S116. The display control unit 221 may display the first measurement point and the second measurement point on the combined image CI30 in Step S116.

In the third embodiment, the combined image CI30 is displayed in the second region 152a of the display 15. For this reason, the screen of the display 15 can be efficiently used. For example, the first region 151 shown in FIG. 31 can be made larger than the first region 151 shown in FIG. 25.

After a designation point is designated on an image displayed in the first region 151, a point corresponding to the designation point is displayed on the combined image CI30. A user can confirm the position of a designation point in at least three images used for generating a 3D model on the combined image CI30.

Modified Example of Third Embodiment

A modified example of the third embodiment of the present invention will be described. An image (3D image) of a 3D model generated by the 3D model generation unit 211 is displayed in the second region of the display 15. A user designates a region on the 3D image displayed in the second region of the display 15. At this time, a reference image in the first region of the display 15 becomes hided and an image including the region designated by a user is displayed in the first region of the display 15.

The measurement device 1 according to the modified example of the third embodiment includes the CPU 13 shown in FIG. 2.

Figure 32:
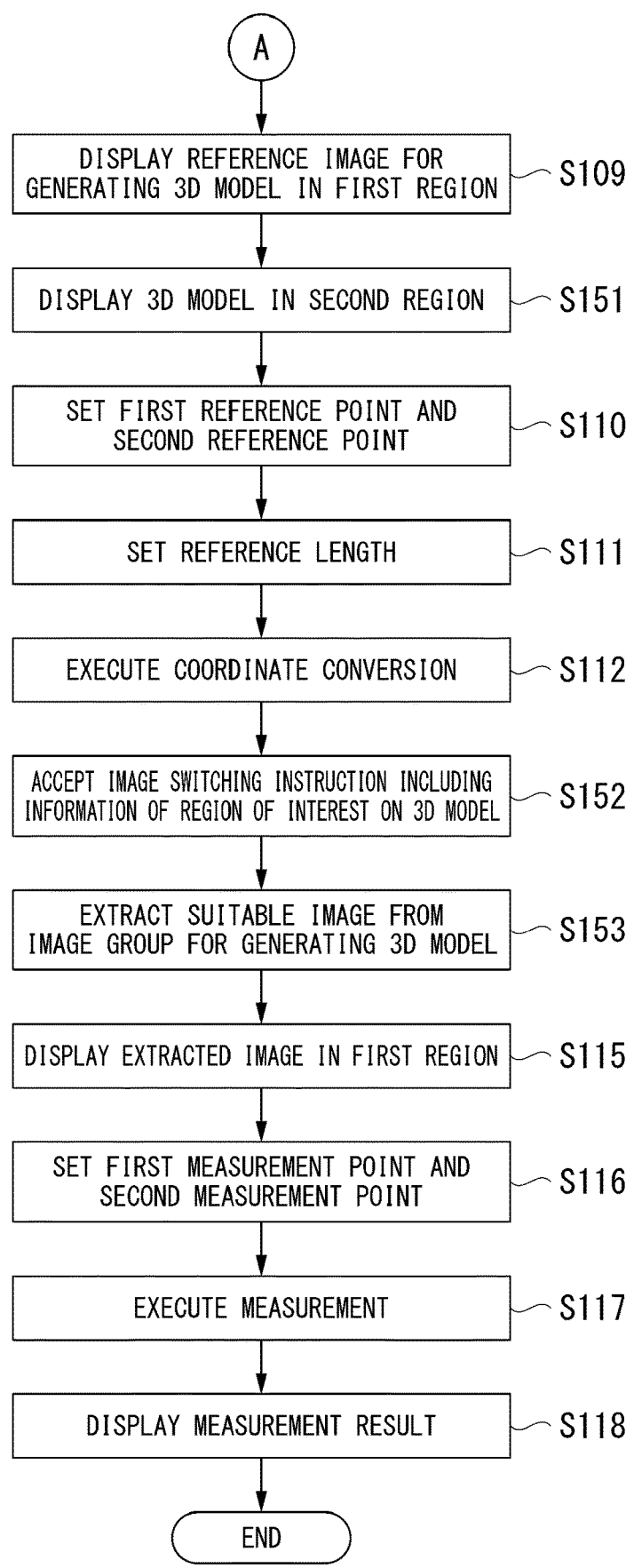
FIG. 32 is a flow chart showing a procedure of processing executed by a measurement device according to a modified example of the third embodiment of the present invention.

The processing shown in FIG. 4 is changed to processing shown in FIG. 32. A procedure of processing executed for measurement will be described with reference to FIG. 32. FIG. 32 shows a procedure of processing executed by the CPU 13. The same processing as the processing shown in FIG. 4 will not be described.

After Step S109, the display control unit 221 displays an image (3D image) of a 3D model in the second region of the display 15 (Step S151). The second region of the display 15 is different from the first region in which the reference image is displayed. After Step S151, Step S110 is executed.

Hereinafter, a case in which a measurement point that a user desires to designate is not seen in the reference image in the first region is assumed. A user designates a region of interest on the 3D image displayed in the second region by operating the operation unit 12. In this way, a user inputs an image switching instruction. The image switching instruction includes information of the region of interest designated by a user. After Step S112, the display image selection unit 223 accepts the image switching instruction from the operation unit 12 (Step S152).

After Step S152, the display image selection unit 223 selects one image including a region corresponding to the region of interest designated by a user from at least three images extracted in Step S106 (Step S153). A position on the image used for generating the 3D model and a position on the 3D model are associated with each other. The display image selection unit 223 selects an image including a region associated with the region of interest designated on the 3D model in Step S153.

After Step S153, the display control unit 221 hides an image in the first region and displays the image selected by the display image selection unit 223 in the second region in Step S115.

Figure 33:
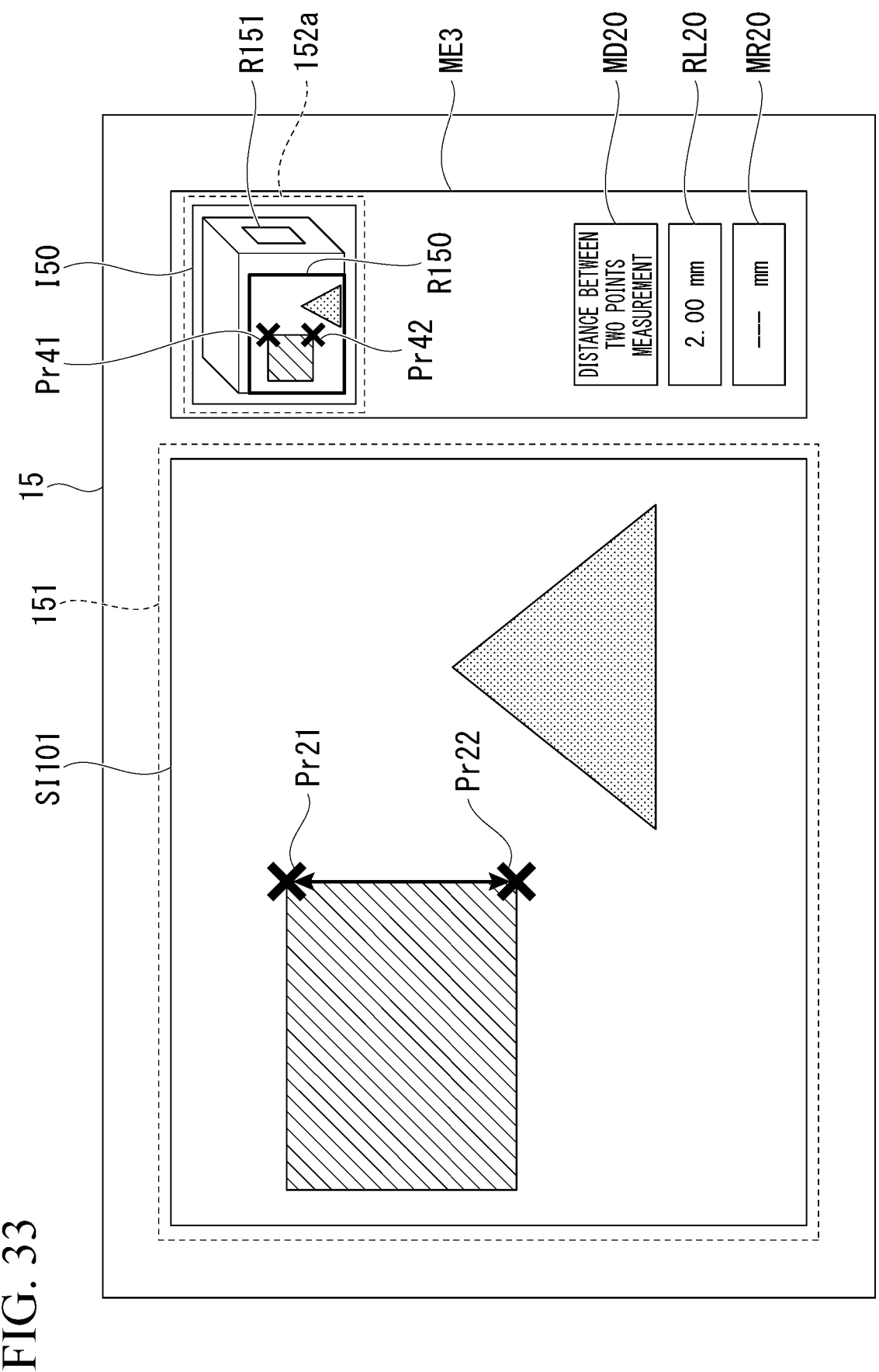
FIG. 33 is a diagram showing an example of an image displayed on a display included in the measurement device according to the modified example of the third embodiment of the present invention.

FIG. 33 shows an example of an image displayed on the display 15 after the reference length is set in Step S111. The same part as that shown in FIG. 31 will not be described.

A 3D image I50 is displayed in a second region 152a on a menu ME3. An image of the entire or part of the 3D model generated by the 3D model generation unit 211 is displayed as the 3D image I50.

A region R150 is displayed on the 3D image I50. The region R150 is a region on the 3D image I50 corresponding to a reference image SI101. The display control unit 221 highlights the region R150 on the 3D image I50 in Step S151. In the example shown in FIG. 33, the display control unit 221 surrounds the region R150 with a thick line. As long as a user can associate the region R150 on the 3D image I50 and the reference image SI101 with each other, a method of highlighting the region R150 is not limited to the above-described method.

A user designates a region R151 of interest on the 3D image I50. Before a user designates the region R151 of interest, magnification of the 3D image I50, reduction of the 3D image I50, rotation of the 3D image I50, translation of the 3D image I50, or the like may be performed in accordance with an instruction from a user. The region R151 of interest may be displayed on the 3D image I50. Alternatively, the region R151 of interest may not be displayed on the 3D image I50.

A first reference point Pr41 and a second reference point Pr42 are displayed on the 3D image I50. The first reference point Pr41 corresponds to a first reference point Pr21 designated on the reference image SI101. The second reference point Pr42 corresponds to a second reference point Pr22 designated on the reference image SI101. The display control unit 221 highlights the first reference point Pr41 and the second reference point Pr42 in Step S110. In the example shown in FIG. 33, the display control unit 221 displays a mark of each reference point on the 3D image I50. As long as a user can associate a designation point on the reference image SI101 displayed in the first region 151 and a point on the 3D image I50 displayed in the second region 152a with each other, a method of highlighting a point on the 3D image I50 is not limited to the above-described method.

The order of processing executed by the CPU 13 is not limited to the order shown in FIG. 3 and FIG. 32. For example, as long as Step S108 is executed before Step S112 is executed, Step S108 may be executed at any timing between Step S107 and Step S117. Step S151 may be executed at any timing between Step S108 and Step S152.

Steps S152 to S116 may be repeatedly executed. In step S116, at least one measurement point is set. Therefore, at least one measurement point may be set on each of two or more images.

A measurement method according to each aspect of the present invention may include a three-dimensional image display step. The display control unit 221 displays the 3D image I50 (three-dimensional image) that represents a three-dimensional shape of a subject in the second region 152a of the display 15 in the three-dimensional image display step (Step S151). After a first point is set on a first image and an instruction for designating the region R151 of interest on the 3D image I50 is accepted, the display control unit 221 hides the first image in the first region 151 of the display 15 and displays a second image including a region corresponding to the designated region R151 of interest in the first region 151 in Step S115.

The first image corresponds to the reference image SI101. The plurality of second images correspond to the images extracted in Step S106. The plurality of second images may include or may not include the reference image SI101. The first point corresponds to at least one of the first reference point Pr21 and the second reference point Pr22 shown in FIG. 33.

A measurement method according to each aspect of the present invention may include a point display step. The display control unit 221 highlights a third point on the 3D image I50 in the point display step. The third point corresponds to the first point or a second point. In the example shown in FIG. 33, the display control unit 221 displays the first reference point Pr41 and the second reference point Pr42 on the 3D image I50 in Step S110.

The second point corresponds to at least one of the first measurement point and the second measurement point set in Step S116. The display control unit 221 may display the first measurement point and the second measurement point on the 3D image I50 in Step S116.

In the modified example of the third embodiment, the 3D image I50 is displayed in the second region 152a of the display 15. For this reason, the screen of the display 15 can be efficiently used. For example, the first region 151 shown in FIG. 33 can be made larger than the first region 151 shown in FIG. 25.

After a designation point is designated on an image displayed in the first region 151, a point corresponding to the designation point is displayed on the 3D image I50. A user can confirm the position of a designation point in at least three images used for generating a 3D model on the 3D image I50.

Fourth Embodiment

A fourth embodiment of the present invention will be described. In each of the above-described embodiments, a case in which the measurement device 1 executes SfM by using an image acquired through a single eye is assumed. In the fourth embodiment, each image included in an image group is a stereo image including an image of a subject seen from a first viewpoint and an image of the subject seen from a second viewpoint different from the first viewpoint. The image group consists of at least three images extracted by the image extraction unit 210. In the fourth embodiment, the measurement device 1 generates a 3D model on the basis of at least three stereo images, the position of a camera, and the posture of the camera. The measurement device 1 estimates the position and the posture of the camera by solving a perspective-n-point problem (PnP problem).

Figure 34:
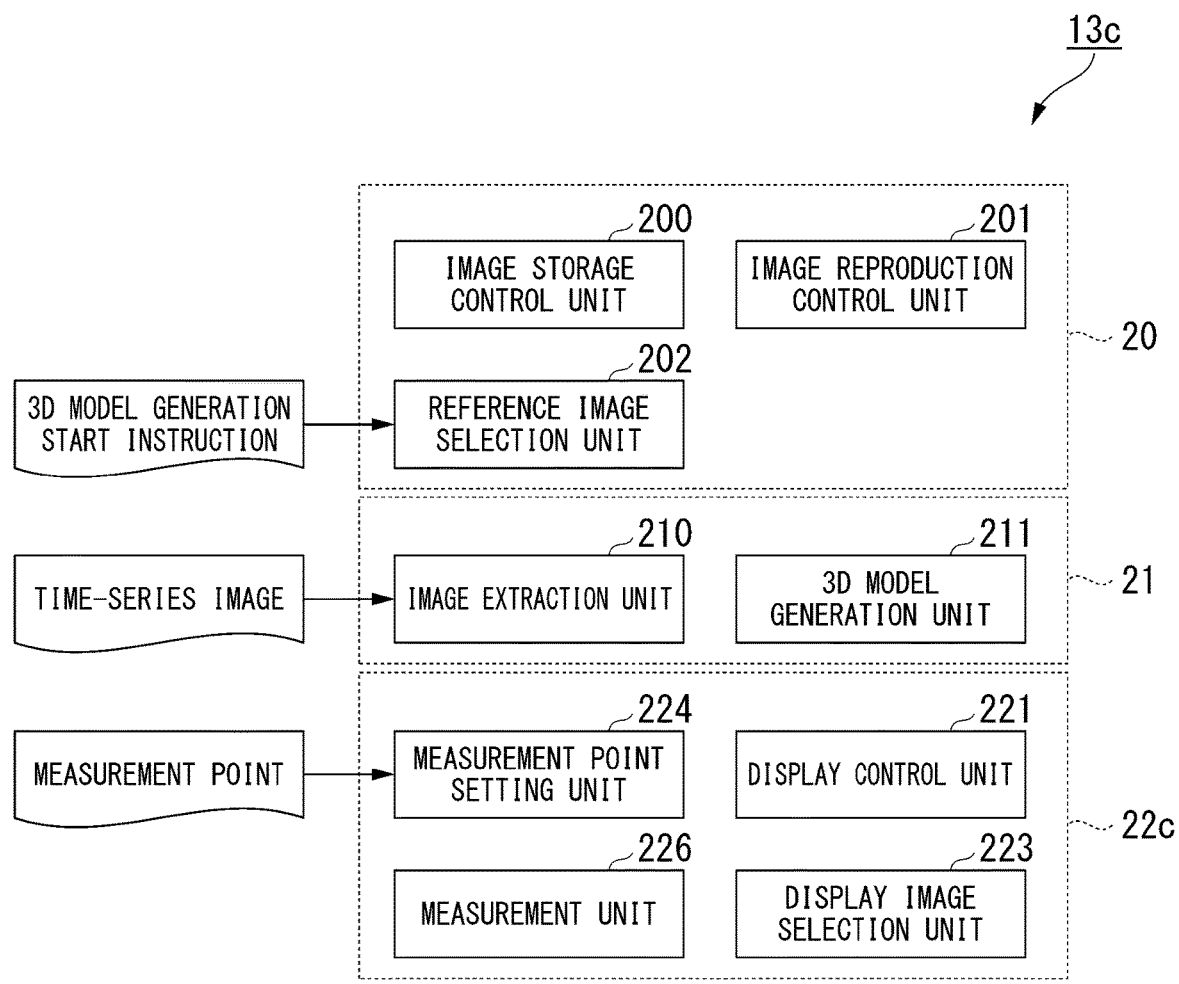
FIG. 34 is a block diagram showing a functional configuration of a CPU included in a measurement device according to a fourth embodiment of the present invention.

The CPU 13 shown in FIG. 2 is changed to a CPU 13c shown in FIG. 34. FIG. 34 shows a functional configuration of the CPU 13c. The same configuration as the configuration shown in FIG. 2 will not be described. At least one of blocks shown in FIG. 34 may be constituted by a circuit other than the CPU 13c.

Each unit shown in FIG. 34 may be constituted by at least one of a processor and a logic circuit. Each unit shown in FIG. 34 may include one or a plurality of processors. Each unit shown in FIG. 34 may include one or a plurality of logic circuits.

The measurement processing unit 22 shown in FIG. 2 is changed to a measurement processing unit 22c. The measurement processing unit 22c includes a display control unit 221, a display image selection unit 223, a measurement point setting unit 224, and a measurement unit 226. The measurement processing unit 22c does not include the reference point setting unit 220, the reference length setting unit 222, and the coordinate conversion unit 225.

Figure 35:
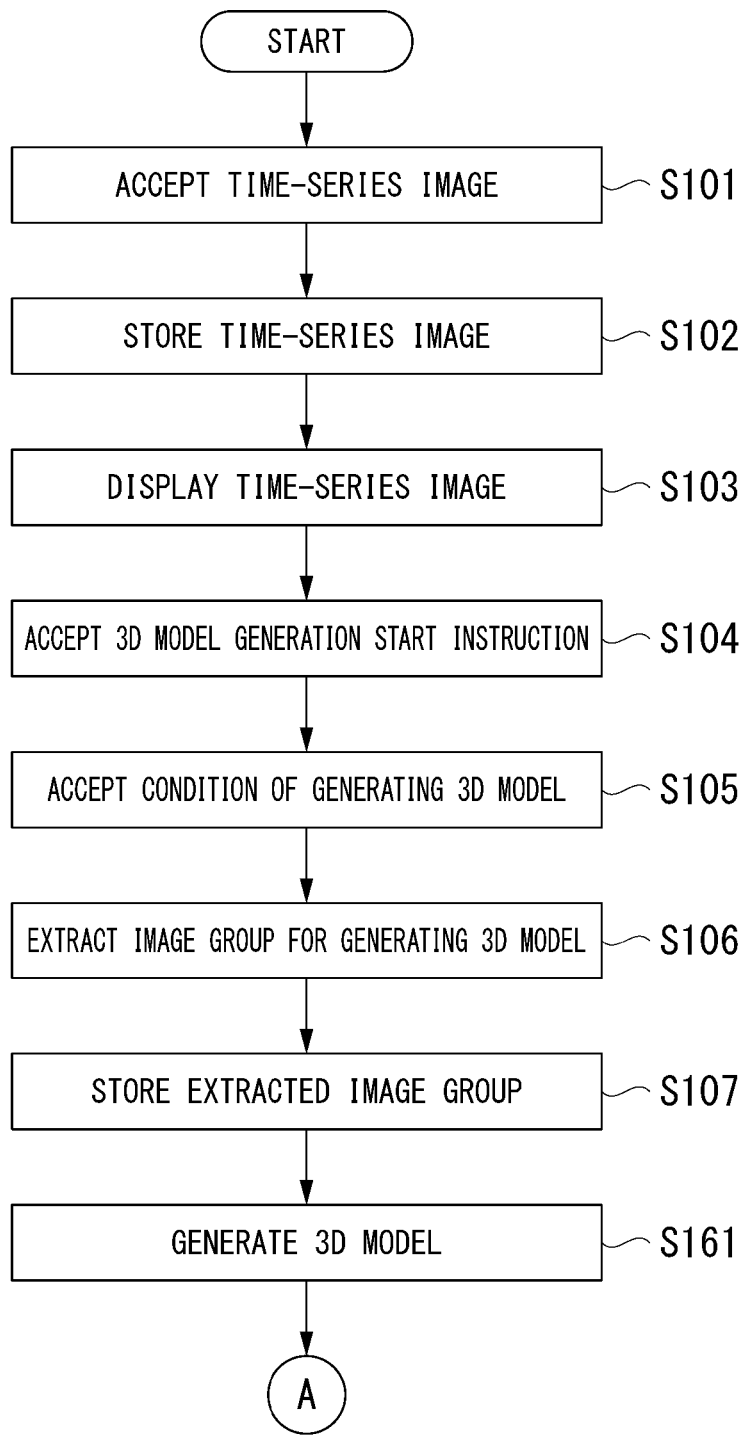
FIG. 35 is a flow chart showing a procedure of processing executed by the measurement device according to the fourth embodiment of the present invention.
Figure 36:
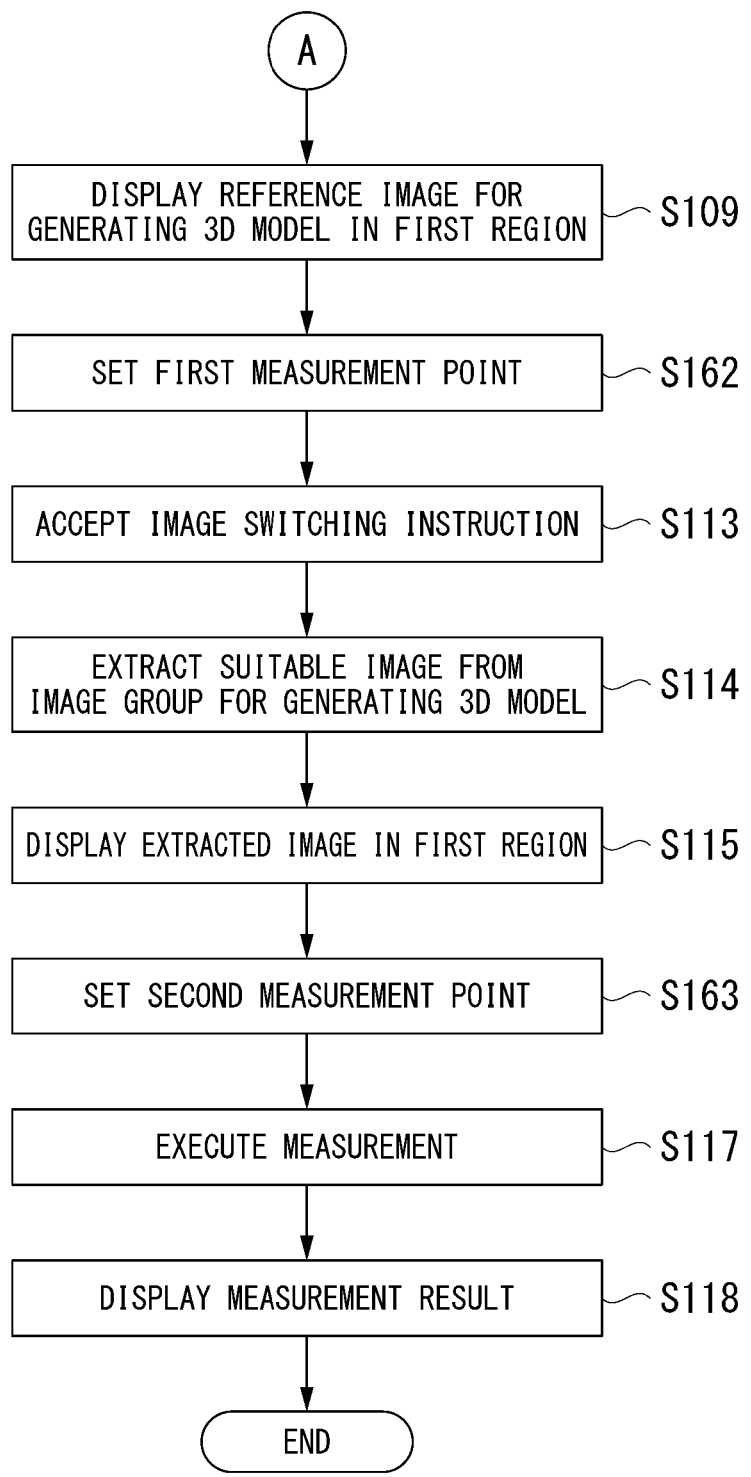
FIG. 36 is a flow chart showing a procedure of processing executed by the measurement device according to the fourth embodiment of the present invention.

The processing shown in FIG. 3 and FIG. 4 is changed to processing shown in FIG. 35 and FIG. 36. A procedure of processing executed for measurement will be described with reference to FIG. 35 and FIG. 36. FIG. 35 and FIG. 36 show a procedure of processing executed by the CPU 13c. The same processing as the processing shown in FIG. 3 and FIG. 4 will not be described.

After Step S107, the 3D model generation unit 211 estimates the position and the posture of a camera when each image extracted by the image extraction unit 210 is generated. The 3D model generation unit 211 can estimate the position and the posture of the camera by solving a PnP problem by using a known technology (for example, open source software or the like). The 3D model generation unit 211 generates a 3D model on the basis of the estimated position and posture of the camera (Step S161). After Step S161, Step S109 is executed.

In the fourth embodiment, the 3D model generation unit 211 uses a stereo image. For this reason, the 3D model generation unit 211 can easily calculate three-dimensional coordinates of each pixel on the basis of two images within one stereo image without using SfM. The 3D model generation unit 211 obtains a 3D model having a wide range by connecting together 3D models including three-dimensional coordinates of each pixel of at least three images extracted in Step S106.

In the fourth embodiment, since a stereo image is used, a reference point and a reference length are unnecessary. For this reason, Step S111 and Step S112 shown in FIG. 4 are not executed.

Hereinafter, it is assumed that a user designates two measurement points and the measurement unit 226 executes distance between two points measurement.

After a reference image is displayed on the display 15, a user designates a first measurement point on the image displayed on the display 15 by operating the operation unit 12. The measurement point setting unit 224 accepts the first measurement point designated by a user from the operation unit 12. The measurement point setting unit 224 sets the first measurement point designated by a user on the reference image displayed on the display 15 (Step S162). After Step S162, Step S113 is executed. Since a second measurement point that a user desires to designate is not seen in the reference image, Steps S113 to S115 are executed and images in the first region of the display 15 are switched.

After images are switched, a user designates a second measurement point on the image displayed on the display 15 by operating the operation unit 12. The measurement point setting unit 224 accepts the second measurement point designated by a user from the operation unit 12. The measurement point setting unit 224 sets the second measurement point designated by a user on the reference image displayed on the display 15 (Step S163). After Step S163, Step S117 is executed.

Steps S113 to S163 may be repeatedly executed. Therefore, a measurement point may be set on each of two or more images.

In the embodiment other than the fourth embodiment, a stereo image may be used.

In the fourth embodiment, the measurement device 1 can set a plurality of points used for measurement on a plurality of stereo images. There is a case in which two designation points for three-dimensional measurement are apart from each other and do not fall within a visual field of one stereo image. Since the measurement device 1 switches stereo images displayed on the display 15, stereo images in which each designation point is seen are displayed in order. A user can designate a designation point on each stereo image. For this reason, operability by a user in measurement is improved.

Fifth Embodiment

A fifth embodiment of the present invention will be described. A user designates a designation point on an image displayed in the first region of the display 15. In the fifth embodiment, the measurement device 1 displays a point corresponding to the designation point on an image in the second region of the display 15. At this time, the measurement device 1 displays an image generated by magnifying the periphery of the point.

While a designation point is not designated by a user, the entire visual field of each image for generating a 3D model is displayed in the second region of the display 15. A user can confirm a region that is not included in an image displayed in the first region by using an image in the second region. When a designation point is designated by a user, the periphery of a point corresponding to the designation point is magnified and displayed in the second region. A user can confirm only the periphery of the designation point in detail.

The measurement device 1 according to the fifth embodiment includes the CPU 13a shown in FIG. 18.

Figure 37:
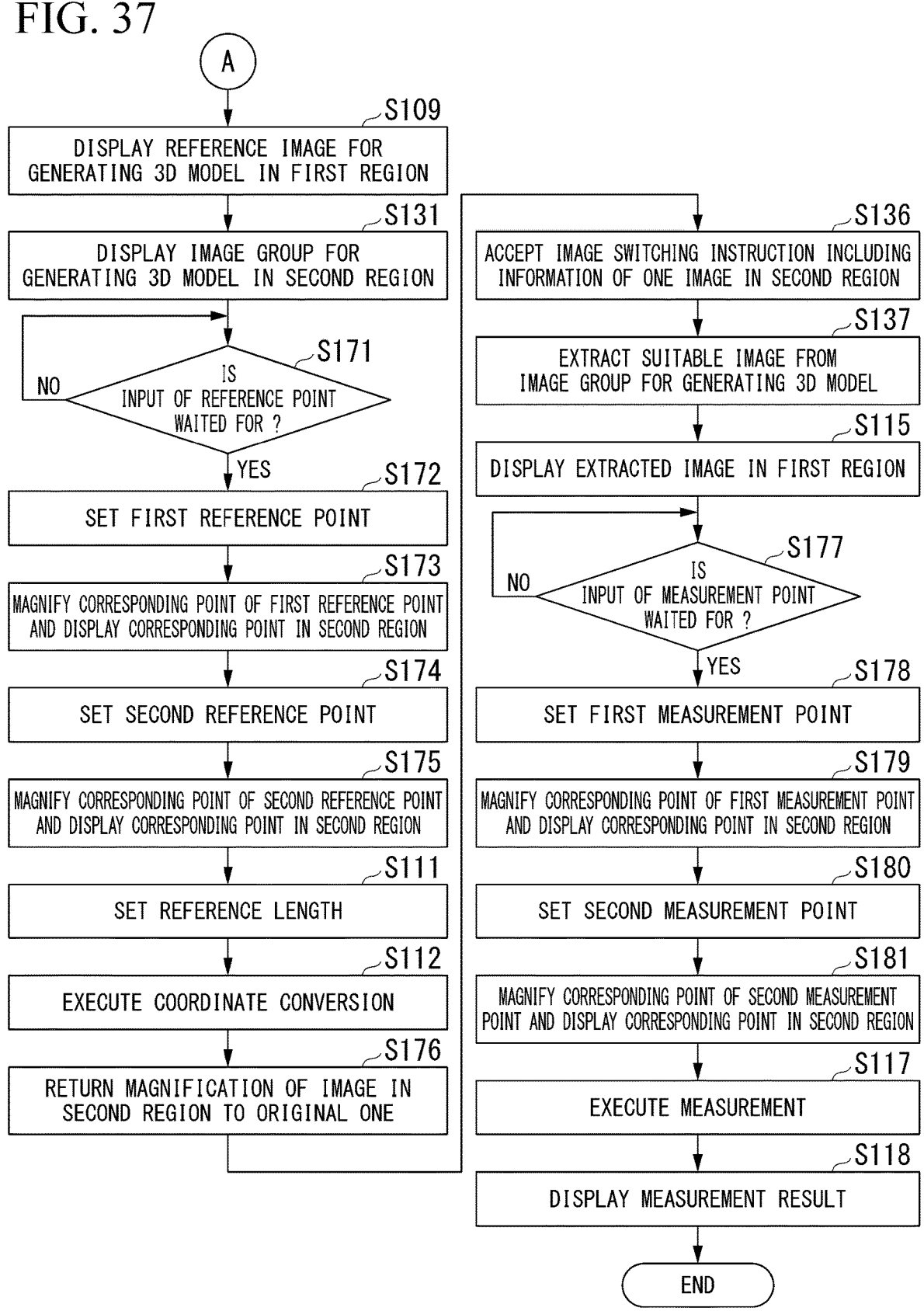
FIG. 37 is a flow chart showing a procedure of processing executed by a measurement device according to a fifth embodiment of the present invention.

The processing shown in FIG. 19 is changed to processing shown in FIG. 37. A procedure of processing executed for measurement will be described with reference to FIG. 37. FIG. 37 shows a procedure of processing executed by the CPU 13a. The same processing as the processing shown in FIG. 19 will not be described.

After Step S131, the reference point setting unit 220 determines whether or not the measurement device 1 is in a state of waiting for input of a reference point (Step S171). For example, when a user presses a button for instructing for starting input of a reference point, the measurement device 1 is in the state of waiting for input of a reference point.

When the reference point setting unit 220 determines that the measurement device 1 is not in the state of waiting for input of a reference point, the reference point setting unit 220 repeatedly executes Step S171. In this case, a user may move a cursor on an image displayed in the first region of the display 15 and display the RGB value of the image. Alternatively, a user may magnify or reduce an image by performing a click operation by using the mouse 12a. A user can confirm whether or not there is a defect in detail.

When the reference point setting unit 220 determines that the measurement device 1 is in the state of waiting for input of a reference point, a user can designate a reference point. A user designates a first reference point on a reference image displayed in the first region of the display 15 by operating the operation unit 12. The reference point setting unit 220 accepts the first reference point designated by a user from the operation unit 12. The reference point setting unit 220 sets the first reference point designated by a user on the reference image displayed in the first region of the display 15 (Step S172).

After Step S172, the display control unit 221 detects a corresponding point in at least three images displayed in the second region of the display 15. The corresponding point corresponds to the first reference point set in Step S172. The display control unit 221 displays an image generated by magnifying the periphery of the detected corresponding point in the second region of the display 15 (Step S173).

After the first reference point is set, a user designates a second reference point on the reference image displayed in the first region of the display 15 by operating the operation unit 12. The reference point setting unit 220 accepts the second reference point designated by a user from the operation unit 12. The reference point setting unit 220 sets the second reference point designated by a user on the reference image displayed in the first region of the display 15 (Step S174).

After Step S174, the display control unit 221 detects a corresponding point in at least three images displayed in the second region of the display 15. The corresponding point corresponds to the second reference point set in Step S174. The display control unit 221 displays an image generated by magnifying the periphery of the corresponding point in the second region of the display 15 (Step S175). After Step S175, Step S111 is executed.

Figure 38:
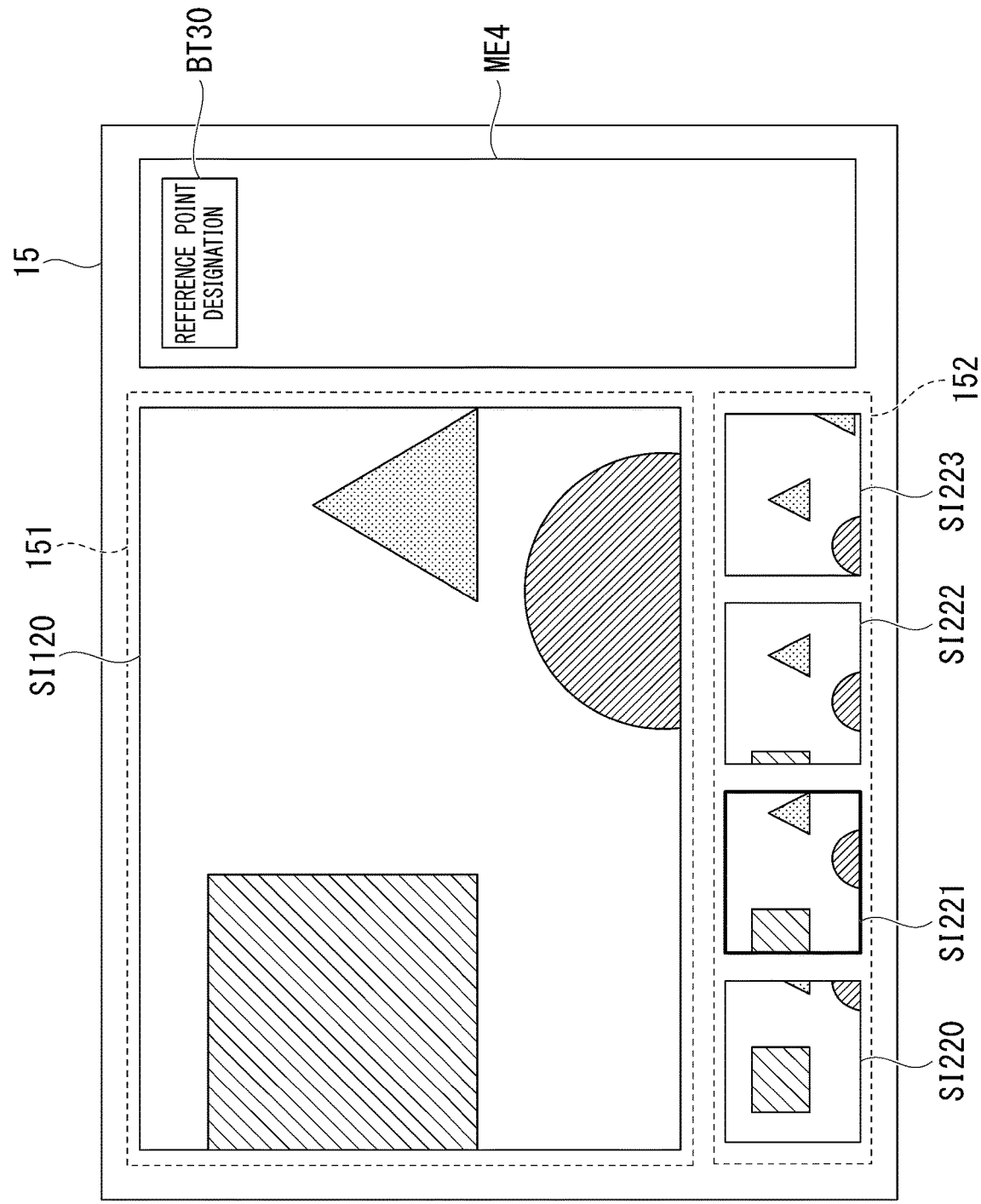
FIG. 38 is a diagram showing an example of an image displayed on a display included in the measurement device according to the fifth embodiment of the present invention.

FIG. 38 shows an example of an image displayed on the display 15 in Step S131. The same part as that shown in FIG. 25 will not be described.

A reference image SI120, an image SI220, an image SI221, an image SI222, an image SI223, and a menu ME4 are displayed on the screen of the display 15. The reference image SI120 is displayed in the first region 151 of the display 15.

The image SI220, the image SI221, the image SI222, and the image SI223 correspond to at least three images extracted in Step S106. The visual field of each of these images is the same as the visual field of each image extracted in Step S106. These images are displayed in the second region 152 of the display 15. The image SI221 corresponds to the reference image SI120. Before a user designates a designation point, the entire visual field of each of the image SI220, the image SI221, the image SI222, and the image SI223 is displayed.

A button BT30 is displayed on the menu ME4. The button BT30 is a button for inputting an instruction for starting designation of a designation point. A user can press the button BT30 through the operation unit 12. In a case in which the display 15 is a touch panel, a user can press the button BT30 on the screen. When a user presses the button BT30, the measurement device 1 turns into a state of waiting for input of a reference point.

Figure 39:
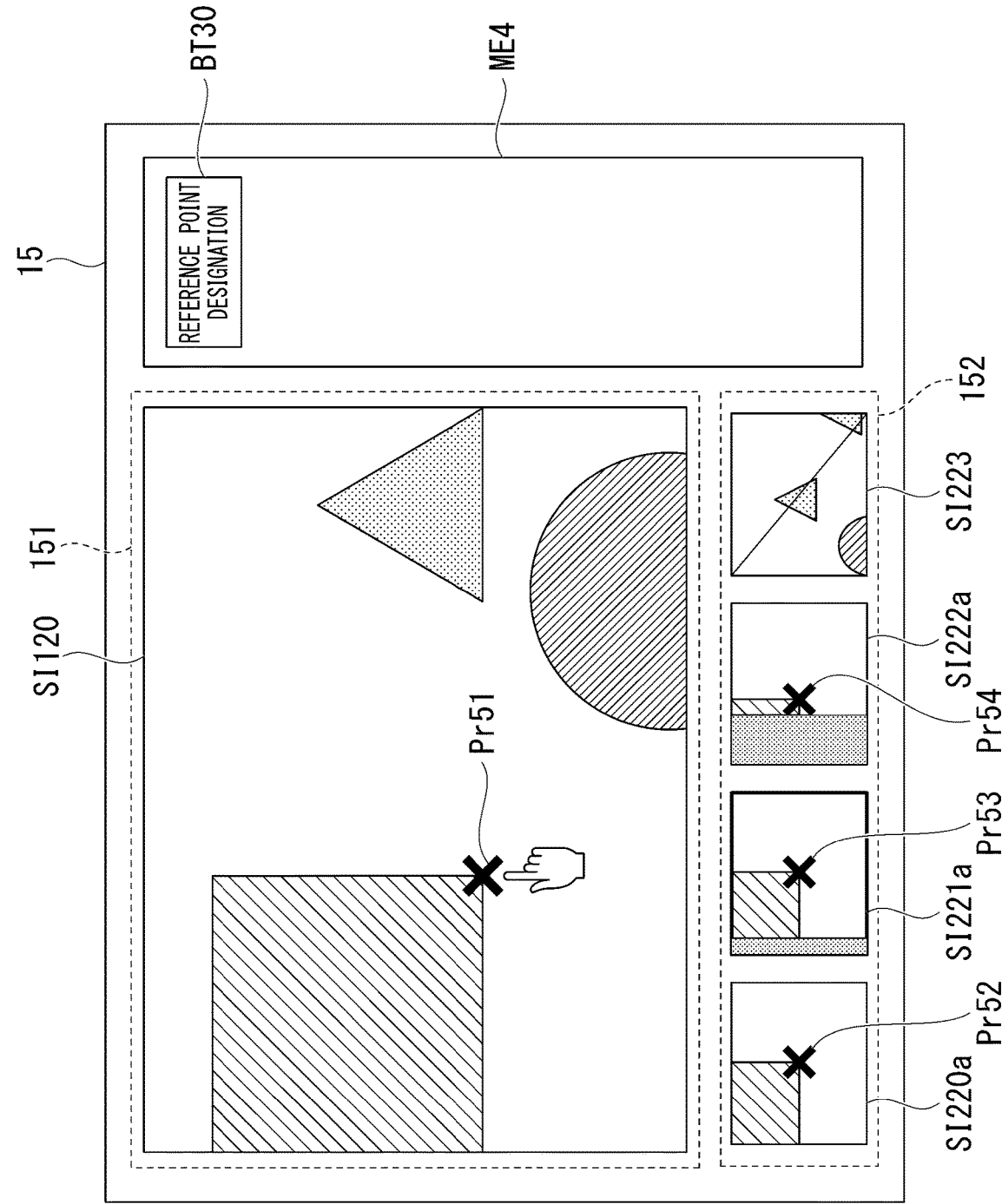
FIG. 39 is a diagram showing an example of an image displayed on the display included in the measurement device according to the fifth embodiment of the present invention.

FIG. 39 shows an example of an image displayed on the display 15 in Step S173. The same part as that shown in FIG. 38 will not be described.

A first reference point Pr51 is displayed on a reference image SI120. The display control unit 221 detects a corresponding point in each of the image SI220, the image SI221, the image SI222, and the image SI223 in Step S173. Since the image SI221 is the same as the reference image SI120, a corresponding point on the coordinates associated with the coordinates of the first reference point Pr51 on the reference image SI120 is detected. The display control unit 221 executes matching processing by using the reference image SI120 and each of the image SI220, the image SI222, and the image SI223. The display control unit 221 obtains a corresponding point in each of the image SI220, the image SI222, and the image SI223 as a result of the matching processing.

When a corresponding point is detected, the display control unit 221 generates an image by magnifying the periphery of the corresponding point. For example, a peripheral region of the corresponding point is extracted from each image in the second region 152 and is magnified. The peripheral region of the corresponding point is around the corresponding point and has a predetermined size. A user may change setting of the magnification through the operation unit 12.

The display control unit 221 hides the image SI220 and displays an image SI220a in the second region 152. The image SI220a is an image generated by magnifying the periphery of the corresponding point detected in the image SI220. A corresponding point Pr52 is displayed on the image SI220a.

The display control unit 221 hides the image SI221 and displays an image SI221a in the second region 152. The image SI221a is an image generated by magnifying the periphery of the corresponding point detected in the image SI221. A corresponding point Pr53 is displayed on the image SI221a.

The display control unit 221 hides the image SI222 and displays an image SI222a in the second region 152. The image SI222a is an image generated by magnifying the periphery of the corresponding point detected in the image SI222. A corresponding point Pr54 is displayed on the image SI222a.

Each of the image SI220a, the image SI221a, and the image SI222a is an image generated by magnifying part of the image extracted in Step S106. A point corresponding to the first reference point Pr51 on the reference image SI120 is not on the image SI223. For this reason, the display control unit 221 notifies a user that there is not a corresponding point on the image SI223. For example, the image SI223 is grayed out.

A user confirms the corresponding point on the magnified image. A user can determine whether or not the first reference point Pr51 is set at the desired position by confirming the corresponding point Pr53 on the image SI221a corresponding to the reference image SI120. A user can determine whether or not the corresponding point is accurately detected in each of the image SI220a and the image SI222a by confirming the corresponding point Pr52 on the image SI220a and the corresponding point Pr54 on the image SI222a.

When the first reference point Pr51 is designated, a corresponding point may be displayed on the image SI220, the image SI221, and the image SI222 shown in FIG. 38. In this case, an image of the periphery of the corresponding point may not be magnified. It is easy for a user to understand the relationship of visual fields between images on the basis of the position of the corresponding point on the images.

After Step S112, the display control unit 221 returns the magnification of the images displayed in the second region of the display 15 to the original one (Step S176). While magnified images are displayed in the second region, a user is unable to confirm a region other than the periphery of the corresponding point. For this reason, it is difficult for a user to search for a measurement point on the images displayed in the second region. Since the magnification of the images are returned to the original one, it is easy for a user to search for a measurement point. After Step S176, Step S136 is executed.

After Step S115, the measurement point setting unit 224 determines whether or not the measurement device 1 is in a state of waiting for input of a measurement point (Step S177). For example, when a user presses a button for instructing for starting input of a measurement point, the measurement device 1 is in the state of waiting for input of a measurement point.

When the measurement point setting unit 224 determines that the measurement device 1 is not in the state of waiting for input of a measurement point, the measurement point setting unit 224 repeatedly executes Step S177.

When the measurement point setting unit 224 determines that the measurement device 1 is in the state of waiting for input of a measurement point, a user can designate a measurement point. A user designates a first measurement point on an image displayed in the first region of the display 15 by operating the operation unit 12. The measurement point setting unit 224 accepts the first measurement point designated by a user from the operation unit 12. The measurement point setting unit 224 sets the first measurement point designated by a user on the image displayed in the first region of the display 15 (Step S178).

After Step S178, the display control unit 221 detects a corresponding point in at least three images displayed in the second region of the display 15. The corresponding point corresponds to the first measurement point set in Step S178. The display control unit 221 displays an image generated by magnifying the periphery of the detected corresponding point in the second region of the display 15 (Step S179).

After the first measurement point is set, a user designates a second measurement point on an image displayed in the first region of the display 15 by operating the operation unit 12. The measurement point setting unit 224 accepts the second measurement point designated by a user from the operation unit 12. The measurement point setting unit 224 sets the second measurement point designated by a user on the image displayed in the first region of the display 15 (Step S180).

After Step S180, the display control unit 221 detects a corresponding point in at least three images displayed in the second region of the display 15. The corresponding point corresponds to the second measurement point set in Step S180. The display control unit 221 displays an image generated by magnifying the periphery of the corresponding point in the second region of the display 15 (Step S181). After Step S181, Step S117 is executed.

In a case in which a cursor for designating a designation point is displayed on an image in the first region of the display 15, the display control unit 221 may detect the position of the cursor on a regular basis. Even when the cursor is moving on an image, the display control unit 221 may consider the detected position of the cursor as a designation point. The display control unit 221 may detect a corresponding point in each image displayed in the second region of the display 15. The corresponding point corresponds to the position of the cursor. The display control unit 221 may display an image generated by magnifying the periphery of the corresponding point in the second region of the display 15. While a user moves the cursor, the magnified image continues to be updated. The image in the second region may not be magnified while the cursor moves. The image in the second region may be magnified only when the cursor stops.

In FIG. 37, Steps S132 to S135 shown in FIG. 19 are omitted. The processing shown in FIG. 37 may include Steps S132 to S135.

The order of processing executed by the CPU 13a is not limited to the order shown in FIG. 3 and FIG. 37. For example, as long as Step S108 is executed before Step S112 is executed, Step S108 may be executed at any timing between Step S107 and Step S117.

Steps S136 to S181 may be repeatedly executed. Therefore, at least one measurement point may be set on each of two or more images.

A measurement method according to each aspect of the present invention may include a point display step. The display control unit 221 magnifies and displays a region on a third image in the point display step (Step S173, Step S175, Step S179, and Step S181). The region includes a third point corresponding to a first point or a second point.

The first point corresponds to at least one of the first reference point and the second reference point. The second point corresponds to at least one of the first measurement point and the second measurement point. In the example shown in FIG. 39, the display control unit 221 displays the corresponding point Pr52 on the image SI220a, displays the corresponding point Pr53 on the image SI221a, and displays the corresponding point Pr54 on the image SI222a. Each of the corresponding point Pr52, the corresponding point Pr53, and the corresponding point Pr54 corresponds to the third point. Each of the image SI220a, the image SI221a, and the image SI222a corresponds to the third image.

In the fifth embodiment, a designation point is set on an image in the first region of the display 15 and an image generated by magnifying a point corresponding to the designation point is displayed in the second region of the display 15. A user can determine whether or not a designation point is set at the desired position. In addition, a user can determine whether or not a corresponding point is accurately detected.

The magnification of an image in the second region 152 is controlled. In a case in which a user does not designate a designation point, the image in the second region is not magnified. A user can confirm the entire image in the second region. A user can confirm a region that is not included in an image displayed in the first region by using the image in the second region. In a case in which a user designates a designation point, the image in the second region is magnified. A user can confirm only the periphery of the designation point in detail.

Modified Example of Fifth Embodiment

A modified example of the fifth embodiment of the present invention will be described. The measurement device 1 may accept an instruction from a user and correct the position of a corresponding point on an image displayed in the second region of the display 15. A user can correct the position of a corresponding point through the operation unit 12.

Hereinafter, two cases will be described. In a first case, a user corrects the position of a corresponding point on an image having the same visual field as that of the image in the first region of the display 15. When the position of the corresponding point is corrected, the position of a designation point on the image displayed in the first region is corrected. A user can accurately designate the position of a designation point. In a second case, a user corrects the position of a corresponding point on an image having a visual field different from that of the image in the first region of the display 15. When the position of the corresponding point is corrected, the position and the posture of the camera are calculated again and a 3D model is generated again. In this case, the error of measurement is small.

Figure 40:
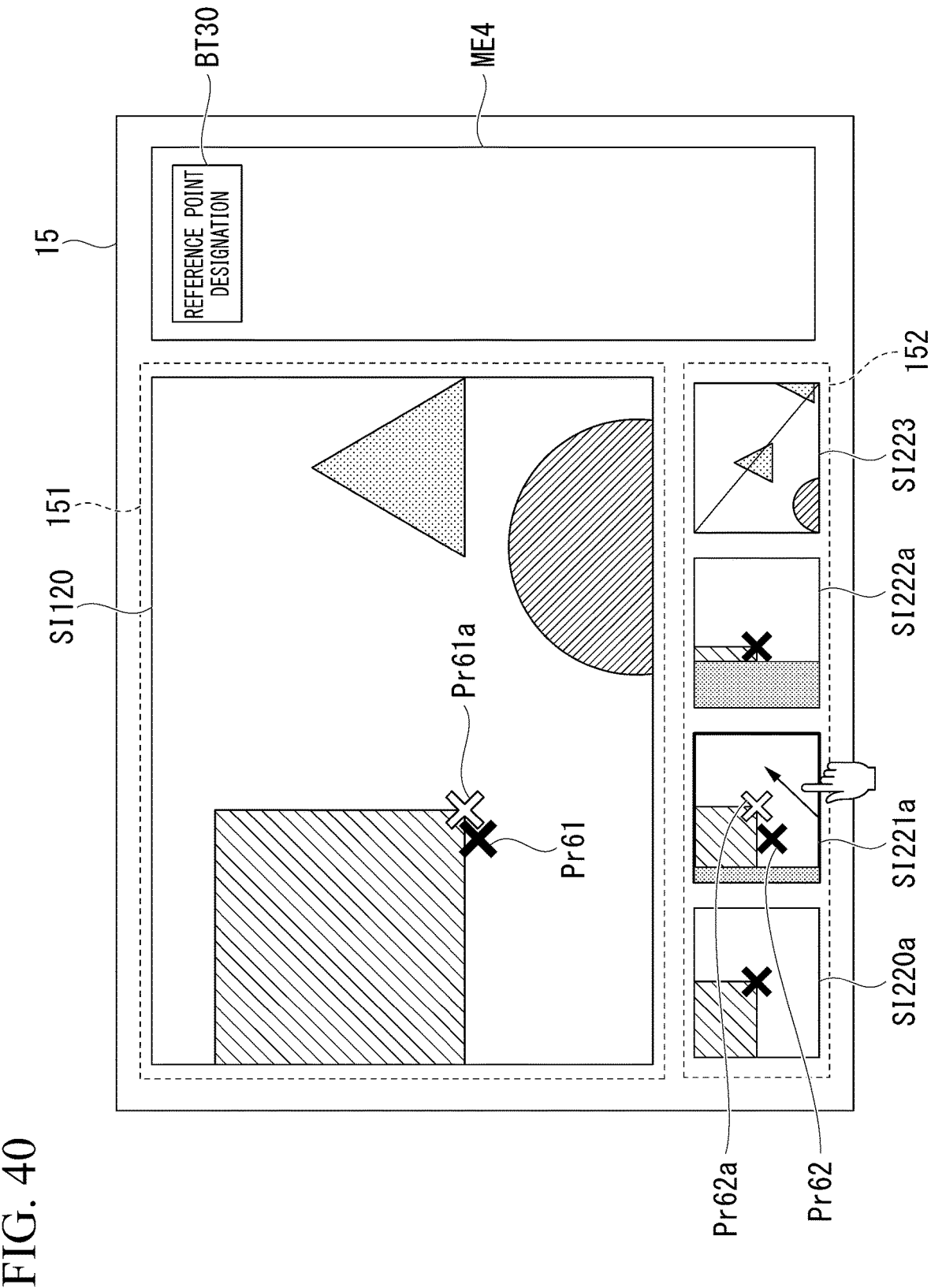
FIG. 40 is a diagram showing an example of an image displayed on a display included in a measurement device according to a modified example of the fifth embodiment of the present invention.

FIG. 40 shows an example of an image displayed on the display 15 in the first case. The same part as that shown in FIG. 39 will not be described.

A first reference point Pr61 is displayed on a reference image SI120. A corresponding point Pr62 is displayed on an image SI221a. The image SI221a is an image generated by magnifying part of the image SI221 (FIG. 38) corresponding to the reference image SI120. A user confirms the corresponding point Pr62. Hereinafter, it is assumed that a user thinks that the corresponding point Pr62 is different from the desired position and desires to correct the position of the corresponding point Pr62. In this case, a user moves the corresponding point Pr62 on the image SI221a by operating the operation unit 12. In the example shown in FIG. 40, the corresponding point Pr62 moves and is displayed as a corresponding point Pr62a.

Coordinates on the reference image SI120 and coordinates on the image SI221 are associated with each other. For this reason, coordinates on the reference image SI120 and coordinates on the image SI221a are associated with each other. The display control unit 221 corrects the first reference point Pr61 on the reference image SI120 to the same position as that of the corresponding point Pr62a on the image SI221a. In the example shown in FIG. 40, the first reference point Pr61 moves and is displayed as a first corresponding point Pr61a.

Figure 41:
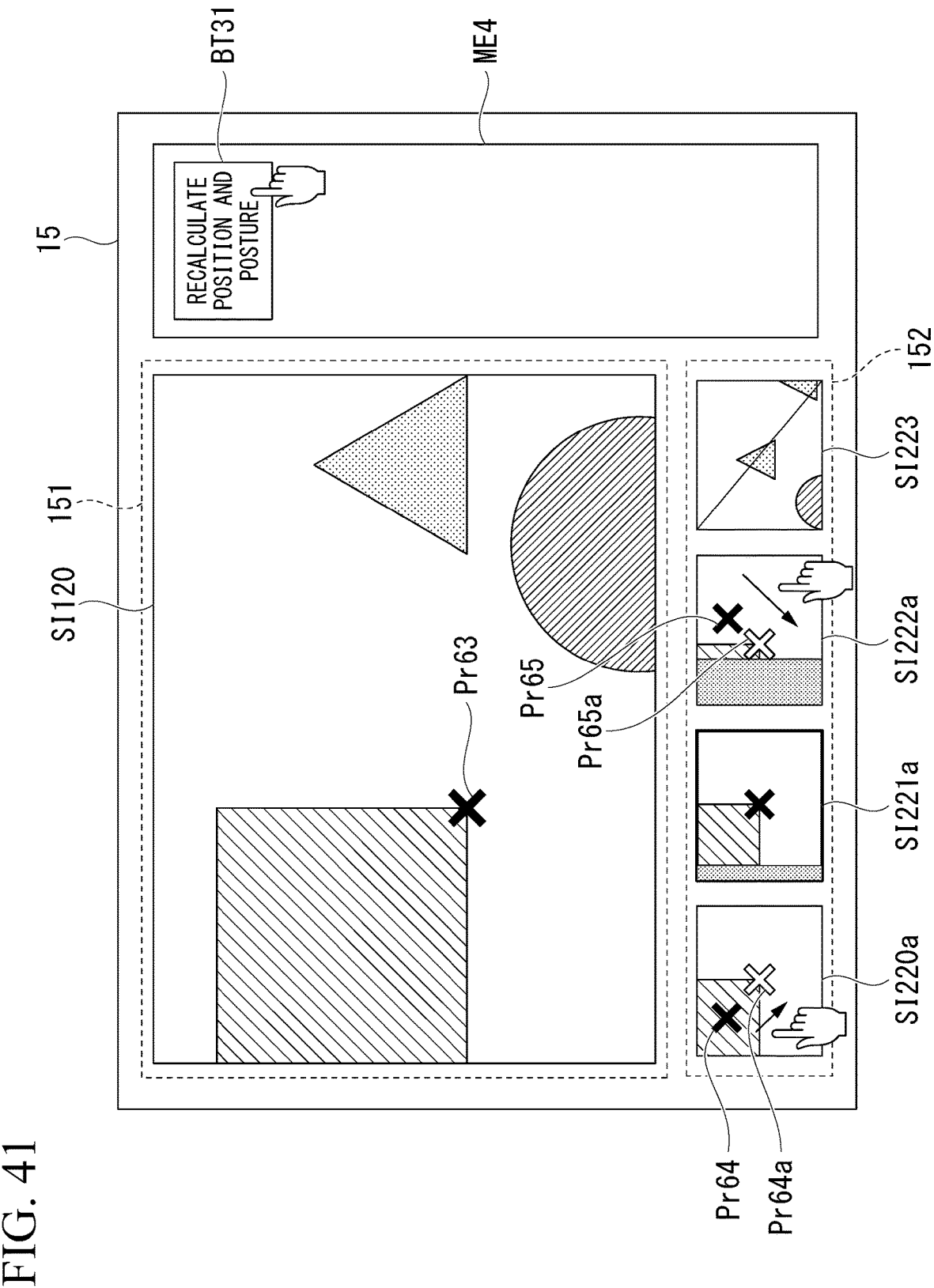
FIG. 41 is a diagram showing an example of an image displayed on the display included in the measurement device according to the modified example of the fifth embodiment of the present invention.

FIG. 41 shows an example of an image displayed on the display 15 in the second case. The same part as that shown in FIG. 39 will not be described.

A first reference point Pr63 is displayed on a reference image SI120. A corresponding point Pr64 is displayed on an image SI220a and a corresponding point Pr65 is displayed on an image SI222a. A user confirms the corresponding point Pr64 and the corresponding point Pr65. Hereinafter, it is assumed that a user thinks that the corresponding point Pr64 and the corresponding point Pr65 are different from the first reference point Pr63 and desires to correct the positions of the corresponding point Pr64 and the corresponding point Pr65. In this case, a user moves the corresponding point Pr64 on the image SI220*a* and moves the corresponding point Pr65 on the image SI222*a* by operating the operation unit 12. In the example shown in FIG. 41, the corresponding point Pr64 moves and is displayed as a corresponding point Pr64*a*. In addition, the corresponding point Pr65 moves and is displayed as a corresponding point Pr65*a*.

After the correction of a corresponding point is completed, a user presses a button BT31 on a menu ME4 by operating the operation unit 12. The button BT31 is a button for executing calculation of the position and the posture of a camera again. When the button BT31 is pressed, the 3D model generation unit 211 calculates the position and the posture of the camera again on the basis of information of the corrected corresponding point. The 3D model generation unit 211 calculates a 3D model again on the basis of the calculated position and posture of the camera.

In the modified example of the fifth embodiment, the measurement device 1 corrects the position of a corresponding point on an image having the same visual field as that of the image in the first region of the display 15. A user can accurately designate a designation point by correcting the position of a corresponding point through the operation unit 12. The measurement device 1 corrects the position of a corresponding point on an image having a visual field different from that of the image in the first region of the display 15. A user can make the error of measurement small by correcting the position of a corresponding point through the operation unit 12.

Sixth Embodiment

A sixth embodiment of the present invention will be described. In the sixth embodiment, two devices cooperate with each other. A first device accepts an instruction from a user, executes processing, and notifies the user of a result of the processing. The first device executes processing related to display of an image, setting of a designation point, and the like. A second device executes processing related to generation of a 3D model and the like. For example, portability of the first device is excellent, but a calculation resource of the first device is small. Portability of the second device is not excellent, but a calculation resource of the second device is abundant. In the sixth embodiment, advantages of the two devices are utilized. There is a situation in which measurement using an image is required in a scene that makes difficult to carry a large device or the like. In such a situation, the sixth embodiment is effective.

Figure 42:
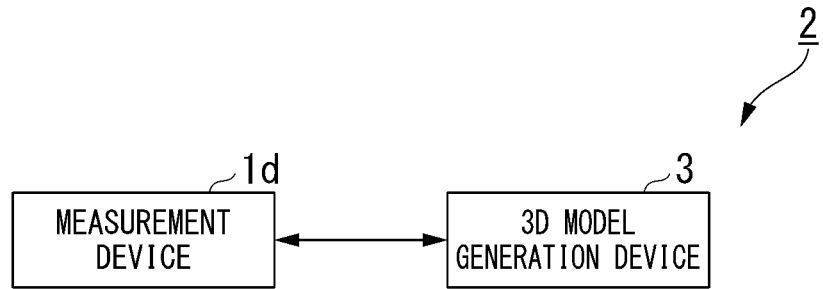
FIG. 42 is a block diagram showing a configuration of a measurement system according to a sixth embodiment of the present invention.

FIG. 42 shows a configuration of a measurement system 2 according to the sixth embodiment. The measurement system 2 shown in FIG. 42 includes a measurement device 1*d* and a 3D model generation device 3.

Figure 43:
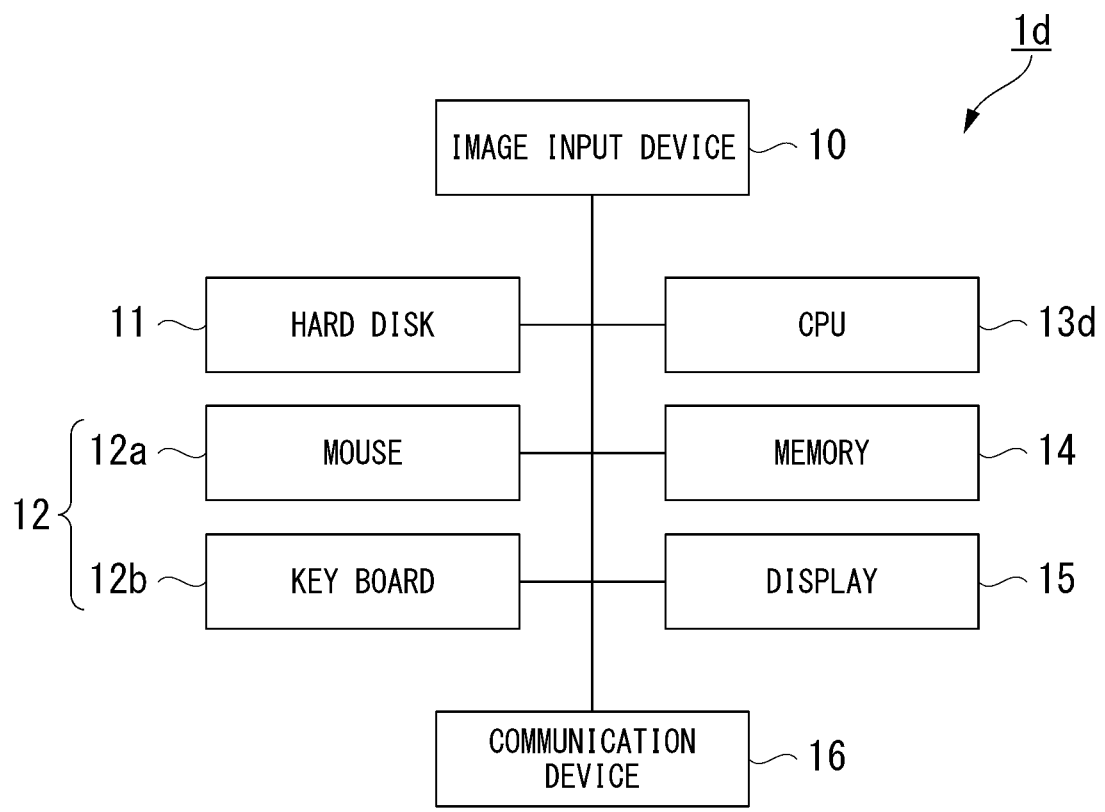
FIG. 43 is a block diagram showing a hardware configuration of a measurement device according to the sixth embodiment of the present invention.

FIG. 43 shows a hardware configuration of the measurement device 1*d*. The same configuration as that shown in FIG. 1 will not be described. The measurement device 1*d* shown in FIG. 43 includes an image input device 10, a hard disk 11, an operation unit 12, a CPU 13*d*, a memory 14, a display 15, and a communication device 16.

The communication device 16 performs communication with the 3D model generation device 3. For example, the communication device 16 is connected to the 3D model generation device 3 through a cable or by radio. Communication between the communication device 16 and the 3D model generation device 3 may be performed via a local area network (LAN) or the Internet.

Figure 44:
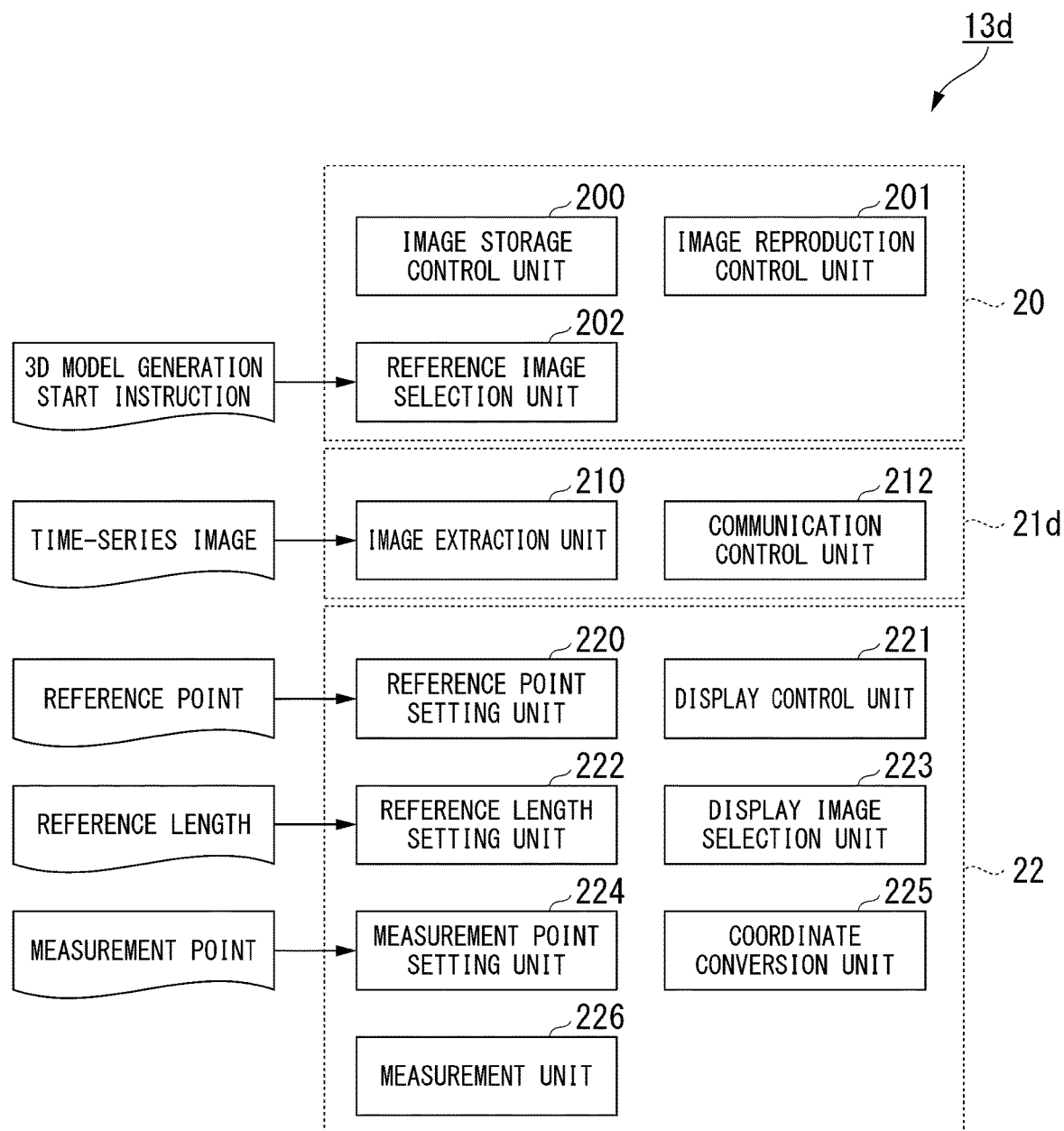
FIG. 44 is a block diagram showing a functional configuration of a CPU included in the measurement device according to the sixth embodiment of the present invention.

FIG. 44 shows a functional configuration of the CPU 13*d*. The same configuration as the configuration shown in FIG. 2 will not be described. At least one of blocks shown in FIG. 44 may be constituted by a circuit other than the CPU 13*d*.

Each unit shown in FIG. 44 may be constituted by at least one of a processor and a logic circuit. Each unit shown in FIG. 44 may include one or a plurality of processors. Each unit shown in FIG. 44 may include one or a plurality of logic circuits.

The 3D model acquisition unit 21 shown in FIG. 2 is changed to a 3D model acquisition unit 21*d*. The 3D model acquisition unit 21*d* includes an image extraction unit 210 and a communication control unit 212. The communication control unit 212 performs communication with the 3D model generation device 3 by controlling the communication device 16. The communication control unit 212 transmits a condition for generating a 3D model and at least three images for generating the 3D model to the 3D model generation device 3. The communication control unit 212 receives a 3D model from the 3D model generation device 3.

Figure 45:
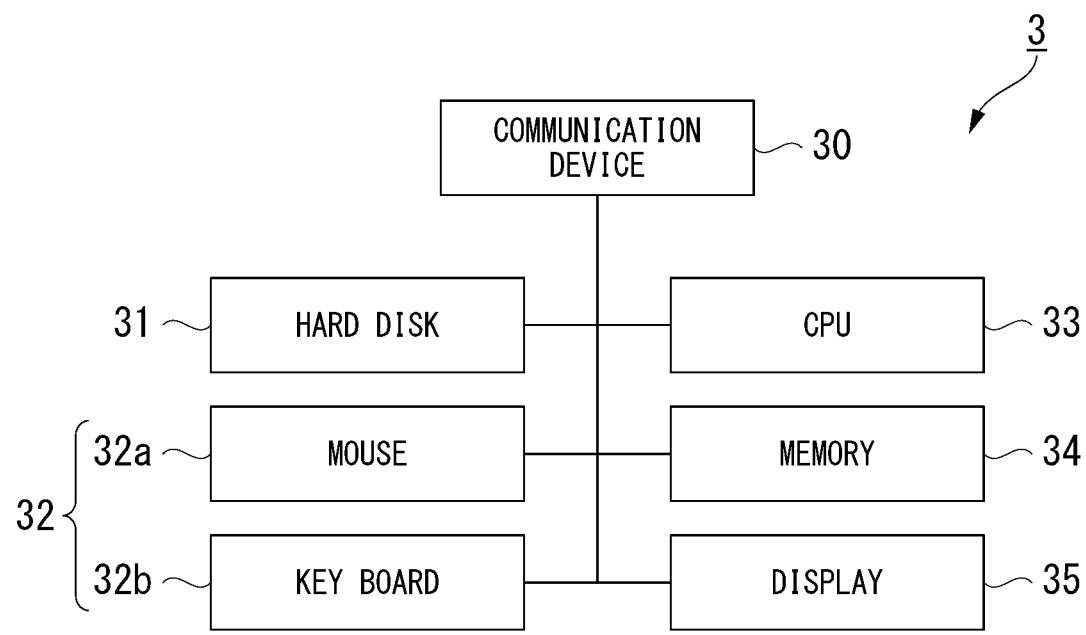
FIG. 45 is a block diagram showing a hardware configuration of a 3D model generation device according to the sixth embodiment of the present invention.

FIG. 45 shows a hardware configuration of the 3D model generation device 3. The 3D model generation device 3 shown in FIG. 45 includes a communication device 30, a hard disk 31, an operation unit 32, a CPU 33, a memory 34, and a display 35.

The communication device 30 performs communication with the measurement device 1*d*. The hard disk 31 stores at least three images received by the communication device 30. The 3D model generation device 3 may include an SSD instead of the hard disk.

The operation unit 32 is a user interface (input interface). The operation unit 32 includes a mouse 32*a* and a key board 32*b*.

The CPU 33 executes processing for generation (reconfiguration) of a three-dimensional shape of a subject. The functions of the CPU 33 will be described later with reference to FIG. 46.

The memory 34 is a volatile or nonvolatile memory. The memory 34 stores at least three images received by the communication device 16 or an image processed by the CPU 33. The display 35 is a monitor such as a liquid crystal display.

Figure 46:
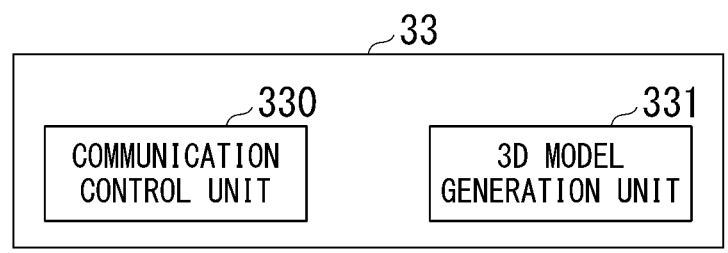
FIG. 46 is a block diagram showing a functional configuration of a CPU included in the 3D model generation device according to the sixth embodiment of the present invention.

FIG. 46 shows a functional configuration of the CPU 33. At least one of blocks shown in FIG. 46 may be constituted by a circuit other than the CPU 33.

Each unit shown in FIG. 46 may be constituted by at least one of a processor and a logic circuit. Each unit shown in FIG. 46 may include one or a plurality of processors. Each unit shown in FIG. 46 may include one or a plurality of logic circuits.

A communication control unit 330 and a 3D model generation unit 331 constitute the functions of the CPU 33. The communication control unit 330 performs communication with the measurement device 1*d* by controlling the communication device 30. The communication control unit 330 receives a condition for generating a 3D model and at least three images for generating the 3D model from the measurement device 1*d*. The communication control unit 330 transmits a 3D model to the measurement device 1*d*. The 3D model generation unit 331 has a function similar to that of the 3D model generation unit 211 shown in FIG. 2.

Figure 47:
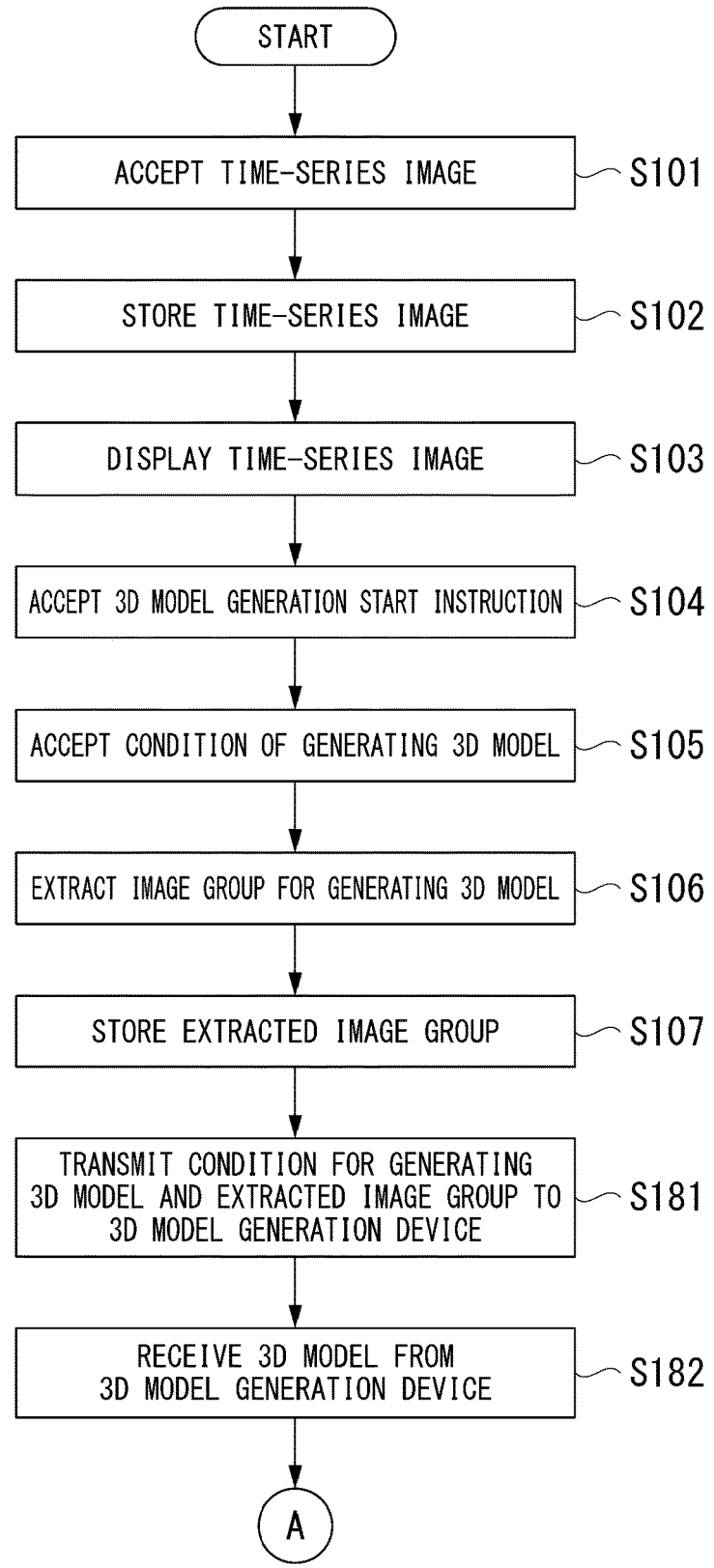
FIG. 47 is a flow chart showing a procedure of processing executed by the measurement device according to the sixth embodiment of the present invention.
Figure 48:
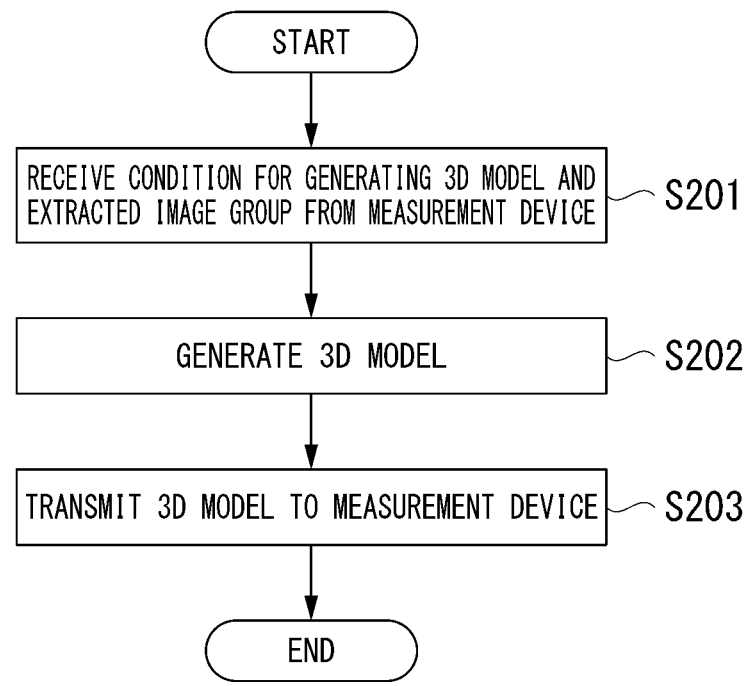
FIG. 48 is a flow chart showing a procedure of processing executed by the 3D model generation device according to the sixth embodiment of the present invention.

A procedure of processing executed for generation of a 3D model and measurement will be described with reference to FIG. 47 and FIG. 48. FIG. 47 shows a procedure of processing executed by the CPU 13d of the measurement device 1d. FIG. 48 shows a procedure of processing executed by the CPU 33 of the 3D model generation device 3. The same processing as the processing shown in FIG. 3 will not be described.

After Step S107, the communication control unit 212 of the measurement device 1d transmits the condition accepted in Step S105 and at least three images extracted in Step S106 to the 3D model generation device 3 (Step S181). After Step S181, the communication control unit 212 of the measurement device 1d receives a 3D model from the 3D model generation device 3 (Step S182). The received 3D model is stored on the hard disk 11 or the memory 14. After Step S182, the processing shown in FIG. 4 is executed.

The communication control unit 330 of the 3D model generation device 3 receives a condition for generating a 3D model and at least three images for generating the 3D model from the measurement device 1d (Step S201). Received information is stored on the hard disk 31 or the memory 34.

After Step S201, the 3D model generation unit 331 estimates the position and the posture of a camera when each image extracted by the image extraction unit 210 is generated. The 3D model generation unit 331 generates a 3D model of a subject on the basis of the estimated position and posture (Step S202). Step S202 is similar to Step S108 shown in FIG. 3.

After Step S202, the communication control unit 330 transmits the 3D model generated in Step S202 to the measurement device 1d (Step S203). When Step S203 is executed, the processing shown in FIG. 48 is completed.

In the above-described example, a plurality of pieces of processing are distributed in two devices. There are no limitations to the number of devices and there are no limitations to the processing executed by each device. For example, a plurality of 3D model generation devices 3 may execute time-consuming processing.

A first user may be in charge of operating the measurement device 1d and a second user may be in charge of operating the 3D model generation device 3. For example, the second user may designate a designation point by using the 3D model generation device 3. The 3D model generation device 3 may execute measurement on the basis of information of the designation point and a 3D model and may transmit a measurement result to the measurement device 1d.

In the sixth embodiment, a plurality of devices execute processing in cooperation with each other. At least one of the plurality of devices has a feature that portability is excellent but a calculation resource is small. At least one of the plurality of devices has a feature that portability is not excellent but a calculation resource is abundant. The measurement system 2 can execute measurement by taking advantage of the plurality of devices.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A measurement method comprising:
    a first image display step in which a processor displays one first image in a first region of a display, the first image being a two-dimensional image of a subject;
    a first setting step in which the processor sets a first point on the first image displayed in the first region;
    a second image display step in which the processor hides the first image in the first region by making at least a portion of the first image in which the first point is set hidden and displays one second image included in a plurality of second images in the first region after the first point is set on the first image, each second image included in the plurality of second images being a two-dimensional image of the subject, part of a visual field of each image of an image group that consists of the first image and the plurality of second images overlapping part of a visual field of another image of the image group;
    a second setting step in which the processor sets a second point on the second image displayed in the first region while the at least a portion of the first image in which the first point is set remains hidden;
    a generation step in which the processor generates a three-dimensional shape of the subject on the basis of a position and a posture of a camera, the position and the posture being a position and a posture, respectively, when each image of the image group is generated, the three-dimensional shape including three-dimensional coordinates of at least two points; and
    a measurement step in which the processor measures a size of the subject on the basis of at least the first point, the second point, and the three-dimensional shape; and
    a third image display step in which the processor displays at least two third images in a second region of the display different from the first region while the first image is displayed in the first region, each of the third images corresponding to any second image included in the plurality of second images,
    wherein, after an instruction for selecting one of the at least two third images displayed in the second region is accepted, the processor hides the first image and displays the second image corresponding to the selected third image in the first region in the second image display step.

2. The measurement method according to claim 1, wherein the area of the first image in the first region is larger than the area of the second image in the second region.

3. The measurement method according to claim 1, wherein the processor highlights the second image included in the plurality of second images and corresponding to the first image in the second region in the third image display step.

4. The measurement method according to claim 1, wherein the processor highlights the third image corresponding to the second image displayed in the first region in the second image display step.

5. The measurement method according to claim 1, wherein the processor arranges the at least two third images in the second region in the order that is based on the relationship between visual fields of the at least two third images in the third image display step.

6. The measurement method according to claim 1, wherein, when a size of overlap between visual fields of two second images included in the plurality of second images exceeds a predetermined amount, the processor displays the third image corresponding to only one of the two second images in the second region in the third image display step.

7. The measurement method according to claim 2,
wherein the processor highlights a region on the third image in the third image display step, the region being not included in a visual field of the first image and being included in common in visual fields of two or more of the at least two second images.

8. The measurement method according to claim 7,
wherein the processor highlights a region on the third image in one of the second image display step and the third image display step, the region being included in a visual field of only one of the at least two second images.

9. The measurement method according to claim 7,
wherein the processor highlights a region on the first image in the third image display step, the region being included in a visual field of only the first image.

10. The measurement method according to claim 7,
wherein the processor highlights a region on the second image displayed in the first region in the second image display step, the region being included in a visual field of only the second image displayed in the first region.

11. The measurement method according to claim 1,
wherein the processor highlights a region on the third image in the second image display step, the region being not included in a visual field of the second image displayed in the first region and being included in common in visual fields of two or more of the at least two second images.

12. The measurement method according to claim 1, further comprising a point display step in which the processor magnifies and displays a region on the third image, the region including a third point corresponding to the first point or the second point.

13. A measurement device comprising:
a processor, wherein the processor is configured to:
    display one first image in a first region of a display, the first image being a two- dimensional image of a subject;
    set a first point on the first image displayed in the first region;
    hide the first image in the first region by making at least a portion of the first image in which the first point is set hidden and display one second image included in a plurality of second images in the first region after the first point is set on the first image, each second image included in the plurality of second images being a two-dimensional image of the subject, part of a visual field of each image of an image group that consists of the first image and the plurality of second images overlapping part of a visual field of another image of the image group;
    set a second point on the second image displayed in the first region while the at least a portion of the first image in which the first point is set remains hidden;
    generate a three-dimensional shape of the subject on the basis of a position and a posture of a camera, the position and the posture being a position and a posture, respectively, when each image of the image group is generated, the three-dimensional shape including three-dimensional coordinates of at least two points;
    measure a size of the subject on the basis of at least the first point, the second point, and the three-dimensional shape; and
    display at least two third images in a second region of the display different from the first region while the first image is displayed in the first region, each of the third images corresponding to any second image included in the plurality of second images,
    wherein, after an instruction for selecting one of the at least two third images displayed in the second region is accepted, the processor is configured to hide the first image and display the second image corresponding to the selected third image in the first region.

14. A non-transitory computer-readable recording medium having a program recorded therein for causing a computer to at least execute:
a first image display step of displaying one first image in a first region of a display, the first image being a two-dimensional image of a subject;
a first setting step of setting a first point on the first image displayed in the first region;
a second image display step of hiding the first image in the first region by making at least a portion of the first image in which the first point is set hidden and displaying one second image included in a plurality of second images in the first region after the first point is set on the first image, each second image included in the plurality of second images being a two-dimensional image of the subject, part of a visual field of each image of an image group that consists of the first image and the plurality of second images overlapping part of a visual field of another image of the image group;
a second setting step of setting a second point on the second image displayed in the first region while the at least a portion of the first image in which the first point is set remains hidden;
a generation step of generating a three-dimensional shape of the subject on the basis of a position and a posture of a camera, the position and the posture being a position and a posture, respectively, when each image of the image group is generated, the three-dimensional shape including three-dimensional coordinates of at least two points;
a measurement step of measuring a size of the subject on the basis of at least the first point, the second point, and the three-dimensional shape; and
a third image display step of displaying at least two third images in a second region of the display different from the first region while the first image is displayed in the first region, each of the third images corresponding to any second image included in the plurality of second images,
wherein, after an instruction for selecting one of the at least two third images displayed in the second region is accepted, hiding the first image and displaying the second image corresponding to the selected third image in the first region in the second image display step.

15. A measurement method comprising:
a first image display step in which a processor displays one first image in a first region of a display, the first image being a two-dimensional image of a subject;
a first setting step in which the processor sets a first point on the first image displayed in the first region;
a second image display step in which the processor hides the first image in the first region and displays one second image included in a plurality of second images in the first region after the first point is set on the first image, each second image included in the plurality of second images being a two-dimensional image of the subject, part of a visual field of each image of an image group that consists of the first image and the plurality of second images overlapping part of a visual field of another image of the image group;

a second setting step in which the processor sets a second point on the second image displayed in the first region;

a generation step in which the processor generates a three-dimensional shape of the subject on the basis of a position and a posture of a camera, the position and the posture being a position and a posture, respectively, when each image of the image group is generated, the three-dimensional shape including three-dimensional coordinates of at least two points;

a measurement step in which the processor measures a size of the subject on the basis of at least the first point, the second point, and the three-dimensional shape; and a third image display step in which the processor displays at least two third images in a second region of the display different from the first region while the first image is displayed in the first region, each of the third images corresponding to any second image included in the plurality of second images, wherein, after an instruction for selecting one of the at least two third images displayed in the second region is accepted, the processor hides the first image and displays the second image corresponding to the selected third image in the first region in the second image display step.

16. The measurement method according to claim 15, wherein the area of the first image in the first region is larger than the area of the second image in the second region.

17. The measurement method according to claim 15, wherein the processor highlights the second image included in the plurality of second images and corresponding to the first image in the second region in the third image display step.

18. The measurement method according to claim 15, wherein the processor highlights the third image corresponding to the second image displayed in the first region in the second image display step.

19. The measurement method according to claim 15, wherein the processor arranges the at least two third images in the second region in the order that is based on the relationship between visual fields of the at least two third images in the third image display step.

20. The measurement method according to claim 15, wherein, when a size of overlap between visual fields of two second images included in the plurality of second images exceeds a predetermined amount, the processor displays the third image corresponding to only one of the two second images in the second region in the third image display step.

21. The measurement method according to claim 15, wherein the processor highlights a region on the third image in the third image display step, the region being not included in a visual field of the first image and being included in common in visual fields of two or more of the at least two second images.

22. The measurement method according to claim 21, wherein the processor highlights a region on the third image in one of the second image display step and the third image display step, the region being included in a visual field of only one of the at least two second images.

23. The measurement method according to claim 21, wherein the processor highlights a region on the first image in the third image display step, the region being included in a visual field of only the first image.

24. The measurement method according to claim 21, wherein the processor highlights a region on the second image displayed in the first region in the second image display step, the region being included in a visual field of only the second image displayed in the first region.

25. The measurement method according to claim 15, wherein the processor highlights a region on the third image in the second image display step, the region being not included in a visual field of the second image displayed in the first region and being included in common in visual fields of two or more of the at least two second images.

* * * * *